US012492147B2

(12) United States Patent
Brown et al.

(10) Patent No.: US 12,492,147 B2
(45) Date of Patent: *Dec. 9, 2025

(54) GEOPOLYMER FORMULATIONS FOR CONSTRUCTION MATERIALS

(71) Applicant: Building Armour Industries LLC, Danville, CA (US)

(72) Inventors: David Robert Brown, Danville, CA (US); Deshia VonDell Jackson, Pittsburg, CA (US); Sean Francis Killian, Antioch, CA (US)

(73) Assignee: Building Armour Industries LLC, Danville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/181,124

(22) Filed: Apr. 16, 2025

(65) Prior Publication Data

US 2025/0326689 A1 Oct. 23, 2025

Related U.S. Application Data

(60) Provisional application No. 63/635,252, filed on Apr. 17, 2024.

(51) Int. Cl.
| | |
|---|---|
| *C04B 28/00* | (2006.01) |
| *C04B 12/00* | (2006.01) |
| *C04B 14/06* | (2006.01) |
| *C04B 14/30* | (2006.01) |
| *C04B 14/46* | (2006.01) |
| *C04B 16/02* | (2006.01) |
| *C04B 18/06* | (2006.01) |
| *C04B 18/08* | (2006.01) |
| *C04B 18/167* | (2023.01) |
| *C04B 22/00* | (2006.01) |
| *C04B 22/06* | (2006.01) |
| *C04B 24/14* | (2006.01) |

(52) U.S. Cl.
CPC .......... *C04B 28/006* (2013.01); *C04B 12/005* (2013.01); *C04B 14/06* (2013.01); *C04B 14/304* (2013.01); *C04B 14/4668* (2013.01); *C04B 16/02* (2013.01); *C04B 18/067* (2013.01); *C04B 18/08* (2013.01); *C04B 18/167* (2013.01); *C04B 22/0013* (2013.01); *C04B 22/062* (2013.01); *C04B 24/14* (2013.01); *C04B 2201/52* (2013.01)

(58) Field of Classification Search
CPC ..... C04B 28/006; C04B 12/005; C04B 14/06; C04B 14/304; C04B 14/4668; C04B 16/02; C04B 18/067; C04B 18/08; C04B 18/167; C04B 22/0013; C04B 22/062; C04B 24/14; C04B 2201/52
See application file for complete search history.

(56) References Cited

U.S. PATENT DOCUMENTS

| | | | |
|---|---|---|---|
| 1,595,897 | A | 8/1926 | Lewis |
| 1,848,981 | A | 3/1932 | Wallace |
| 2,063,102 | A | 12/1936 | Jones |
| 2,257,281 | A | 9/1941 | Scholz |
| 2,703,289 | A | 3/1955 | Willson |
| 2,712,533 | A | 7/1955 | Mitchell |
| 2,845,360 | A | 7/1958 | King |
| 2,864,782 | A | 12/1958 | Mitchell |
| 3,372,040 | A | 3/1968 | Ware |
| 3,502,490 | A | 3/1970 | Frank |
| 3,522,069 | A | 7/1970 | John |
| 3,963,849 | A | 6/1976 | Thompson |
| 4,003,752 | A | 1/1977 | Isohata |
| 4,058,406 | A | 11/1977 | Raponi |
| 4,164,426 | A | 8/1979 | Sinka |
| 4,172,804 | A | 10/1979 | Christianson |
| 4,229,225 | A | 10/1980 | Kraszewski |
| 4,292,188 | A | 9/1981 | Barone |
| 4,302,251 | A | 11/1981 | Udagawa |
| 4,443,382 | A | 4/1984 | Lipowski |
| 4,751,024 | A | 6/1988 | Shu |
| 4,904,503 | A | 2/1990 | Hilton |
| 5,061,319 | A | 10/1991 | Hodson |
| 5,401,538 | A | 3/1995 | Perito |
| 5,569,426 | A | 10/1996 | Le |
| 5,858,083 | A | 1/1999 | Stav |
| 6,230,804 | B1 | 5/2001 | Mueller |
| 6,475,275 | B1 | 11/2002 | Nebesnak |
| 6,740,157 | B2 | 5/2004 | Piniecki |
| 6,881,256 | B2 | 4/2005 | Orange |
| 6,913,644 | B2 | 7/2005 | Rizza |
| 7,048,053 | B2 | 5/2006 | Santra |
| 7,160,383 | B2 | 1/2007 | Wagh |
| 7,219,733 | B2 | 5/2007 | Luke |

(Continued)

FOREIGN PATENT DOCUMENTS

| | | |
|---|---|---|
| CA | 1145778 A | 5/1983 |
| CA | 1203255 A | 4/1986 |

(Continued)

OTHER PUBLICATIONS

U.S. Appl. No. 19/181,136, filed Apr. 16, 2025, Brown.

(Continued)

Primary Examiner — Anthony J Green
(74) Attorney, Agent, or Firm — Baker Botts L.L.P.

(57) ABSTRACT

In one embodiment, a geopolymer formulation for a building material comprises sand, ground granulated blast furnace slag (GGBFS), fly ash, sodium tetraborate, boric acid, zeolite, sodium caseinate, and SC-9. Optionally, the formulation also comprises additional constituents like sodium metasilicate, sodium hydroxide, magnesium oxide, hemp, basalt fibers, aggregates, and fillers. Building materials manufactured from the geopolymer formulation have high compressive strength, flexural strength, tensile strength, impact resistance, and thermal resistance.

20 Claims, 30 Drawing Sheets

(56) References Cited

U.S. PATENT DOCUMENTS

| | | |
|---|---|---|
| 7,326,291 B2 | 2/2008 | Fyten |
| 7,442,248 B2 | 10/2008 | Timmons |
| 7,485,185 B2 | 2/2009 | Di |
| 7,658,797 B2 | 2/2010 | Guevara |
| 7,906,176 B2 | 3/2011 | Balthes |
| 7,993,570 B2 | 8/2011 | Naji |
| 8,038,790 B1 | 10/2011 | Dubey |
| 8,172,938 B2 | 5/2012 | Alright |
| 8,323,398 B2 | 12/2012 | Sperisen |
| 8,349,072 B2 | 1/2013 | Schumacher |
| 8,647,750 B2 | 2/2014 | Slimak |
| 9,027,303 B2 | 5/2015 | Lichtinger |
| 9,169,159 B2 | 10/2015 | Setliff |
| 9,353,009 B2 | 5/2016 | Dantin |
| 9,394,200 B2 | 7/2016 | Diaz-Loya |
| 9,796,629 B1 | 10/2017 | Al-Mehthel |
| 9,796,904 B2 | 10/2017 | Agapiou |
| 9,969,100 B1 | 5/2018 | Moran |
| 10,196,309 B2 | 2/2019 | Andersen |
| 10,414,692 B2 | 9/2019 | Daniels |
| 10,954,162 B1 | 3/2021 | Zubrod |
| 11,390,562 B1 | 7/2022 | Zubrod |
| 2004/0107877 A1 | 6/2004 | Getzlaf |
| 2005/0269730 A1 | 12/2005 | Asakura |
| 2006/0188740 A1 | 8/2006 | Kuan |
| 2006/0292358 A1 | 12/2006 | Robertson |
| 2007/0017418 A1 | 1/2007 | Dennis |
| 2007/0246864 A1 | 10/2007 | Utagaki |
| 2007/0284120 A1 | 12/2007 | Rowen |
| 2008/0145550 A1 | 6/2008 | Caine |
| 2010/0083877 A1 | 4/2010 | Selph |
| 2011/0089387 A1 | 4/2011 | Berry |
| 2011/0132230 A1 | 6/2011 | Han |
| 2013/0087076 A1 | 4/2013 | Hill |
| 2014/0202358 A1 | 7/2014 | Aoki |
| 2014/0264140 A1 | 9/2014 | Gong |
| 2014/0291904 A1 | 10/2014 | Soudier |
| 2015/0158766 A1 | 6/2015 | Teng |
| 2015/0314564 A1 | 11/2015 | Mancini |
| 2016/0304401 A1 | 10/2016 | Gillman |
| 2017/0165941 A1 | 6/2017 | Li |
| 2017/0283324 A1 | 10/2017 | Cui |
| 2018/0037506 A1 | 2/2018 | Zubrod |
| 2020/0062645 A1 | 2/2020 | Gong |
| 2021/0130236 A1 | 5/2021 | Rahman |
| 2021/0403336 A1 | 12/2021 | Kang |
| 2024/0059954 A1 | 2/2024 | Santra |

FOREIGN PATENT DOCUMENTS

| | | |
|---|---|---|
| CA | 2081765 A1 | 11/1991 |
| CA | 2501544 A1 | 4/2004 |
| CA | 2724221 A1 | 11/2009 |
| CA | 2809604 A1 | 3/2012 |
| CA | 2839346 A1 | 1/2013 |
| CA | 2869579 A1 | 10/2013 |
| CA | 2847101 A1 | 9/2014 |
| CA | 2909983 A1 | 10/2014 |
| CA | 2942448 A1 | 10/2015 |
| CN | 1133770 A | 10/1996 |
| CN | 1207238 A | 2/1999 |
| CN | 101104551 A | 1/2008 |
| CN | 100427426 C | 10/2008 |
| CN | 101318796 A | 12/2008 |
| CN | 101525223 A | 9/2009 |
| CN | 101525226 A | 9/2009 |
| CN | 102351501 A | 2/2012 |
| CN | 102531487 A | 7/2012 |
| CN | 102720320 A | 10/2012 |
| CN | 202882702 U | 4/2013 |
| CN | 103641425 A | 3/2014 |
| CN | 104876633 A | 9/2015 |
| CN | 106966670 A | 7/2017 |
| DE | 2205658 A1 | 8/1973 |
| EP | 0045162 A1 | 2/1982 |
| EP | 0133585 A2 | 2/1985 |
| EP | 0171253 A2 | 2/1986 |
| EP | 0088587 B1 | 6/1986 |
| EP | 0258064 A2 | 3/1988 |
| EP | 0282240 A1 | 9/1988 |
| EP | 0983978 B1 | 5/2005 |
| EP | 1478606 B1 | 9/2006 |
| EP | 1990325 A1 | 11/2008 |
| EP | 2172435 A2 | 4/2010 |
| EP | 2797412 A1 | 11/2014 |
| EP | 2808312 A1 | 12/2014 |
| EP | 3246350 A1 | 11/2017 |
| EP | 3135652 B1 | 4/2021 |
| JP | H02180737 A | 7/1990 |
| JP | H04176950 A | 6/1992 |
| JP | H08253369 A | 10/1996 |
| JP | H0932152 A | 2/1997 |
| JP | 2005187275 A | 7/2005 |
| JP | 2011213531 A | 10/2011 |
| JP | 2018108909 A | 7/2018 |
| KR | 20050069431 A | 7/2005 |
| KR | 20090018960 A | 2/2009 |
| KR | 20100038747 A | 4/2010 |
| KR | 20110082169 A | 7/2011 |
| KR | 20110118824 A | 11/2011 |
| KR | 20180088658 A | 8/2018 |
| WO | WO 8202195 A1 | 7/1982 |
| WO | WO 9200927 A1 | 1/1992 |
| WO | WO 9620900 A1 | 7/1996 |
| WO | WO 9816483 A1 | 4/1998 |
| WO | WO 0048959 A1 | 8/2000 |
| WO | WO 0208139 A2 | 1/2002 |
| WO | WO 2005073145 A2 | 8/2005 |
| WO | WO 2006065995 A2 | 6/2006 |
| WO | WO 2008130107 A1 | 10/2008 |
| WO | WO 2009038816 A1 | 3/2009 |
| WO | WO 2009059908 A2 | 5/2009 |
| WO | WO 2009081277 A1 | 7/2009 |
| WO | WO 2010002934 A2 | 1/2010 |
| WO | WO 2010096827 A1 | 8/2010 |
| WO | WO 2010117563 A1 | 10/2010 |
| WO | WO 2011085365 A1 | 7/2011 |
| WO | WO 2011130910 A1 | 10/2011 |
| WO | WO 2011135083 A1 | 11/2011 |
| WO | WO 2013020173 A1 | 2/2013 |
| WO | WO 2013123181 A1 | 8/2013 |
| WO | WO 2014058564 A1 | 4/2014 |
| WO | WO 2014094183 A1 | 6/2014 |
| WO | WO 2014122085 A1 | 8/2014 |
| WO | WO 2015057732 A1 | 4/2015 |
| WO | WO 2016103158 A1 | 6/2016 |
| WO | WO 2017102954 A1 | 6/2017 |

OTHER PUBLICATIONS

U.S. Appl. No. 19/181,138, filed Apr. 16, 2025, Brown.
International search report and Written Opinion received for PCT Application No. PCT/US2025/025212, 26 pages.

GEOPOLYMER FORMULATIONS FOR CONSTRUCTION MATERIALS

PRIORITY

This application claims the benefit under 35 U.S.C. § 119 (e) of U.S. Provisional Patent Application No. 63/635,252, filed Apr. 17, 2024, which is incorporated herein by reference.

TECHNICAL FIELD

This disclosure generally relates to construction materials, and in particular relates to geopolymer formulations and construction materials having, among other things, compressive, tensile and flexural strengths, and hydrophobic, non-combustible, non-flammable and mold-resistant properties.

BACKGROUND

Natural disasters including fires, tornadoes, hurricanes, flooding, and earthquakes among others result in significant damage to communities around the world. The impact of these disasters is further exacerbated by increasing global surface temperatures due to climate change, as higher water vapor content in the atmosphere fuels more powerful storms. Higher atmospheric temperatures and warmer ocean surface temperatures further contribute to increased wind speeds in tropical storms compounding the damage to private and public properties. In 2018 alone, insured losses nationwide in the United States exceeded $225 billion from these disasters. Disasters, global poverty, and geo-political instability across continents have also increased the demand for affordable move-in ready dwellings that could be constructed with the shortest possible downtimes.

As communities grow and urbanization continues, the incorporation of water repellant, and fire and mold resistant building materials into building design is critical for minimizing property damage and protecting lives. Traditional wooden structures are short-lived and require repair adding to maintenance costs. Currently employed building materials including Portland cement-based products emit high carbon dioxide and therefore continue to negatively impact climate change at an alarming rate. There is hence a need in the art for methods that allow rapid construction of on-demand move-in ready dwellings that are affordable and reduce the carbon footprint. The disclosed subject matter addresses this long-standing need and desire in the art.

SUMMARY OF PARTICULAR EMBODIMENTS

In particular embodiments, the techniques described herein relate to a geopolymer formulation for a building material including: sand; ground granulated blast furnace slag (GGBFS); fly ash; sodium tetraborate; boric acid; zeolite; sodium caseinate; SC-9; and one or more of sodium metasilicate or sodium hydroxide.

In particular embodiments, the techniques described herein relate to a geopolymer formulation, wherein: the sand is in an amount from 15% w/w to 50% w/w; the GGBFS is in an amount from 20% w/w to 70% w/w; the fly ash is in an amount from 12% w/w to 70% w/w; the sodium tetraborate is in an amount from 1.7% w/w to 3.3% w/w; the boric acid is in an amount from 0.4% w/w to 3% w/w; the zeolite is in an amount from 0.2% w/w to 2% w/w; the sodium caseinate is in an amount from 0.09% w/w to 0.14% w/w; the SC-9 is in an amount from 0.036% w/w to 0.11% w/w; the sodium metasilicate is in an amount between 6% w/w and 12% w/w; and the sodium hydroxide is in an amount between 6% w/w and 12% w/w.

In particular embodiments, the techniques described herein relate to a geopolymer formulation, further including: one or more of magnesium oxide, hemp, or a basalt fiber.

In particular embodiments, the techniques described herein relate to a geopolymer formulation, wherein: the magnesium oxide is in an amount between 0.02% w/w and 0.065% w/w; the hemp is in an amount between 1% w/w and 5% w/w; the basalt fiber is in an amount from about 0% w/w to about 3% w/w.

In particular embodiments, the techniques described herein relate to a geopolymer formulation, wherein the basalt fiber has a size from 1 mm to 50 mm.

In particular embodiments, the techniques described herein relate to a geopolymer formulation, wherein the basalt fiber has a size from about 6 mm to about 12 mm.

In particular embodiments, the techniques described herein relate to a geopolymer formulation, further including: aggregates for providing structural stability to the building material manufactured from the geopolymer formulation, and a filler for filling gaps between the aggregates.

In particular embodiments, the techniques described herein relate to a geopolymer formulation, wherein: the aggregate is selected from the group consisting of: recycled concrete aggregates (RCA), granite gravel, perlite, scoria, and non-recyclable plastics; the filler is selected from the group consisting of: limestone dust, cement, stone dust, brick dust, granulated basalt, fly ash, and pond ash.

In particular embodiments, the techniques described herein relate to a geopolymer formulation, wherein the aggregate is a recycled concrete aggregate (RCA).

In particular embodiments, the techniques described herein relate to a geopolymer formulation, wherein the filler is a one or more of fly ash, pond ash, or brick dust.

In particular embodiments, the techniques described herein relate to a geopolymer formulation, wherein: the aggregate is in an amount between 0% w/w and 50% w/w; the filler is in an amount between 0% w/w and 50% w/w.

In particular embodiments, the techniques described herein relate to a geopolymer formulation, wherein the sand is river sand, desert sand, concrete sand, pit sand, utility sand, manufactured sand, beach sand, coarse sand (a #2 sand), fill sand, manufactured sand (M sand), masonry sand, fine sand, plastering sand, crushed stone, crushed stone sand, sharp sand, white sand, fine crushed limestone gravel, glass sand, mason sand, other types of sand, low silica sand, high silica sand, washed sand, or any combinations thereof.

In particular embodiments, the techniques described herein relate to a geopolymer formulation, wherein: the sand is coarse sand or fine sand; the fly ash is a Class F fly ash or a Class C fly ash; the sodium tetraborate is sodium tetraborate pentahydrate; the zeolite is clinoptilolite; or the sodium caseinate is sodium caseinate 180.

In particular embodiments, the techniques described herein relate to a geopolymer formulation, including: sand in an amount from about 41% w/w to about 49% w/w; ground granulated blast furnace slag (GGBFS) in an amount from about 23% w/w to about 27% w/w; fly ash in an amount from about 12.6% w/w to about 15.4% w/w; one or more of sodium metasilicate in an amount from about 9% w/w to about 11% w/w or sodium hydroxide in an amount from about 9% w/w to about 11% w/w; sodium tetraborate in an amount from about 2.7% w/w to about 3.3% w/w; boric acid in an amount from about 0.45% w/w to about 3.0% w/w; hemp in an amount from about 0.9% w/w to about 1.1% w/w; zeolite in an amount from about 0.9% w/w to about 1.1% w/w; sodium caseinate in an amount from about 0.12% w/w to about 0.14% w/w; SC-9 in an amount from about 0.036% w/w to about 0.044% w/w; and basalt fibers in an amount from 0% w/w to about 2% w/w.

In particular embodiments, the techniques described herein relate to a geopolymer formulation, including: 44.38% w/w coarse sand; 25.1% w/w ground granulated blast furnace slag (GGBFS); 14.47% w/w fly ash; 9.39% w/w sodium metasilicate; 2.92% w/w sodium tetraborate; 0.49% w/w boric acid; 1.03% w/w hemp; 1.02% w/w zeolite; 0.13% w/w sodium caseinate; and 0.04% w/w SC-9.

In particular embodiments, the techniques described herein relate to a geopolymer formulation, including: sand in an amount from about 20% w/w to about 24% w/w; ground granulated blast furnace slag (GGBFS) in an amount from about 33% w/w to about 37% w/w; fly ash in an amount from about 23% w/w to about 27% w/w; one or more of sodium metasilicate in an amount from about 10.5% w/w to about 11.5% w/w or sodium hydroxide in an amount from about 10.5% w/w to about 11.5% w/w; sodium tetraborate in an amount from about 2.9% w/w to about 3.1% w/w; boric acid in an amount from about 1.4% w/w to about 3.0% w/w; hemp in an amount from 0% w/w to about 1.6% w/w; zeolite in an amount from about 0.39% w/w to about 0.41% w/w; sodium caseinate in an amount from about 0.09% w/w to about 0.11% w/w; SC-9 in an amount from about 0.059% w/w to about 0.061% w/w; magnesium oxide in an amount from 0% w/w to about 0.061% w/w; and basalt fibers in an amount from 0% w/w to about 2% w/w.

In particular embodiments, the techniques described herein relate to a geopolymer formulation, including: 21.89% w/w fine sand; 34.81% w/w ground granulated blast furnace slag (GGBFS); 25.20% w/w fly ash; 10.65% w/w sodium metasilicate; 2.91% w/w sodium tetraborate; 1.46% w/w boric acid; 1.43% w/w hemp; 0.37% w/w zeolite; 0.13% w/w sodium caseinate; 0.06% w/w SC-9; and 0.06% w/w magnesium oxide.

In particular embodiments, the techniques described herein relate to a geopolymer formulation, including: fine sand in an amount from about 13% w/w to about 16% w/w; coarse sand (#2 sand) in an amount from about 25% w/w to about 35% w/w; ground granulated blast furnace slag (GGBFS) in an amount from about 22% w/w to about 26% w/w; fly ash in an amount from about 16% w/w to about 18% w/w; one or more of sodium metasilicate in an amount from about 6.5% w/w to about 8.5% w/w or sodium hydroxide in an amount from about 6.5% w/w to about 8.5% w/w; sodium tetraborate in an amount from about 1.7% w/w to about 2.3% w/w; boric acid in an amount from about 0.5% w/w to about 3.0% w/w; hemp in an amount from about 0.5% w/w to about 1.5% w/w; zeolite in an amount from about 0.2% w/w to about 0.4% w/w; sodium caseinate in an amount from about 0.09% w/w to about 0.11% w/w; SC-9 in an amount from about 0.03% w/w to about 0.05% w/w; magnesium oxide in an amount from 0% w/w to about 0.05% w/w; basalt fibers in an amount from about 0.9% w/w to about 1.1% w/w; aggregates in an amount from about 0% w/w to about 50% w/w; and fillers in an amount from about 0% w/w to about 50% w/w.

In particular embodiments, the techniques described herein relate to a geopolymer formulation, including: 30.38% w/w coarse sand; 15.17% w/w fine sand; 24.13% w/w ground granulated blast furnace slag (GGBFS); 17.46% w/w fly ash; 7.38% w/w sodium metasilicate; 2.02% w/w sodium tetraborate; 1.01% w/w boric acid; 0.99% w/w hemp; 0.26% w/w zeolite; 0.09% w/w sodium caseinate; 0.04% w/w SC-9; 1.03% w/w basalt fibers; and 0.04% w/w magnesium oxide.

In particular embodiments, the techniques described herein relate to a geopolymer formulation, wherein the building material manufactured from the geopolymer formulation has: a compressive strength between 2000 psi and 12000 psi; a flexural strength between 700 psi and 1000 psi; a tensile strength between 600 psi and 900 psi; an impact resistance of about 3500 psi; or one or more of zero smoke spread, or zero flame spread.

In particular embodiments, the techniques described herein relate to a building material derived from a geopolymer formulation including: a sand, a ground granulated blast furnace slag (GGBFS), a fly ash, sodium tetraborate, a boric acid, a zeolite, a sodium caseinate, SC-9, and one or more of sodium metasilicate and sodium hydroxide; wherein the building material has one or more of: a compressive strength between 2000 psi and 12000 psi; a flexural strength between 700 psi and 1000 psi; a tensile strength between 600 psi and 900 psi; an impact resistance of about 3500 psi; or one or more of zero smoke spread, or zero flame spread.

In particular embodiments, the techniques described herein relate to a building material, wherein: the building material has a geopolymer formulation including: 30% w/w to 70% w/w fly ash; and 30% w/w to 70% w/w GGBFS; wherein the building material has a compressive strength between 5000 psi and 8500 psi.

In particular embodiments, the techniques described herein relate to a building material, further including: 18 mm basalt fiber in an amount of 1% w/w in the geopolymer formulation; and recycled concrete aggregate (RCA), wherein the geopolymer formulation to RCA ratio is 70% w/w to 30% w/w; wherein the building material has a compressive strength between 5000 psi and 6000 psi.

In particular embodiments, the techniques described herein relate to a building material, further including 18 mm basalt fiber in an amount of 1% w/w in the geopolymer formulation, wherein the geopolymer formulation includes sodium hydroxide and no sodium metasilicate, wherein the building material has a compressive strength of about 5810 psi.

In particular embodiments, the techniques described herein relate to a building material, further including 18 mm basalt fiber in an amount of 1% w/w in the geopolymer formulation, wherein the geopolymer formulation includes silica sand and low silica content sand in ratios between 100:0 w/w to 0:100 w/w, wherein the building material has a compressive strength between 7900 psi and 10000 psi.

In particular embodiments, the techniques described herein relate to a building material, wherein the building material has a tensile strength between 290 psi and 400 psi.

In particular embodiments, the techniques described herein relate to a building material, wherein the building material has a flexural strength of about 750 psi.

In particular embodiments, the techniques described herein relate to a building material, wherein the building material is characterized by a flame spread of less than 0 feet from a centerline of a flame source during a 30-minute flame exposure.

In particular embodiments, the techniques described herein relate to a building material, wherein the building material is characterized by a flame spread of less than 0 feet from a centerline of a burner during 30-minute flame exposure.

In particular embodiments, the techniques described herein relate to a building material, wherein the building material is characterized by a thermal resistivity between 2.0 and 2.77 m·K/W.

In particular embodiments, the techniques described herein relate to a building material, wherein a 50% cured building material has a compressive strength of about 3200 psi.

In particular embodiments, the techniques described herein relate to a building material, wherein the geopolymer formulation includes: sand in an amount from 15% w/w to 50% w/w; GGBFS in an amount from 20% w/w to 70% w/w; fly ash in an amount from 12% w/w to 70% w/w; sodium tetraborate in an amount from 1.7% w/w to 3.3% w/w; boric acid in an amount from 0.4% w/w to 3% w/w; zeolite in an amount from 0.2% w/w to 2% w/w; sodium caseinate in an amount from 0.09% w/w to 0.14% w/w; SC-9 in an amount from 0.036% w/w to 0.11% w/w; and one or more of sodium metasilicate in an amount between 6% w/w and 12% w/w or sodium hydroxide in an amount between 6% w/w and 12% w/w.

In particular embodiments, the techniques described herein relate to a building material, wherein the geopolymer formulation further includes one or more of magnesium oxide, hemp, or a basalt fiber.

In particular embodiments, the techniques described herein relate to a building material, wherein: the magnesium oxide is in an amount between 0.02% w/w and 0.065% w/w; the hemp is in an amount between 1% w/w and 5% w/w; the basalt fiber is in an amount from about 0% w/w to about 3% w/w.

In particular embodiments, the techniques described herein relate to a building material, wherein the geopolymer formulation further includes: aggregates for providing structural stability to the building material manufactured from the geopolymer formulation, and a filler for filling gaps between the aggregates.

In particular embodiments, the techniques described herein relate to a building material, wherein: the aggregate is selected from the group consisting of: recycled concrete aggregates (RCA), granite gravel, perlite, scoria, and non-recyclable plastics; and the filler is selected from the group consisting of: limestone dust, cement, stone dust, brick dust, granulated basalt, fly ash, and pond ash.

In particular embodiments, the techniques described herein relate to a building material, wherein the aggregate is a recycled concrete aggregate (RCA).

In particular embodiments, the techniques described herein relate to a building material, wherein: the aggregate is in an amount between about 0% w/w to about 50% w/w; and fillers in an amount from about 0% w/w to about 50% w/w.

In particular embodiments, the techniques described herein relate to a building material, wherein the geopolymer formulation includes: sand in an amount from about 41% w/w to about 49% w/w; ground granulated blast furnace slag (GGBFS) in an amount from about 23% w/w to about 27% w/w; fly ash in an amount from about 12.6% w/w to about 15.4% w/w; one or more of sodium metasilicate in an amount from about 9% w/w to about 11% w/w or sodium hydroxide in an amount from about 9% w/w to about 11% w/w; sodium tetraborate in an amount from about 2.7% w/w to about 3.3% w/w; boric acid in an amount from about 0.45% w/w to about 3.0% w/w; hemp in an amount from about 0.9% w/w to about 1.1% w/w; zeolite in an amount from about 0.9% w/w to about 1.1% w/w; sodium caseinate in an amount from about 0.12% w/w to about 0.14% w/w; SC-9 in an amount from about 0.036% w/w to about 0.044% w/w; and basalt fibers in an amount from 0% w/w to about 2% w/w.

In particular embodiments, the techniques described herein relate to a building material, wherein the geopolymer formulation includes: sand in an amount from about 20% w/w to about 24% w/w; ground granulated blast furnace slag (GGBFS) in an amount from about 33% w/w to about 37% w/w; fly ash in an amount from about 23% w/w to about 27% w/w; one or more of sodium metasilicate in an amount from about 10.5% w/w to about 11.5% w/w or sodium hydroxide in an amount from about 10.5% w/w to about 11.5% w/w; sodium tetraborate in an amount from about 2.9% w/w to about 3.1% w/w; boric acid in an amount from about 1.4% w/w to about 3.0% w/w; hemp in an amount from 0% w/w to about 1.6% w/w; zeolite in an amount from about 0.39% w/w to about 0.41% w/w; sodium caseinate in an amount from about 0.09% w/w to about 0.11% w/w; SC-9 in an amount from about 0.059% w/w to about 0.061% w/w; magnesium oxide in an amount from 0% w/w to about 0.061% w/w; and basalt fibers in an amount from 0% w/w to about 2% w/w.

In particular embodiments, the techniques described herein relate to a building material, wherein the geopolymer formulation includes: fine sand in an amount from about 13% w/w to about 16% w/w; coarse sand (#2 sand) in an amount from about 25% w/w to about 35% w/w; ground granulated blast furnace slag (GGBFS) in an amount from about 22% w/w to about 26% w/w; fly ash in an amount from about 16% w/w to about 18% w/w; one or more of sodium metasilicate in an amount from about 6.5% w/w to about 8.5% w/w or sodium hydroxide in an amount from about 6.5% w/w to about 8.5% w/w; sodium tetraborate in an amount from about 1.7% w/w to about 2.3% w/w; boric acid in an amount from about 0.5% w/w to about 3.0% w/w; hemp in an amount from about 0.5% w/w to about 1.5% w/w; zeolite in an amount from about 0.2% w/w to about 0.4% w/w; sodium caseinate in an amount from about 0.09% w/w to about 0.11% w/w; SC-9 in an amount from about 0.03% w/w to about 0.05% w/w; magnesium oxide in an amount from 0% w/w to about 0.05% w/w; basalt fibers in an amount from about 0.9% w/w to about 1.1% w/w; aggregates in an amount from about 0% w/w to about 50% w/w; and fillers in an amount from about 0% w/w to about 50% w/w.

In particular embodiments, the techniques described herein relate to a method of manufacturing a dry formulation including: obtaining various constituents of the dry formulation from one or more of a sand, a ground granulated blast furnace slag (GGBFS), a fly ash, sodium tetraborate, a boric acid, a zeolite, a sodium caseinate, SC-9, sodium metasilicate and sodium hydroxide; and mixing the constituents to a homogenous mixture.

In particular embodiments, the techniques described herein relate to a method, wherein: (a) the various constituents are mixed in a single batch; or (b) the various constituents are mixed in two or more batches, each batch including: preparing a first homogenous mixture including: obtaining a first batch of constituents; mixing said first batch of constituents to obtain the first homogenous mixture; preparing a next homogenous mixture including: adding a next batch of constituents to the first homogenous mixture; mixing said next batch of constituents with the first homogenous mixture to obtain a next homogenous mixture; and repeating the preparing for each subsequent batch of constituents and homogenous mixture obtained in a prior mixing step.

In particular embodiments, the techniques described herein relate to a method, wherein: the sand is in an amount from 15% w/w to 50% w/w in the dry formulation; the GGBFS is in an amount from 20% w/w to 70% w/w in the dry formulation; the fly ash is in an amount from 12% w/w to 70% w/w in the dry formulation; the sodium tetraborate is in an amount from 1.7% w/w to 3.3% w/w in the dry formulation; the boric acid is in an amount from 0.4% w/w to 3% w/w in the dry formulation; the zeolite is in an amount from 0.2% w/w to 2% w/w in the dry formulation; the sodium caseinate is in an amount from 0.09% w/w to 0.14% w/w in the dry formulation; the SC-9 is in an amount from 0.036% w/w to 0.11% w/w in the dry formulation; the sodium metasilicate is in an amount between 6% w/w and 12% w/w in the dry formulation; and the sodium hydroxide is in an amount between 6% w/w and 12% w/w in the dry formulation.

In particular embodiments, the techniques described herein relate to a method, further including adding one or more of: a basalt fiber; magnesium oxide; or aggregates that provides structural stability to a building material manufactured from the formulation and a filler to fill gaps between the aggregates.

In particular embodiments, the techniques described herein relate to a method, wherein: the basalt fiber is in an amount from about 0% w/w to about 3% w/w; the magnesium oxide is in an amount between 0.02% w/w and 0.065% w/w; the aggregate is in an amount between about 0% w/w to about 50% w/w; and fillers in an amount from about 0% w/w to about 50% w/w in the dry formulation.

In particular embodiments, the techniques described herein relate to a method, further including packaging and storing the formulation in dry form prior to use.

In particular embodiments, the techniques described herein relate to a method of manufacturing a building material including: (i) obtaining a dry geopolymer formulation; (ii) hydrating said formulation; (iii) mixing the hydrated formulation; (iv) dispensing the formulation; and (v) curing the formulation.

In particular embodiments, the techniques described herein relate to a method, wherein dispensing includes pumping or spraying said formulation.

In particular embodiments, the techniques described herein relate to a method, further including screeding, troweling, or finishing after the dispensing.

In particular embodiments, the techniques described herein relate to a method, wherein the curing is performed at about 30° F. to about 100° F. or using infrared heat.

In particular embodiments, the techniques described herein relate to a method, wherein the formulation is cured for a period between 20 minutes and 24 hours, between 12 hours and 48 hours, or between 1 day and 14 days.

In particular embodiments, the techniques described herein relate to a method, wherein the hydration uses water selected from, one or more of potable water, wash water, underground water, agriculture water, or sea water.

In particular embodiments, the techniques described herein relate to a method, wherein the hydration uses sea water.

In particular embodiments, the techniques described herein relate to a method, wherein the building material is an exterior wall covering, an exterior standalone wall system, a roofing, an accessory dwelling unit, a stucco, a lap siding, an applied stone, a tile, a shingle, and a sheet good, a soffit panel, or a waterproofing concrete.

In particular embodiments, the techniques described herein relate to a method, wherein the building material manufactured from the formulation includes: sand in an amount from 15% w/w to 50% w/w; GGBFS in an amount from 20% w/w to 70% w/w; fly ash in an amount from 12% w/w to 70% w/w; sodium tetraborate in an amount from 1.7% w/w to 3.3% w/w; boric acid in an amount from 0.4% w/w to 3% w/w; zeolite in an amount from 0.2% w/w to 2% w/w; sodium caseinate in an amount from 0.09% w/w to 0.14% w/w; SC-9 in an amount from 0.036% w/w to 0.11% w/w; and one or more of sodium metasilicate in an amount between 6% w/w and 12% w/w or sodium hydroxide in an amount between 6% w/w and 12% w/w.

In particular embodiments, the techniques described herein relate to a method, wherein the building material manufactured from the formulation further includes one or more: magnesium oxide in an amount between 0.02% w/w and 0.065% w/w; hemp in an amount between 1% w/w and 5% w/w; basalt fiber in an amount from about 0% w/w to about 3% w/w; an aggregate for providing structural stability to the building material, wherein the aggregate is in an amount between 0% w/w and 50% w/w; or a filler for filling gaps between the aggregates wherein the filler is in an amount between 0% w/w and 50% w/w.

The embodiments disclosed herein are only examples, and the scope of this disclosure is not limited to them. Particular embodiments may include all, some, or none of the molecules, compositions, components, elements, features, functions, operations, or steps of the embodiments disclosed herein. Embodiments according to the invention are in particular disclosed in the attached claims directed to a method or a composition, wherein any feature mentioned in one claim category, e.g., method, can be claimed in another claim category, e.g., composition, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1A shows a traditional wall system comprising approximately 10 layers of different building materials. FIG. 1B shows an exemplary 4-layer wall system comprising the building materials disclosed herein. FIG. 1C shows another exemplary wall system comprising the building materials disclosed herein.

FIG. 2A illustrates an assembled base pallet used for constructing an Accessory Dwelling Unit (ADU). FIG. 2B illustrates an exemplary ADU with cured Formulation A on the exterior. FIG. 2C shows a photograph of an exemplary ADU.

FIG. 2C illustrates an exemplary siding. FIG. 2D illustrates an exemplary siding. FIG. 2E illustrates an exemplary tile.

FIG. 3A shows one test wall comprising paper and lath over an oriented strand board (OSB), a second test wall comprising chicken wire over OSB, and a third test wall comprising OSB alone. FIG. 3B shows application of an exemplary Formulation A on all three wall types described in FIG. 3A. FIG. 3C shows the formulation after curing on the surface of the walls. FIG. 3D shows the finished walls after curing.

FIG. 5A shows a sphere made using Formulation A cut in half. FIG. 5B shows the cut hemispheres glued together using Formulation A.

FIG. 8A exemplary four concrete test samples (specimens #1 to specimen #4) made using the formulations disclosed herein. FIG. 8B shows the surface and interior temperatures of specimen #1 as a function of time. FIG. 8C shows the surface and interior temperatures of specimen #2 as a function of time. FIG. 8D shows the surface and interior temperatures of specimen #3 as a function of time. FIG. 8E shows the surface and interior temperatures of specimen #4 as a function of time. FIG. 8F shows the surface and interior temperatures as a function of time.

FIG. 9A shows the results of a flame spread test performed on the sample. FIG. 9B shows the results of a smoke formation test performed on the sample. FIG. 9C shows the results of a temperature test performed on the sample.

FIG. 10A shows a view of the sample surface ("hot side") before the heat flow meter test. FIG. 10B shows a view of the sample surface ("hot side") after the heat flow meter test. FIG. 10C shows a view of the sample surface not exposed to the heat ("cold side").

FIG. 11A depicts the pilot-scale furnace used for testing the wall assembly. FIG. 11B illustrates locations of the eight (8) thermocouples used for monitoring interior and unexposed temperatures.

FIG. 13A shows the exposed face of the wall assembly before the test. FIG. 13B shows the exposed face of the wall assembly after the test. FIG. 13C shows the unexposed face of the wall assembly.

FIG. 14A illustrates a method for making the dry formulation. FIG. 14B illustrates a method for making a building material from the dry formulation.

DESCRIPTION OF EXAMPLE EMBODIMENTS

Figure 1A:
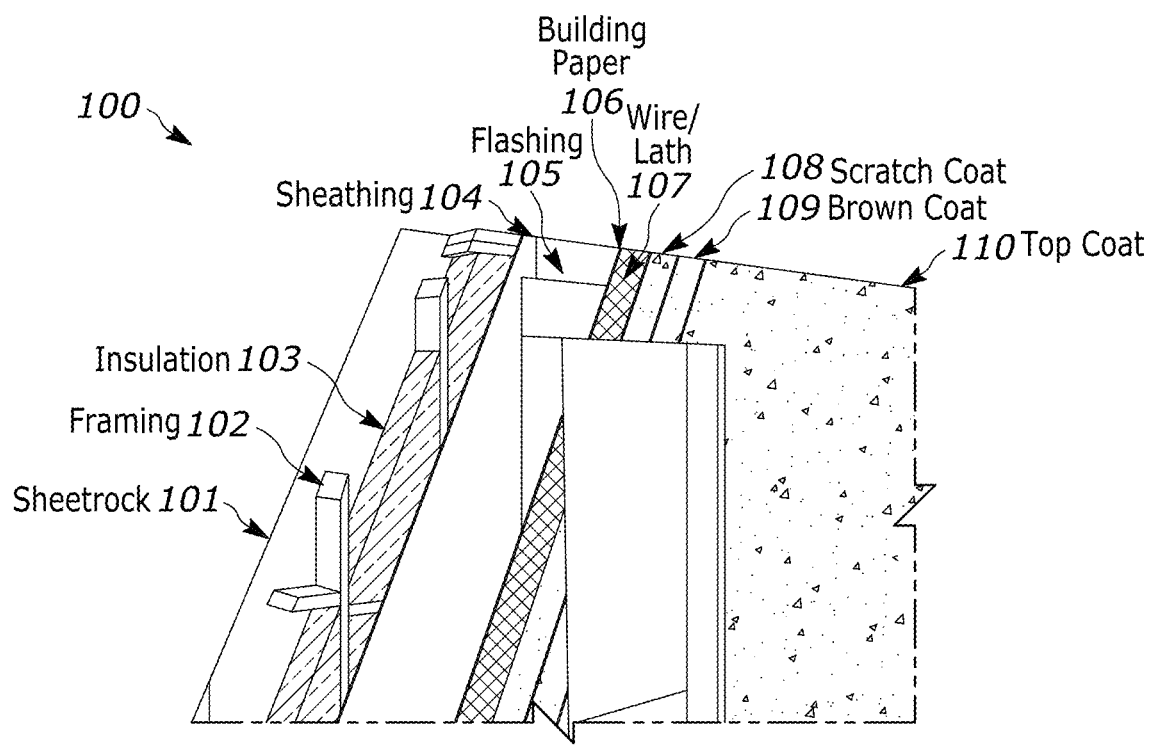
FIGS. 1A-1C illustrates a comparison of a traditional framed wall system and exemplary wall systems constructed using the building materials of the presently disclosed subject matter.

The presently disclosed subject matter provides formulations for building materials, products manufactured using these formulations, and methods of using the formulations in building new constructing and renovating existing constructions. For clarity of description, and not by way of limitation, the description here is divided into the following subsections:
1. Definitions
2. Geopolymer Formulations.
3 Geopolymer Construction Materials
4. Method of Manufacture
5 Examples
6. Recitation of Embodiments 1. Definitions As used herein, the following terms have the meanings ascribed to them below, unless specified otherwise.ABbreviations used herein have their conventional meaning within the chemical and construction arts.

As used in the specification and the appended claims, the singular forms "a", "an" and "the" include plural referents unless the context clearly dictates otherwise. Thus, for example, a reference to "a compound" includes mixtures of compounds.

The recitation herein of numerical ranges by endpoints is intended to include all numbers subsumed within that range. For example, a recitation of 1 to 5 includes 1, 1.5, 2, 2.75, 3, 3.80, 4, 4.32, and 5. Similarly, reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Similarly, pH ranges from 7.0 to 9.0 includes pH values 7.0, 7.2, 7.3, 7.4, 7.5, 7.6, 7.7, 7.8, 7.9, 8.0 and so on including 8.9 and 9.0.

As used herein, the terms "about" or "approximately" mean within an acceptable error range for the particular value as determined by one of ordinary skill in the art, which will depend in part on how the value is measured or determined, i.e., the limitations of the measurement system. For example, "approximately" can mean within 3 or more than 3 standard deviations, per the practice in the art. Alternatively, "approximately" can mean a range of up to 20%, preferably up to 10%, more preferably up to 5%, and more preferably still up to 1% of a given value. Alternatively, particularly with respect to chemical systems or processes, the term can mean within an order of magnitude, preferably within 5-fold, and more preferably within 2-fold, of a value.

The expression "and/or" where used herein is to be taken as specific disclosure of each of the two specified features or components with or without the other.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of," and "consisting essentially of," the embodiments or elements presented herein, whether explicitly set forth or not.

The term "ratio" or "ratios" as used herein when referring to relative amounts of two or more agents refers to relative amounts of these agents not limited to mole ratios (e.g., mole/mole), weight ratios (e.g. w/w, g/g, g/kg, % w/w,% g/g. % g/kg), volume ratios (v/v, e.g., L/L), or weight/volume (w/v, e.g., g/L, mg/mL).

As used herein, the term "sand" and the expression "any type of sand" refers to any sand regardless of its source. Non-limiting examples of sand include, river sand, desert sand, concrete sand, pit sand, utility sand, manufactured sand, beach sand, coarse sand, fill sand, manufactured sand (M sand), masonry sand, fine sand, plastering sand, crushed stone, crushed stone sand, sharp sand, white sand, fine crushed limestone gravel, glass sand, mason sand, other types of sand, low silica sand, high silica sand, and washed sand. A combination of different types of sand can also be used.

As used herein the terms "accessory dwelling unit" or "ADU" and "tiny home" are used synonymously to refer to any type of single-story dwelling structures built either on a foundation or as a mobile structure. As used herein, the geopolymer formulations and building materials manufactured using such formulations can be used in construction of ADUs and/or tiny homes.

2. Geopolymer Formulations

The presently disclosed subject matter is directed to geopolymer formulations for use in manufacturing building materials. In particular embodiments, the geopolymer formulations comprise one or more types of sand, ground granulated blast furnace slag (GGBGS), fly ash, sodium metasilicate, sodium tetraborate, boric acid, magnesium oxide, hemp, a zeolite, a sodium caseinate, sulfonated polymer (SC-9), and basalt fibers.

In particular embodiments, the geopolymer formulations comprise one or more types of sand, ground granulated blast furnace slag (GGBFS), fly ash sodium metasilicate, sodium tetraborate, boric acid, hemp, a zeolite, sodium caseinate, SC-9, and basalt fibers. In particular embodiments, the geopolymer formulations comprise sand, ground granulated blast furnace slag (GGBFS), fly ash sodium metasilicate, sodium tetraborate, boric acid, hemp, a zeolite, sodium caseinate, and SC-9.

In particular embodiments, the geopolymer formulations comprise one or more types of sand, GGBFS, fly ash sodium metasilicate, sodium tetraborate, boric acid, hemp, a zeolite, sodium caseinate, and SC-9. In particular embodiments, the geopolymer formulations comprise sand, GGBFS, fly ash sodium metasilicate, sodium tetraborate, boric acid, magnesium oxide, hemp, a zeolite, sodium caseinate, and SC-9.

In particular embodiments, the geopolymer formulations comprise sand, GGBFS, fly ash sodium metasilicate, sodium tetraborate, boric acid, hemp, a zeolite, sodium caseinate, SC-9, and basalt fibers. In particular embodiments, the geopolymer formulations comprise sand, GGBFS, fly ash sodium metasilicate, sodium tetraborate, boric acid, magnesium oxide, hemp, a zeolite, sodium caseinate, SC-9 and basalt fibers.

The presently disclosed subject matter comprises geopolymer formulations that comprises any size of sand including, coarse, medium and fine sand that can be used in manufacturing building materials disclosed herein. In particular embodiments, the sand is #2 Sand (coarse sand). In particular embodiments, the sand is Fine Sand. In particular embodiments, the formulation comprises both #2 Sand and Fine Sand. In particular embodiments, the sand is inland sand. In particular embodiments, the sand is desert sand. In particular embodiments, the sand is an industry standard building sand.

In particular embodiments, the sand comprises at least 85% silica dioxide. In particular embodiments, the geopolymer formulations comprise sand devoid of any silicon dioxide. In particular embodiments, the sand in the geopolymer formulations comprise aluminum. In particular embodiments, the sand in the geopolymer formulations comprise aluminum oxide.

The presently disclosed subject matter comprises geopolymer formulations that comprises any type of fly ash that can be used in manufacturing building materials. In particular embodiments, the fly ash is a Class C fly ash. In particular embodiments, the fly ash is a Class F fly ash. In particular embodiments, the Class F fly ash can be combined with natural pozzolans. In particular embodiments, the Class F fly ash can be combined with scoria.

The presently disclosed subject matter also comprises geopolymer formulations that comprises any type of basalt fiber known in the art to provide reinforcement to manufacturing building materials. In particular embodiments, the basalt fiber is a microfiber having a size from about 1 mm to about 12 mm. In non-limiting examples, the microfiber is a 1 mm, 3 mm, 6 mm, 9 mm, or 12 mm microfiber. In particular embodiments, the basalt fiber is a microfiber having a size from about 6 mm to about 12 mm. In particular embodiments, the basalt fiber is a microfiber having a size from about 6 mm to about 8 mm. In particular embodiments, the basalt fiber is a microfiber having a size from about 7 mm to about 9 mm. In particular embodiments, the basalt fiber is a microfiber having a size from about 8 mm to about 10 mm. In particular embodiments, the basalt fiber is a microfiber having a size from about 9 mm to about 11 mm. In particular embodiments, the basalt fiber is a microfiber having a size from about 10 mm to about 12 mm. In particular embodiments, the basalt fiber is a macrofiber having a size from about 12 mm to about 50 mm. In particular embodiments, the basalt fiber is a macrofiber having a size greater than 50 mm. In particular embodiments, the basalt fiber is in "mini bar form".

The presently disclosed subject matter also comprises geopolymer formulations that comprises a sodium metasilicate. In a particular embodiment, the formulation comprises anhydrous sodium metasilicate. In a particular embodiment, the sodium metasilicate is used with sodium hydroxide. In a particular embodiment, the sodium metasilicate is replaced with sodium hydroxide.

The presently disclosed subject matter also comprises geopolymer formulations that comprises a sodium tetraborate. Non-limiting examples of sodium tetraborate include sodium tetraborate pentahydrate, sodium tetraborate octahydrate and sodium tetraborate decahydrate. In a particular embodiment, the formulation comprises sodium tetraborate pentahydrate.

The presently disclosed subject matter also comprises geopolymer formulations that comprises a sodium caseinate. One non-limiting example of a sodium caseinate is sodium caseinate 180.

The presently disclosed subject matter comprises geopolymer formulations that comprises any type of zeolite that can be used in manufacturing building materials. One non-limiting example of a zeolite is clinoptilolite.

The presently disclosed subject matter is directed to geopolymer formulations that comprise one or more types of aggregates. Aggregates provide structural stability and improve load-bearing capacity of the final building materials (e.g., a wall system) manufactured using the geopolymer formulations. They can also reduce the amount of binder needed during manufacturing, thereby providing overall workability and economic benefits. Aggregates include but are not limited to recycled concrete aggregates (RCA), granite gravel, perlite, scoria and non-recyclable plastics. In particular embodiments, the aggregate is RCA, perlite, scoria or granite. A combination of various types of aggregates can also be used. In particular embodiments, the aggregates are used in geopolymer formulations for "poured-in-place" applications (e.g., Formulation C, see below). The inclusion of aggregates including RCA and non-recyclable plastics introduces eco-friendly practices to manufacturing of products encompassed in the presently disclosed subject matter as it reduces environmental burden by avoiding return of non-recyclable materials to the soil, ocean/sea, and/or water table. The low costs associated with procuring such aggregates also provides economic advantages by reducing overall manufacturing costs.

In particular embodiments, the aggregate is in an amount from about 0% w/w to about 50% w/w. In particular embodiments, the aggregate is in an amount from about 10% w/w to about 50% w/w. In particular embodiments, the aggregate is in an amount from about 20% w/w to about 50% w/w. In particular embodiments, the aggregate is in an amount from about 30% w/w to about 50% w/w.

The presently disclosed subject matter is directed to geopolymer formulations that comprise one or more types of fillers. Fillers fill the gaps between the aggregates and the binder, improve workability and reduce the amount of cement needed without compromising strength. Non-limiting examples of such fillers include, limestone dust, cement, stone dust, granulated basalt, brick dust, fly ash, and pond ash. A combination of various types of fillers can also be used. In particular embodiments the filler is one or more of fly ash, pond ash, or brick dust.

In particular embodiments, the filler is granulated basalt. In particular embodiments, the granulated basalt has a size ranging from about 1/16-inch to about 1/8-inch. In particular embodiments the granulated basalt has a size ranging from about 3/16-inch to about 1/2-inch. In particular embodiments granulated basalt having a size from 1/16-inch to 1/8-inch can be used in spray applications.

In particular embodiments, the filler is in an amount from about 0% w/w to about 50% w/w. In particular embodiments, the filler is in an amount from about 10% w/w to about 50% w/w. In particular embodiments, the filler is in an amount from about 20% w/w to about 50% w/w. In particular embodiments, the filler is in an amount from about 30% w/w to about 50% w/w. In particular embodiments, the filler is in an amount from about 40% w/w to about 50% w/w. In particular embodiments, the filler is in an amount from about 10% w/w to about 25% w/w. In particular embodiments, the filler is in an amount from about 25% w/w to about 50% w/w.

Table 1 shows exemplary formulations with ranges for the various components discussed above.

TABLE 1

Exemplary Formulations:

| Exemplary Components (Constituents) | Exemplary Range (% w/w) | Exemplary Function(s) |
|---|---|---|
| FORMULATION A | | |
| #2 Sand | 41%-49% | strength, stability, filler |
| Ground Granulated Blast Furnace Slag (GGBFS) | 23%-27% | strength-enhancing, improves durability of concrete |
| Fly Ash | 12.6%-15.4% | reduces cracking, permeability, and bleeding |
| Sodium Metasilicate and/or sodium hydroxide | 9%-11% | accelerate curing, fire retardant |
| Sodium Tetraborate | 2.7%-3.3% | heat and sound insulator, fire retardant, pH buffering, resistance to mold, mildew |
| Boric Acid | 0.45%-3% | fire retardant, pH buffering, resistance to mold, mildew |
| Hemp | 0.9%-1.1% | insulation, filler |
| Zeolite | 0.9%-1.1% | anti-corrosion, strengths hardness, prevents crack formation, provides sulfate resistance |
| Sodium Caseinate | 0.12%-0.14% | emulsifier, binder, liquefier, self-leveler |
| SC-9 | 0.036%-0.044% | dispersant |
| Basalt Fibers | 0%-3% | increases tensile & flexural strength, reduce cracking and chipping |
| Aggregates | 0%-50% | improved structural stability, load-bearing capacity, economic benefits |
| Fillers | 0%-50% | improved workability, economic benefits |
| Water§ | 10%-30% | — |
| FORMULATION B | | |
| Fine Sand | 20%-24% | strength, stability, filler |
| Ground Granulated Blast Furnace Slag (GGBFS) | 33%-37% | strength-enhancing, improves durability of concrete |
| Fly Ash | 23%-27% | reduces cracking, permeability, and bleeding |
| Sodium Metasilicate and/or sodium hydroxide | 10.5%-11.5% | accelerate curing, fire retardant |
| Sodium Tetraborate | 2.9%-3.1% | heat and sound insulator, fire retardant, pH buffering, resistance to mold, mildew |

TABLE 1-continued

Exemplary Formulations:

| Exemplary Components (Constituents) | Exemplary Range (% w/w) | Exemplary Function(s) |
|---|---|---|
| Boric Acid | 1.4%-3% | fire retardant, pH buffering, resistance to mold, mildew |
| Hemp | 0%-1.6% | insulation, filler |
| Zeolite | 0.39%-0.41% | anti-corrosion, strengths hardness, prevents crack formation, provides sulfate resistance |
| Sodium Caseinate | 0.09%-0.11% | emulsifier, binder, liquefier, self-leveler |
| SC-9 | 0.059%-0.061% | dispersant |
| Magnesium Oxide | 0.0%-0.061% | strength, fire resistance, improve resistance to mold, mildew, moisture, and weather |
| Basalt Fibers | 0%-3% | increases tensile and flexural strength, reduce cracking and chipping |
| Aggregates | 0%-20% | improved structural stability, load-bearing capacity, economic benefits |
| Fillers | 0%-50% | improved workability, economic benefits |
| Water[§] | 10%-30% | — |
| FORMULATION C | | |
| Fine sand | 15% | strength, stability, filler |
| #2 Sand | 25%-35% | strength, stability, filler |
| Ground Granulated Blast Furnace Slag (GGBFS) | 22%-26% | strength-enhancing, improves durability of concrete |
| Fly Ash | 16%-18% | reduces cracking, permeability, and bleeding |
| Sodium Metasilicate and/or sodium hydroxide | 6.5%-8.5% | accelerate curing, fire retardant |
| Sodium Tetraborate | 1.7%-2.3% | heat and sound insulator, fire retardant, pH buffering, resistance to mold, mildew |
| Boric Acid | 0.5%-3% | fire retardant, pH buffering, resistance to mold, mildew |
| Hemp | 0.5%-1.5% | insulation, filler |
| Zeolite | 0.2%-0.4% | anti-corrosion, strengths hardness, prevents crack formation, provides sulfate resistance |
| Sodium Caseinate | 0.09%-0.11% | emulsifier, binder, liquefier, self-leveler |
| SC-9 | 0.03%-0.05% | dispersant |
| Basalt Fibers | 0%-3% | increases tensile and flexural strength, reduce cracking and chipping |
| Magnesium Oxide | 0.0%-0.05% | strength, fire resistance, improve resistance to mold, mildew, moisture, and weather |
| Aggregates | 0%-50% | improved structural stability, load-bearing capacity, economic benefits |
| Fillers | 0%-50% | improved workability, economic benefits |
| Water[§] | 10%-30% | — |

[§]formulation is stored in dry form and mixed with water prior to use.

In particular embodiments, the sand is a coarse, medium and/or fine sand that can be used in manufacturing building materials disclosed herein. In particular embodiments, the sand is #2 Sand (coarse sand). In particular embodiments, the sand is Fine Sand. In particular embodiments, the formulation comprises both #2 Sand and Fine Sand. In particular embodiments, the sand is inland sand. In particular embodiments, the sand is desert sand. In particular embodiments, the sand is an industry standard building sand.

In particular embodiments, the geopolymer formulations comprise sand devoid of any silicon dioxide. In particular embodiments, the geopolymer formulations comprise sand in an amount from about 22% w/w to about 50% w/w. In particular embodiments, the geopolymer formulations comprise sand in an amount from about 22% w/w to about 30% w/w. In particular embodiments, the geopolymer formulations comprise sand in an amount from about 25% w/w to about 40% w/w. In particular embodiments, the geopolymer formulations comprise sand in an amount from about 35% w/w to about 50% w/w. In particular embodiments, the geopolymer formulations comprise sand in an amount of about 22% w/w. In particular embodiments, the geopolymer formulations comprise sand in an amount of about 45% w/w. In particular embodiments, the geopolymer formulations comprise sand in an amount of about 50% w/w. In particular embodiments, the sand comprises a silicon dioxide content of 95% or greater.

In particular embodiments, the sand in the geopolymer formulations comprise aluminum. In particular embodiments, the sand in the geopolymer formulations comprise aluminum oxide. In particular embodiments, the sand in the geopolymer formulations is devoid of any silicon dioxide and comprises aluminum.

In particular embodiments, the geopolymer formulations comprise ground granulated blast furnace slag (GGBFS) in an amount from about 30% w/w to about 70% w/w. In particular embodiments, the geopolymer formulations comprise ground granulated blast furnace slag (GGBFS) in an amount from about 30% w/w to about 40% w/w. In particular embodiments, the geopolymer formulations comprise ground granulated blast furnace slag (GGBFS) in an amount from about 35% w/w to about 45% w/w. In particular embodiments, the geopolymer formulations comprise ground granulated blast furnace slag (GGBFS) in an amount from about 40% w/w to about 50% w/w. In particular embodiments, the geopolymer formulations comprise ground granulated blast furnace slag (GGBFS) in an amount from about 45% w/w to about 60% w/w. In particular embodiments, the geopolymer formulations comprise ground granulated blast furnace slag (GGBFS) in an amount from about 55% w/w to about 70% w/w. In particular embodiments, the geopolymer formulations comprise ground granulated blast furnace slag (GGBFS) in an amount of about 30% w/w. In particular embodiments, the geopolymer formulations comprise ground granulated blast furnace slag (GGBFS) in an amount of about 40% w/w. In particular embodiments, the geopolymer formulations comprise ground granulated blast furnace slag (GGBFS) in an amount of about 50% w/w. In particular embodiments, the geopolymer formulations comprise ground granulated blast furnace slag (GGBFS) in an amount of about 60% w/w. In particular embodiments, the geopolymer formulations comprise ground granulated blast furnace slag (GGBFS) in an amount of about 70% w/w.

In particular embodiments, the geopolymer formulations comprise fly ash in an amount from about 30% w/w to about 70% w/w. In particular embodiments, the geopolymer formulations comprise fly ash in an amount from about 30% w/w to about 40% w/w. In particular embodiments, the geopolymer formulations comprise fly ash in an amount from about 35% w/w to about 45% w/w. In particular embodiments, the geopolymer formulations comprise fly ash in an amount from about 40% w/w to about 50% w/w. In particular embodiments, the geopolymer formulations comprise fly ash in an amount from about 45% w/w to about 60% w/w. In particular embodiments, the geopolymer formulations comprise fly ash in an amount from about 55% w/w to about 70% w/w. In particular embodiments, the geopolymer formulations comprise fly ash in an amount of about 30% w/w. In particular embodiments, the geopolymer formulations comprise fly ash in an amount of about 40% w/w. In particular embodiments, the geopolymer formulations comprise fly ash in an amount of about 50% w/w. In particular embodiments, the geopolymer formulations comprise fly ash in an amount of about 60% w/w. In particular embodiments, the geopolymer formulations comprise fly ash in an amount of about 70% w/w.

In particular embodiments, the geopolymer formulations comprise sodium metasilicate in an amount from about 7% w/w to about 15% w/w. In particular embodiments, the geopolymer formulations comprise sodium metasilicate in an amount of about 7.5% w/w. In particular embodiments, the geopolymer formulations comprise sodium metasilicate in an amount of about 9.0% w/w. In particular embodiments, the geopolymer formulations comprise sodium metasilicate in an amount of about 10.65% w/w. In particular embodiments, the geopolymer formulations comprise sodium metasilicate in an amount of about 15% w/w.

In particular embodiments, the geopolymer formulations comprise sodium tetraborate in an amount from about 2% w/w to about 3% w/w.

In particular embodiments, the geopolymer formulations comprise boric acid in an amount from about 0.45% w/w to about 3.0% w/w.

In particular embodiments, the geopolymer formulations comprise magnesium oxide in an amount from about 0.02% w/w to about 0.06% w/w. In particular embodiments, the geopolymer formulations comprise magnesium oxide in an amount of about 0.02% w/w. In particular embodiments, the geopolymer formulations comprise magnesium oxide in an amount of about 0.04% w/w. In particular embodiments, the geopolymer formulations comprise magnesium oxide in an amount of about 0.06% w/w.

In particular embodiments, the geopolymer formulations comprise hemp in an amount from about 1% w/w to about 5% w/w.

In particular embodiments, the geopolymer formulations comprise zeolites in an amount from about 0.5% w/w to about 2% w/w.

In particular embodiments, the geopolymer formulations comprise sodium caseinate in an amount from about 0.05% w/w to about 1% w/w.

In particular embodiments, the geopolymer formulations comprise SC-9 in an amount from about 0.02% w/w to about 1% w/w.

In particular embodiments, the geopolymer formulations comprise basalt fibers in an amount from about 0% w/w to about 3% w/w.

Storage The dry formulation mix is packaged, sealed, and stored in a dry environment below 90° F., away wet and humid conditions and without exposure to direct sunlight until ready for use.

3. Geopolymer Construction Materials

Figure 1B:
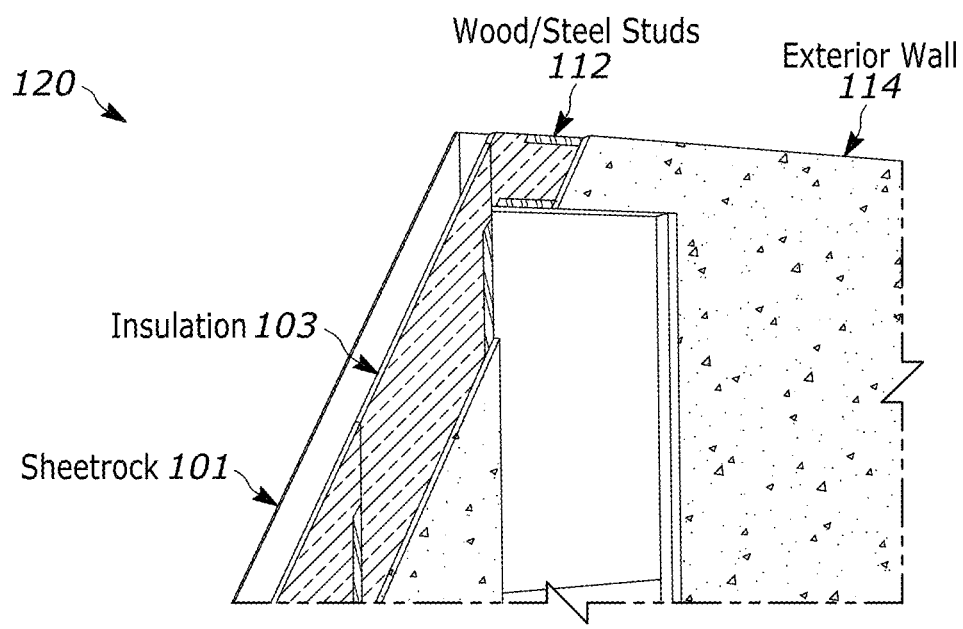
Figure 1C:
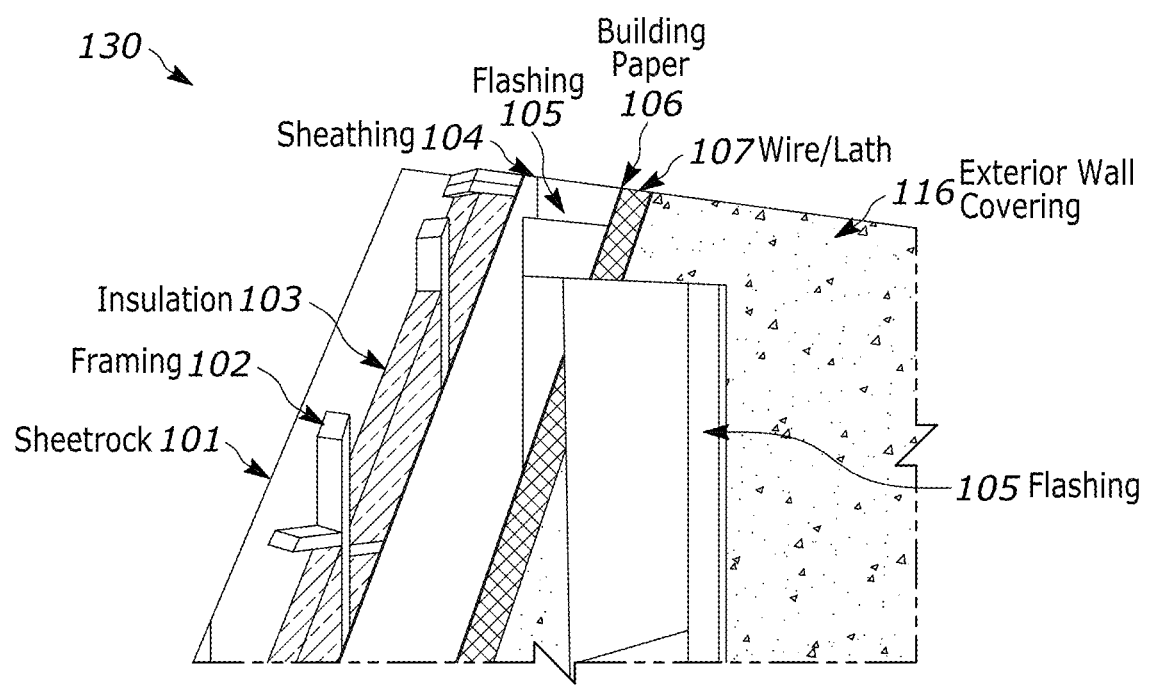

FIGS. 1A-1C illustrates a traditional framed wall system 100 and exemplary wall systems 120 and 130 constructed using the building materials of the presently disclosed subject matter. FIG. 1A shows a traditional wall system 100 comprising approximately 10 layers of different building materials from interior to exterior-sheetrock 101, framing 102, insulation 103, sheathing 104, flashing 105, building paper 106, wire/lath 107, scratch coat 108, brown coat 109 and top-coat 110. FIG. 1B shows a first exemplary 4-layer wall system 120 for use in new construction. The wall system 120 comprises sheetrock 101, insulation 103, studs 112, and a four-inch exterior wall 114, manufactured using the geopolymer formulation disclosed herein. FIG. 1C shows a second exemplary wall system 130 for use in new or existing construction. The wall system 130 comprises sheetrock 101, framing 102, insulation 103, sheathing 104, flashing 105, building paper 106, wire/lath 107, and a one-inch exterior wall covering 116, manufactured using the geopolymer formulation disclosed herein.

Traditional framed wall systems require approximately 10 layers of different building materials i.e., 10 revolutions around the structure (FIG. 1A). From the exterior topcoat of stucco to the finished sheetrock interior, each of these layers require a different skill set and manpower. In one embodiment, the wall system of the subject matter disclosed herein eliminates all but 4 layers, including any combustible materials (FIG. 1B). In one embodiment, the wall system of the subject matter disclosed herein eliminates all but 8 layers (FIG. 1C). This allows for a dramatic reduction of construction time, labor costs and potential application errors. Most importantly, it allows for a safer, faster, stronger, and longer lasting finished product that emulates the properties and appearance of traditional structures. Further, because of its unique properties, the subject matter disclosed herein allows for new architectural designs, applications, speed, and cost of production that have not been previously achievable.

To address the loss of property and life due to natural disasters, different types of building materials are disclosed in the embodiments as discussed above. For example, one type of building material is an exterior wall covering not limited to stucco, lap siding, and applied stone for use with new or pre-existing structures.

Figure 2A:
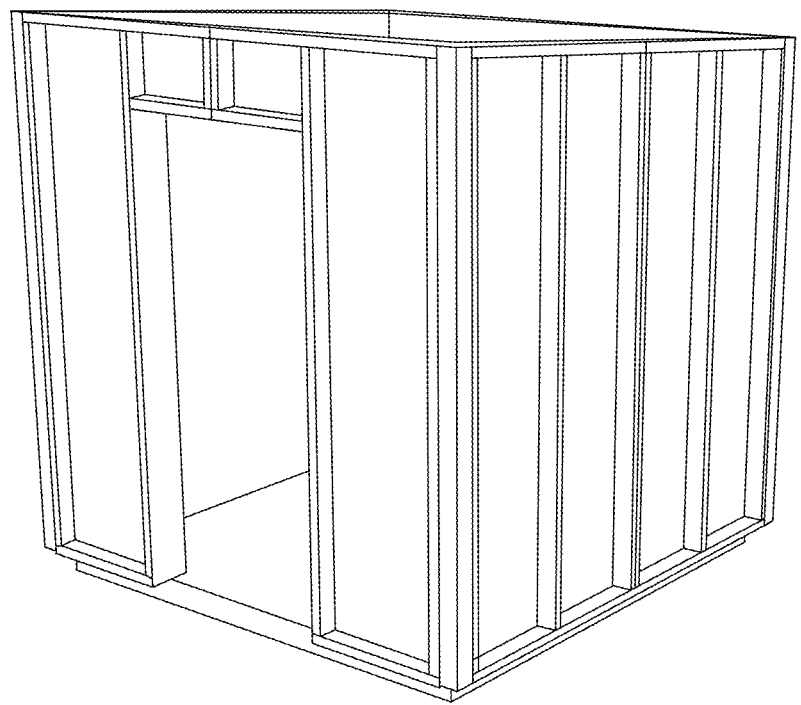
FIGS. 2A-2E illustrates construction of an exemplary building material manufactured using the geopolymer formulations disclosed herein.
Figure 2B:
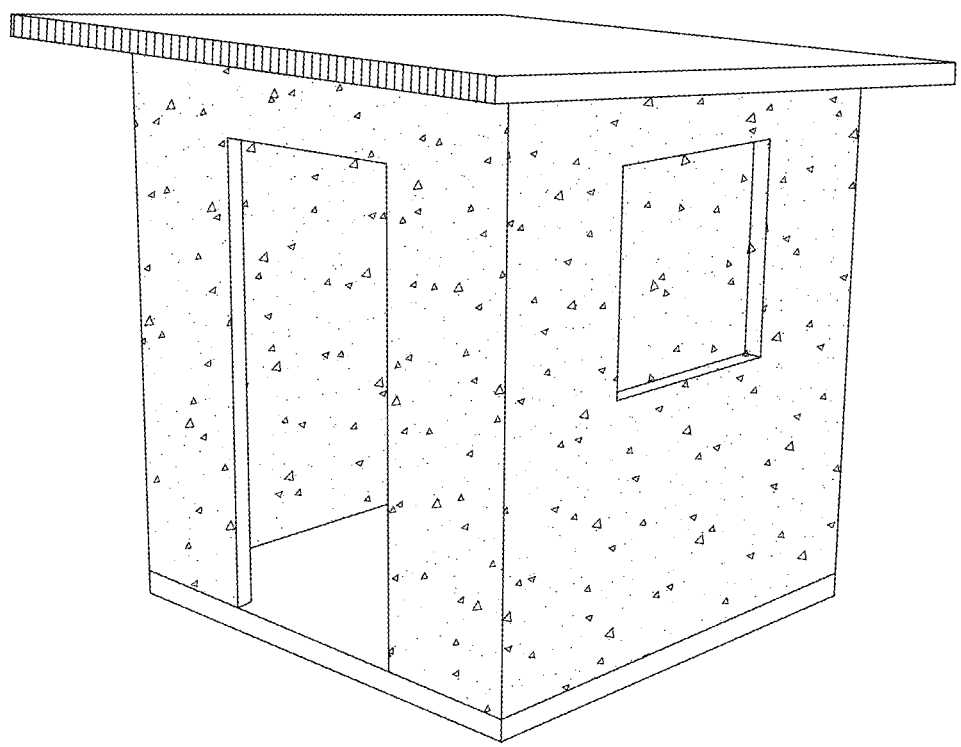
Figure 2C:
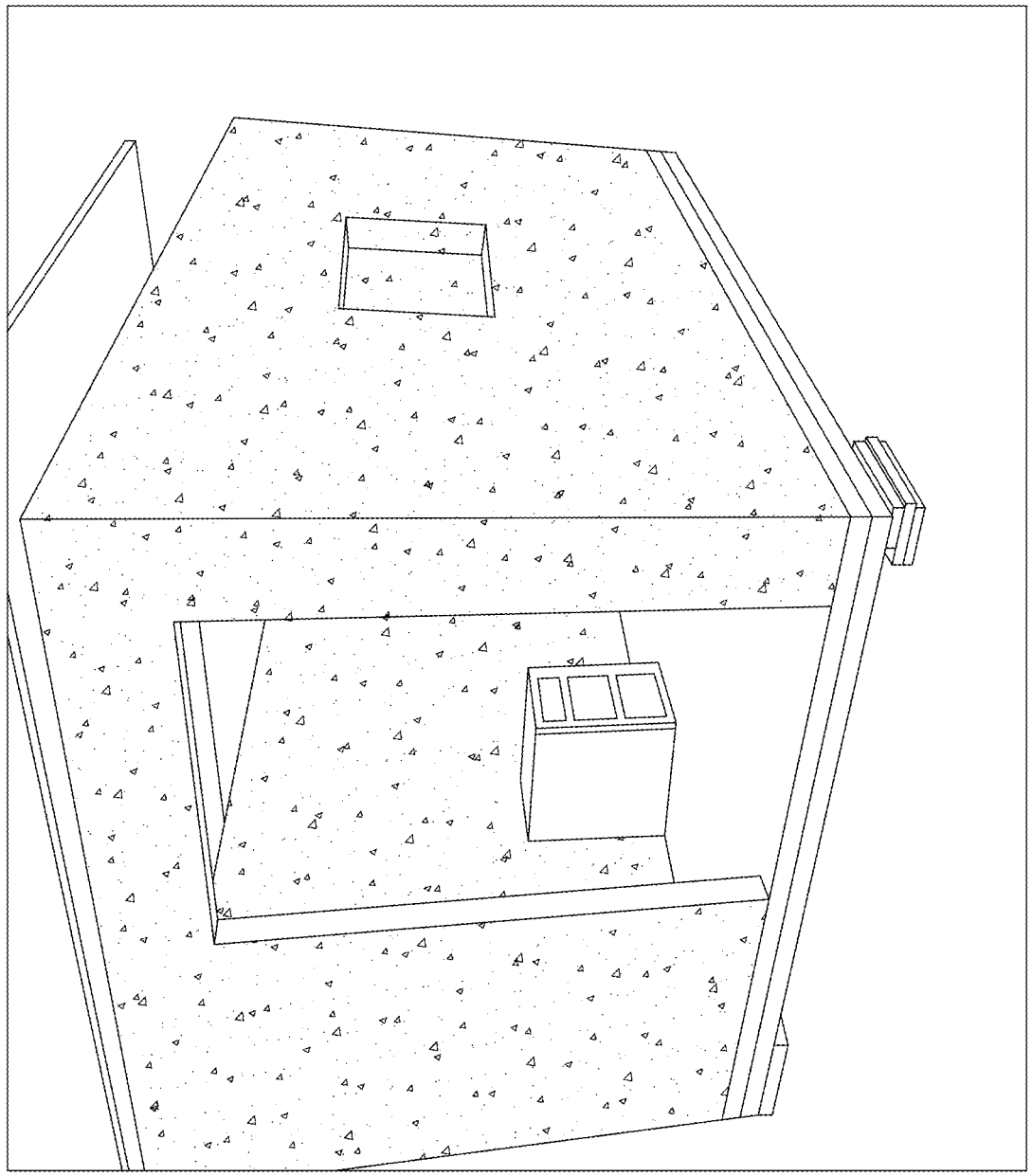
Figure 2D:
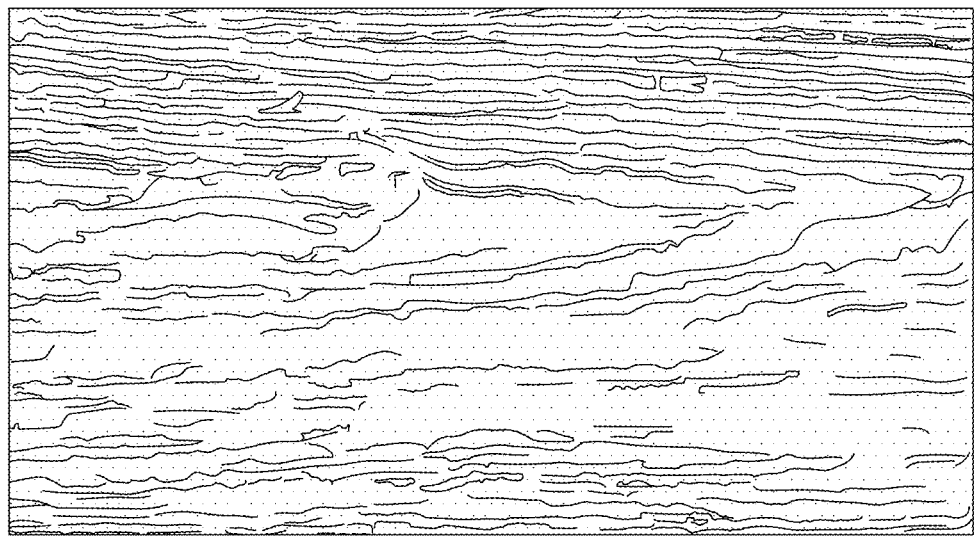
Figure 2E:
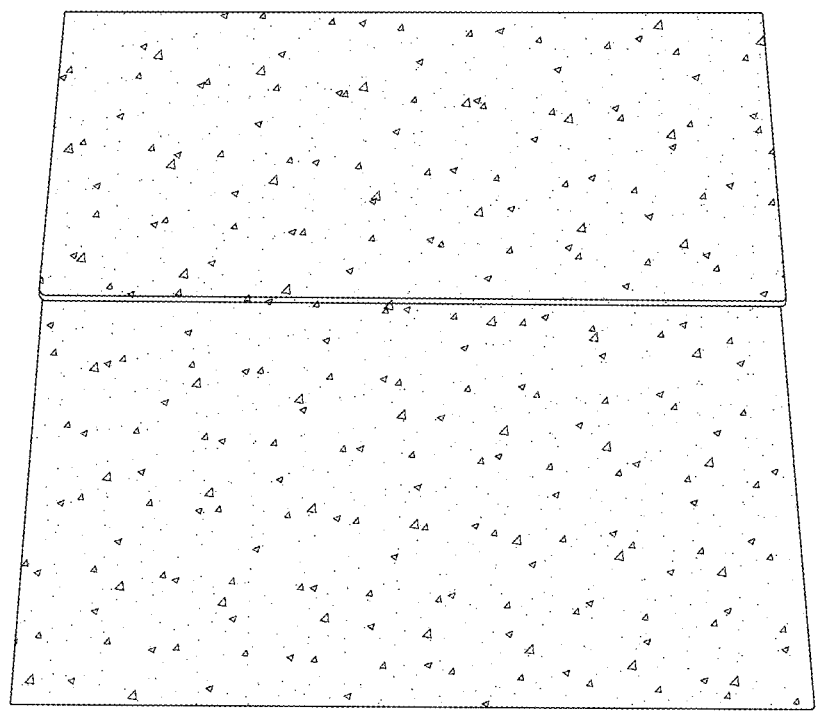

The second type of building material is roofing not limited to tiles, sheet of tiles, shingles and sheet goods, for both existing and new construction. These roofing products can be manufactured in a variety of profiles as the products made using the geopolymer formulations has the property to pick-up high definition when cast in forms. The superior structural strength and non-combustible properties of such products when compared with Portland cement-based tiles make the disclosed geopolymer formulations an attractive option both from an economic and aesthetic perspective. Among these roofing products, sheet of tiles offers particular benefits including but not limited to reduced weight, which reduces the load on the trusses. This results in improved construction design, speed of installation, and/or less material costs. FIGS. 2D and 2E illustrate exemplary siding and tiles respectively.

The third type of building material is a complete structurally sound, exterior standalone wall system that replaces the traditionally used structural materials not limited to wood, concrete walls, tilt up walls, and poured in place or spray applied gunite, or shotcrete.

The fourth type of building material include but is not limited to wall, overhang, eave and soffit panels. Soffit panels manufactured from the formulations disclosed herein have many advantages including but not limited to non-combustibility, durability, UV resistance, high compressive strength, weathertightness, airtightness, mold resistance, fungus resistance, and pest resistance. Additionally, the products use non-recyclable waste products, and the method of manufacture as disclosed herein do not contribute to the carbon footprint, which are eco-friendly features that benefit the industry.

The fifth type of building material includes, but is not limited to waterproofing concrete, wood, stucco, and cementitious materials. For example, in one embodiment the building material is used to construct exterior walls of an Accessory Dwelling Unit (ADU) as illustrated in FIGS. 2A-2C manufactured for example, using the exterior wall shown in FIG. 1B.

The sixth type of building material includes, but is not limited to any building material used to "fire harden" an existing structure from external fires. In particular embodiments, such building materials exhibit Class A non-combustible properties with zero smoke spread and zero flame spread. per the ASTM E84 and ASTM E136 standard tests. In particular embodiments, such building materials achieved a 1-hour non-load bearing fire-resistance rating in the ASTM E119 standard test.

The seventh type of building material includes, but is not limited to any building material that protects the structure from high winds and blowing debris due to high impact resistance.

The eighth type of building material includes, but is not limited to material used for repairs of pre-existing Portland cement-based concrete structures or for use in repair of any pre-existing construction.

The ninth type of building material includes, but is not limited to any building material that currently uses conventional/Portland cement, including above terrain and subterrain structures.

As will be evident in this disclosure, building materials manufactured using the disclosed formulations have high compressive strength (capacity to withstand loads before failure), flexural strength (ability to resist deformation) and tensile strength (ability of a structure to resist loads without failure because of excessive stress or deformation).

In particular embodiments, the formulations disclosed herein have load bearing characteristics. Non-limiting examples of load bearing properties include compressive strength, flexural strength, tensile strength, and impact resistance.

In particular embodiments, the load bearing characteristic of the geopolymer construction material manufactured using the formulations disclosed herein is at least comparable to, or higher than construction materials currently being used in this industry. For example, and not by way of any limitation, the load bear characteristic of the geopolymer construction material manufactured using the formulations disclosed herein is at least comparable to, or higher than Portland cement.

In particular embodiments, the compressive strength of the geopolymer construction material disclosed herein ranges between 2000 psi and 12000 psi. In particular embodiments, the compressive strength of the geopolymer construction material disclosed herein ranges between 2000 psi and 3000 psi. In particular embodiments, the compressive strength of the geopolymer construction material disclosed herein ranges between 2500 psi and 4000 psi. In particular embodiments, the compressive strength of the geopolymer construction material disclosed herein ranges between 3500 psi and 5000 psi. In particular embodiments, the compressive strength of the geopolymer construction material disclosed herein ranges between 4500 psi and 6000 psi. In particular embodiments, the compressive strength of the geopolymer construction material disclosed herein ranges between 5500 psi and 7000 psi. In particular embodiments, the compressive strength of the geopolymer construction material disclosed herein ranges between 6500 psi and 8000 psi. In particular embodiments, the compressive strength of the geopolymer construction material disclosed herein ranges between 7500 psi and 9000 psi. In particular embodiments, the compressive strength of the geopolymer construction material disclosed herein ranges between 8500 psi and 10000 psi. In particular embodiments, the compressive strength of the geopolymer construction material disclosed herein ranges between 9500 psi and 11000 psi. In particular embodiments, the compressive strength of the geopolymer construction material disclosed herein ranges between 10500 psi and 12000 psi. In particular embodiments, geopolymer construction material manufactured using Formulation A has a compressive strength between 5000 psi and 10000 psi. In particular embodiments, geopolymer construction material manufactured using Formulation B has a compressive strength of about 2500 psi. In particular embodiments, geopolymer construction material manufactured using Formulation C has compressive strengths between 8000 psi and 12000 psi.

In particular embodiments, the flexural strength of the geopolymer construction material disclosed herein ranges between 400 psi and 1000 psi. In particular embodiments, the flexural strength of the geopolymer construction material disclosed herein ranges between 500 psi and 600 psi. In particular embodiments, the flexural strength of the geopolymer construction material disclosed herein ranges between 550 psi and 700 psi. In particular embodiments, the flexural strength of the geopolymer construction material disclosed herein ranges between 650 psi and 800 psi. In particular embodiments, the flexural strength of the geopolymer construction material disclosed herein ranges between 750 psi and 900 psi. In particular embodiments, the flexural strength of the geopolymer construction material disclosed herein ranges between 850 psi and 1000 psi. In particular embodiments, geopolymer construction material manufactured using Formulation A has a flexural strength between 700 psi and 900 psi. In particular embodiments, geopolymer construction material manufactured using Formulation C has flexural strengths between 800 psi and 1000 psi.

In particular embodiments, the tensile strength of the geopolymer construction material disclosed herein ranges between 300 psi and 900 psi. In particular embodiments, the tensile strength of the geopolymer construction material disclosed herein ranges between 300 psi and 400 psi. In particular embodiments, the tensile strength of the geopolymer construction material disclosed herein ranges between 350 psi and 500 psi. In particular embodiments, the tensile strength of the geopolymer construction material disclosed herein ranges between 450 psi and 600 psi. In particular embodiments, the tensile strength of the geopolymer construction material disclosed herein ranges between 550 psi and 700 psi. In particular embodiments, the tensile strength of the geopolymer construction material disclosed herein ranges between 650 psi and 800 psi. In particular embodiments, the tensile strength of the geopolymer construction material disclosed herein ranges between 750 psi and 900 psi. In particular embodiments, geopolymer construction material manufactured using Formulation A has a tensile strength between 600 psi and 900 psi. In particular embodiments, geopolymer construction material manufactured using Formulation C has tensile strengths between 500 psi and 800 psi.

In particular embodiments, the impact resistance of the geopolymer construction material disclosed is about 3500 psi.

In particular embodiments, building materials manufactured using the formulations disclosed herein have non-combustible, non-flammable and hydrophobic water repellent properties that traditional building materials do not have. This is beneficial since it eliminates the need for adding additional layers/materials having such properties, thereby reducing construction times and manufacturing costs. Manpower costs are also significantly reduced since technicians specializing in the installation of such materials are not needed.

In particular embodiments, formulations comprising compositions exemplified in Formulations A, B, and C exhibit Class A non-combustible properties with zero smoke spread and zero flame spread, per the ASTM E84 and ASTM E136 standard tests.

In particular embodiments, formulations comprising compositions exemplified in Formulations A, and C achieved a 1-hour non-load bearing fire-resistance rating in the ASTM E119 standard test.

In particular embodiments, formulations comprising compositions exemplified in Formulations A, B, and C achieved a thermal resistivity rating of at least 2.0 m·K/W in the ASTM C518 standard test. In particular embodiments, formulations comprising compositions exemplified in Formulations A, B, and C achieved a thermal resistivity rating between 2.0 m·K/W and 2.735 m·K/W. In particular embodiments, formulations comprising compositions exemplified in Formulations A, B, and C achieved a thermal resistivity rating between 2.0 m·K/W and 2.5 m·K/W. In particular embodiments, formulations comprising compositions exemplified in Formulations A, B, and C achieved a thermal resistivity rating between 2.5 m·K/W and 2.735 m·K/W.

Table 2 shows exemplary ranges of strengths achievable for materials fabricated using the formulations disclosed herein.

TABLE 2

Load bearing and other characteristics of the manufactured construction materials.

| Properties | Traditional Concrete | Exemplary Formulations | | |
| --- | --- | --- | --- | --- |
| | | Formulation A | Formulation B[1] | Formulation C |
| Compressive Strength | 2500-5000 psi | 5000-10000 psi | 2500 psi | 8000-12000 psi |
| Flexural Strength | 400-700 psi | 700-900/psi | N/A | 800-1000/psi |
| Tensile Strength | 300-700 psi | 600-900/psi | N/A | 500-800/psi |
| Impact Resistance | 1x | 3500/psi | N/A | 3500/psi |
| Hydrophobic | No | Yes | Yes | Yes |
| Mold Resistive | No | Yes | Yes | Yes |

[1]Spray applied Formulation A surface or traditional surface e.g., stucco

In particular embodiments, formulations comprising compositions exemplified in Formulations A or C can be used to directly construct building materials not limited to interior and exterior applications, above and below grade foundations and piers, floors and slabs, walls, roofing and ceilings, structural and decorative wall panels, use for above and below grade liquid containment, for new construction to bestow beneficial characteristics attributable to the formulations disclosed herein. Non-limiting examples of such beneficial characteristics include, compressive strength, flexural strength, tensile strength, noncombustible, non-flammable, hydrophobic, and mold resistance. For example, and not by way of any limitation, one or more of compressive strength, flexural strength, or tensile strength characteristics bestow load bearing properties. In another example, and not by way of any limitation, one or more of fire resistance and fire-retardant properties protect structures, protect the lives of residents, and protect personal property from fire hazards. Additionally, fire resistance and fire-retardant properties also reduce the risk of fires spreading to neighboring dwellings thereby protecting the community as a whole. In yet another example, and not by way of any limitation, one or more of water repellant and mold resistant characteristics reduces damage to structures and the need for repair, thereby reducing maintenance costs and health issues compared to traditional building methods and practices.

In particular embodiments, formulations comprising compositions exemplified in Formulations A or C can be used to fabricate building products that can be retrofitted on top of existing structure to bestow beneficial characteristics attributable to the formulations disclosed herein. In particular embodiments the existing structures are part of a pre-existing construction that requires repair or renovation. Non-limiting examples of beneficial characteristics include, compressive strength, flexural strength, tensile strength, fire resistance, fire retardant, water repellant, and mold resistance. For example, and not by way of any limitation, one or more of compressive strength, flexural strength, or tensile strength characteristics bestow load bearing properties. In another example, and not by way of any limitation, one or more of fire resistance and fire-retardant properties protect structures, protect the lives of residents, and protect personal property from fire hazards. Additionally, noncombustible and nonflammable properties also reduce the risk of fires spreading to neighboring dwellings thereby protecting the community as a whole. In yet another example, and not by way of any limitation, one or more of water repellant and mold resistant characteristics reduces damage to structures and the need for repair, thereby reducing maintenance costs.

In particular embodiments, formulations comprising compositions exemplified in Formulation A can be sprayed on top of traditional building materials to bestow beneficial characteristics attributable to the formulations disclosed herein. Non-limiting examples of such beneficial characteristics include, compressive strength, flexural strength, tensile strength, noncombustible, non-flammable, hydrophobic, and mold resistance. For example, and not by way of any limitation, one or more of compressive strength, flexural strength, or tensile strength characteristics bestow load bearing properties. In another example, and not by way of any limitation, one or more of fire resistance and fire-retardant properties protect structures, protect the lives of residents, and protect personal property from fire hazards. Additionally, fire resistance and fire-retardant properties also reduce the risk of fires spreading to neighboring dwellings thereby protecting the community as a whole. In yet another example, and not by way of any limitation, one or more of water repellant and mold resistant characteristics reduces damage to structures and the need for repair, thereby reducing maintenance costs.

The building materials that are the subject of the instant disclosure are beneficial for example because they provide an exterior wall and/or exterior wall covering that gives consumers a safe living and/or storage space, that prolongs heat transfer to the wooden structure from an exterior fire, additionally arresting fire transmission between independent building structures. Unlike traditional materials, the materials disclosed herein have noncombustible and ignition resistant properties (that is, Class A fire rating), which is beneficial as it avoids creation of embers thereby slowing the fires. The building materials disclosed herein do not spall nor do they form cold joints during manufacturing which makes them long lasting maintenance free. Moreover, all these benefits are achieved in an environmentally conscious way. Particularly, manufacturing of products using the disclosed formulation generates less $CO_2$ than manufacturing using Portland cement. In particular embodiments, manufacturing of products using the disclosed formulation generates about 10% to about 95% less $CO_2$ than manufacturing using Portland cement. In particular embodiments, manufacturing of products using the disclosed formulation generates about 10% to about 25% less $CO_2$ than manufacturing using Portland cement. In particular embodiments, manufacturing of products using the disclosed formulation generates about 30% to about 45% less $CO_2$ than manufacturing using Portland cement. In particular embodiments, manufacturing of products using the disclosed formulation generates about 35% to about 50% less $CO_2$ than manufacturing using Portland cement. In particular embodiments, manufacturing of products using the disclosed formulation generates about 45% to about 65% less $CO_2$ than manufacturing using Portland cement. In particular embodiments, manufacturing of products using the disclosed formulation generates about 55% to about 75% less $CO_2$ than manufacturing using Portland cement. In particular embodiments, manufacturing of products using the disclosed formulation generates about 60% to about 80% less $CO_2$ than manufacturing using Portland cement. In particular embodiments, manufacturing of products using the disclosed formulation generates about 70% to about 90% less $CO_2$ than manufacturing using Portland cement. In particular embodiments, manufacturing of products using the disclosed formulation generates about 80% to about 95% less $CO_2$ than manufacturing using Portland cement. All these characteristics make the disclosed building materials versatile, resilient, and durable. These materials are also economical to the individual and community as they reduce construction, maintenance, and insurance costs. Reduced installation times and the need for a smaller, much narrower skillset and manpower compared to installing traditional structures provides the added benefit of significantly reduced labor costs. Specifically, the building process is expedited and weather tight in days for the building materials disclosed herein as opposed to months for traditional materials.

Due to their superior load bearing characteristics, the building materials manufactured using the formulations disclosed herein can be used for constructing not only single storied accessory dwelling units (ADU) but also constructing structures having two or more floors.

4. Methods of Manufacture 4.1 Manufacture of the Dry Formulation

The presently disclosed subject matter is also directed to a method of manufacturing the formulation disclosed herein. In particular embodiments, the method comprises identifying the various components (constituents) that must be included in the formulation and their amounts, adding the components to a mixer and mixing the components to achieve a homogenous formulation. In particular embodiments, the various components are added and mixed in one or more batches. In particular embodiments, all of the identified components are added and mixed as a single batch.

In particular embodiments, the method comprises mixing coarse sand (pre-washed and pre-dried), GGBFS, fly ash and basalt fibers to form a homogenous mixture. This is followed by the addition of sodium tetraborate, boric acid, hemp, zeolite, boric acid, sodium caseinate, and SC-9, to the homogenized mixture and continuing to operate the mixer until a homogenous mixture is formed. Next, sodium metasilicate is added to the homogenized mixture and the mixing continued until a homogenized formulation is obtained.

In particular embodiments, the method comprises mixing fine sand (pre-washed and pre-dried), GGBFS and fly ash to form a homogenous mixture. This is followed by the addition of sodium tetraborate, boric acid, hemp, zeolite, sodium caseinate, SC-9 and magnesium oxide, to the homogenized mixture and continuing to operate the mixer until a homogenous mixture is formed. Next, sodium metasilicate is added to the homogenized mixture and the mixing continued until a homogenized formulation is obtained.

In particular embodiments, the method comprises mixing coarse sand and fine sand (pre-washed and pre-dried), GGBFS, fly ash, and basalt fibers to form a homogenous mixture. This is followed by the addition of sodium tetraborate, boric acid, hemp, zeolite, sodium caseinate, SC-9 and magnesium oxide, to the homogenized mixture and continuing to operate the mixer until a homogenous mixture is formed. Next, sodium metasilicate was added to the homogenized mixture and the mixing continued until a homogenized formulation is obtained.

In particular embodiments, the method further comprises adding aggregates to the formulation to provide structural stability to the building material, and fillers to fill the gap between the aggregates. The addition of aggregates provides structural stability and improve load-bearing capacity of the final building materials (e.g., a wall system), and can also reduce the amount of binder needed during manufacturing, thereby providing overall workability and economic benefits. Exemplary aggregates include but are not limited to recycled concrete aggregates (RCA), granite gravel, perlite, scoria and non-recyclable plastics. In particular embodiments, the aggregate is RCA, perlite, scoria or granite. A combination of various types of aggregates can also be used. In particular embodiments, the aggregates are used in geopolymer formulations for "poured-in-place" applications (e.g., Formulation C, see below). The inclusion of aggregates including RCA and non-recyclable plastics introduces eco-friendly practices to manufacturing of products encompassed in the presently disclosed subject matter as it reduces environmental burden by avoiding return of non-recyclable materials to the soil, ocean/sea, and/or water table. The low costs associated with procuring such aggregates also provides economic advantages by reducing overall manufacturing costs.

In particular embodiments, the aggregate is in an amount from about 0% w/w to about 50% w/w. In particular embodiments, the aggregate is in an amount from about 10% w/w to about 50% w/w. In particular embodiments, the aggregate is in an amount from about 20% w/w to about 50% w/w. In particular embodiments, the aggregate is in an amount from about 30% w/w to about 50% w/w. In particular embodiments, the aggregate is in an amount from about 0% w/w to about 20% w/w. In particular embodiments, the aggregate is in an amount from about 10% w/w to about 20% w/w. In particular embodiments, the aggregate is in an amount from about 15% w/w to about 20% w/w.

Fillers fill the gaps between the aggregates and the binder, improve workability and reduce the amount of cement needed without compromising strength. Non-limiting examples of such fillers include, limestone dust, cement, stone dust, brick dust, granulated basalt, fly ash, and pond ash. A combination of various type of aggregates can also be used. In some embodiments the filler is one or more of fly ash, pond ash, or brick dust.

In particular embodiments, the filler is in an amount from about 0% w/w to about 50% w/w. In particular embodiments, the filler is in an amount from about 10% w/w to about 50% w/w. In particular embodiments, the filler is in an amount from about 20% w/w to about 50% w/w. In particular embodiments, the filler is in an amount from about 30% w/w to about 50% w/w. In particular embodiments, the filler is in an amount from about 40% w/w to about 50% w/w. In particular embodiments, the filler is in an amount from about 10% w/w to about 25% w/w. In particular embodiments, the filler is in an amount from about 25% w/w to about 50% w/w.

In particular embodiments, the methods comprise first mixing all of the components whose particle size is equivalent to #2 sand or smaller, followed by addition of the aggregates and fillers and mixing.

In particular embodiments, the mixing is achieved using any industrial mixer suitable for obtaining a homogenized mixture. Non-limiting examples of such mixers include a drill and paddle mixer, a drum mixer, a cyclone mixer, a vertical tumbler, a horizontal tumbler, and a food grade mixer.

In particular embodiments, each mixing operation can be performed from about 2.5 minutes to about 3.5 minutes.

Figure 14A:
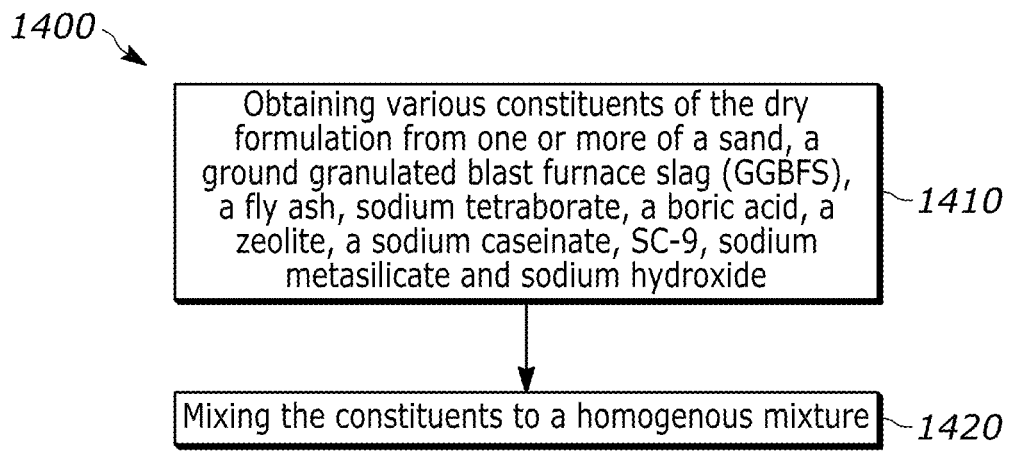
FIGS. 14A and 14B illustrate example methods for manufacturing a dry formulation and a building material using the formulation.

FIG. 14A illustrates a flow diagram of an exemplary method 1400 of manufacturing a dry formulation with the presently disclosed embodiments. The method 1400 may begin at step 1410 with obtaining various constituents of the dry formulation from one or more of a sand, a ground granulated blast furnace slag (GGBFS), a fly ash, sodium tetraborate, a boric acid, a zeolite, a sodium caseinate, SC-9, sodium metasilicate and sodium hydroxide. In particular embodiments, one of either sodium metasilicate or sodium hydroxide is used. In particular embodiments, both sodium metasilicate and sodium hydroxide are used.

The method 1400 may then continue at step 1420 where the constituents are mixed to a homogenous mixture. In particular embodiments, the constituents are mixed in a single batch. In particular embodiments, the constituents are mixed in two or more batches. For example, and not by way of any limitation, in particular embodiments, the method comprises first mixing all of the components whose particle size is equivalent to #2 sand or smaller in a first batch, followed by addition of aggregates and fillers and mixing in a second batch.

4.2 Manufacture of Building Materials

The presently disclosed subject matter is also directed to a method of manufacturing building materials using the geopolymer formulations disclosed herein. In particular embodiments, the method comprises obtaining a dry formulation, hydrating the formulation, mixing the hydrated formulation, dispensing the formulation, and curing the formulation.

In particular embodiments, the geopolymer formulation is manufactured using the methods described in Section 4.1.

In particular embodiments, the formulation is Formulation A comprising sand, ground granulated blast furnace slag (GGBFS), fly ash sodium metasilicate, sodium tetraborate, boric acid, hemp, a zeolite, sodium caseinate, and SC-9. In particular embodiment, the formulation is Formulation A comprising sand, ground granulated blast furnace slag (GGBFS), fly ash sodium metasilicate, sodium tetraborate, boric acid, hemp, a zeolite, sodium caseinate, SC-9, and basalt fibers. Various exemplary embodiments for each of these components including their exemplary amounts are described in Section 2 and Table 1.

In particular embodiments, the formulation is Formulation B comprising sand, GGBFS, fly ash sodium metasilicate, sodium tetraborate, boric acid, hemp, a zeolite, sodium caseinate, and SC-9. In particular embodiments, the formulation is Formulation B comprising sand, GGBFS, fly ash sodium metasilicate, sodium tetraborate, boric acid, magnesium oxide, hemp, a zeolite, sodium caseinate, and SC-9. Various exemplary embodiments for each of these components including their exemplary amounts are described in Section 2 and Table 1.

In particular embodiments, the formulation is Formulation B comprising sand, GGBFS, fly ash sodium metasilicate, sodium tetraborate, boric acid, basalt fibers, a zeolite, sodium caseinate, and SC-9. In particular embodiments, the formulation is Formulation B comprising sand, GGBFS, fly ash sodium metasilicate, sodium tetraborate, boric acid, magnesium oxide, basalt fibers, a zeolite, sodium caseinate, and SC-9. Various exemplary embodiments for each of these components including their exemplary amounts are described in Section 2 and Table 1.

In particular embodiments, the formulation is Formulation B comprising sand, GGBFS, fly ash sodium metasilicate, sodium tetraborate, boric acid, hemp, basalt fibers, a zeolite, sodium caseinate, and SC-9. In particular embodiments, the formulation is Formulation B comprising sand, GGBFS, fly ash sodium metasilicate, sodium tetraborate, boric acid, magnesium oxide, hemp basalt fibers, a zeolite, sodium caseinate, and SC-9. Various exemplary embodiments for each of these components including their exemplary amounts are described in Section 2 and Table 1.

In particular embodiments, the formulation is Formulation C comprising sand, GGBFS, fly ash, sodium metasilicate, sodium tetraborate, boric acid, hemp, a zeolite, sodium caseinate, SC-9, and basalt fibers. In particular embodiments, the formulation is Formulation C comprising sand, GGBFS, fly ash sodium metasilicate, sodium tetraborate, boric acid, magnesium oxide, hemp, a zeolite, sodium caseinate, SC-9 and basalt fibers. Various exemplary embodiments for each of these components including their exemplary amounts are described in Section 2 and Table 1.

In particular embodiments, the step of hydrating the formulation comprises mixing the dry formulation with water. The amount of water needed, and mixing time is dependent on the components comprising the formulation, the desired consistency, and the desired end use. Non-limiting examples of the type of water that may be used include, tap water, potable water, purified water, wash water, underground water, agriculture water, sea water and wastewater. The water can be tested and freed of any impurities that have negative impact on the properties of the building materials (e.g., compressive strength, flexural strength, tensile strength, impact resistance, thermal conductivity, thermal resistivity) manufactured using the formulations disclosed herein.

In particular embodiments, the water used is sea water. In particular embodiments, the water used is sea water having a salt content between 4% w/w and 6% w/w. In particular embodiments, the water used is sea water having a salt content of about 4% w/w. In particular embodiments, the water used is sea water having a salt content above 6%. In particular embodiments, the water used is sea water having a salt content from about 6% w/w to about 25% w/w. In particular embodiments, the water used is sea water having a salt content above 6% w/w that is treated to achieve a salt content of about 6% w/w or less.

In particular embodiments, the pH of the water is between pH 5.0 and pH 13.0. In particular embodiments, the pH of the water is between pH 5.0 and pH 7.0. In particular embodiments, the pH of the water is between pH 6.0 and pH 8.0. In particular embodiments, the pH of the water is between pH 7.0 and pH 9.0. In particular embodiments, the pH of the water is between about pH 8.0 and pH 10.0. In particular embodiments, the pH of the water is between about pH 9.0 and pH 11.0. In particular embodiments, the pH of the water is between about pH 10.0 and pH 12.0. In particular embodiments, the pH of the water is between about pH 11.0 and pH 13.0.

In particular embodiments, the temperature of the water used for hydrating formulations disclosed herein is between 60° F. and 103° F. In particular embodiments, the temperature of the water used for hydrating formulations disclosed herein is between 60° F. and 70° F. In particular embodiments, the temperature of the water used for hydrating formulations disclosed herein is between 65° F. and 75° F. In particular embodiments, the temperature of the water used for hydrating formulations disclosed herein is between 70° F. and 80° F. In particular embodiments, the temperature of the water used for hydrating formulations disclosed herein is between 75° F. and 85° F. In particular embodiments, the temperature of the water used for hydrating formulations disclosed herein is between 80° F. and 90° F. In particular embodiments, the temperature of the water used for hydrating formulations disclosed herein is between 85° F. and 95° F. In particular embodiments, the temperature of the water used for hydrating formulations disclosed herein is between 90° F. and 100° F. In particular embodiments, the temperature of the water used for hydrating formulations disclosed herein is between 95° F. and 103° F. For example, in one exemplary embodiment, the temperature of the water used for hydrating formulations is about 92° F.

The ability to use sea water in manufacturing building materials using the geopolymer formulations disclosed herein offers distinct benefits over presently used building material formulations, including, but not limited to Portland cement, which are prone to loss of structural strength, cracking and/or corrosion of steel rebar when manufactured using water having, high salt content, high pH and at high temperatures. Thus, methods of manufacturing building materials using the geopolymer formulations disclosed herein are advantageous as they do not encompass logistical burdens or costs associated with transporting water and/or water pre-treatment prior to use. This is particularly beneficial to consumers that do not have easy access to fresh water sources, such as for example, coastal locations. Overall, the manufacturing methods disclosed herein have superior cost effectiveness, without compromising structural integrity and durability of the building materials.

In particular embodiments, methods for manufacturing building materials for a new construction comprises hydrating a formulation to a workable consistency (e.g. appearance of drywall mud) that can be dispensed using a pump into forms, allowing the material to cure and solidify before the forms are removed. In particular embodiments, dispensing the hydrated formulation with a sprayer is followed by screeding, troweling and/or finishing steps. A non-limiting example of such a new construction is an accessory dwelling unit shown in FIGS. 2A-2C. A non-limiting example of exemplary siding and tiles are shown in FIGS. 2D and 2E respectively.

Figure 3A:
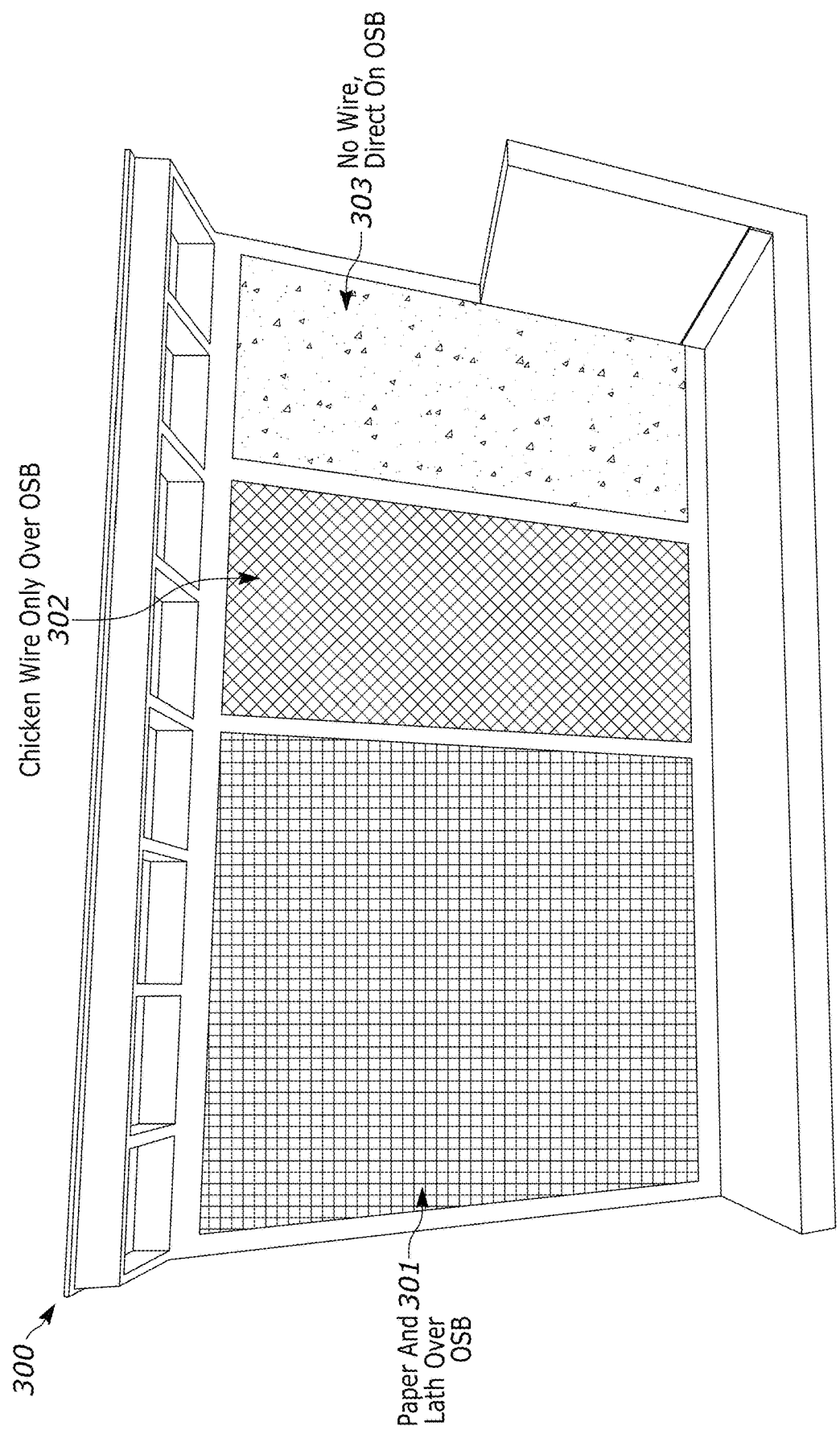
FIGS. 3A-3D illustrates exemplary test walls using the formulations disclosed herein.
Figure 3B:
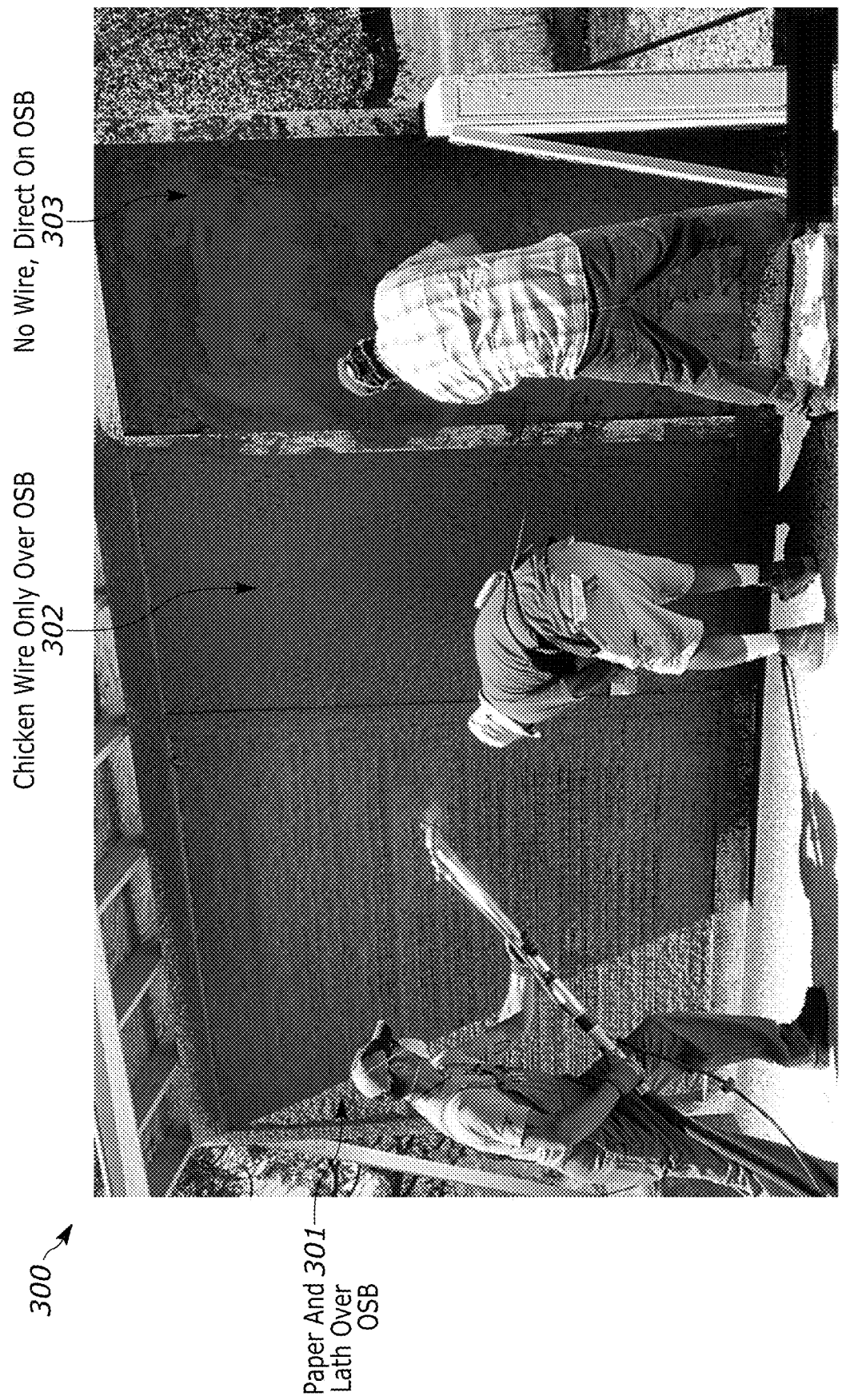
Figure 3C:
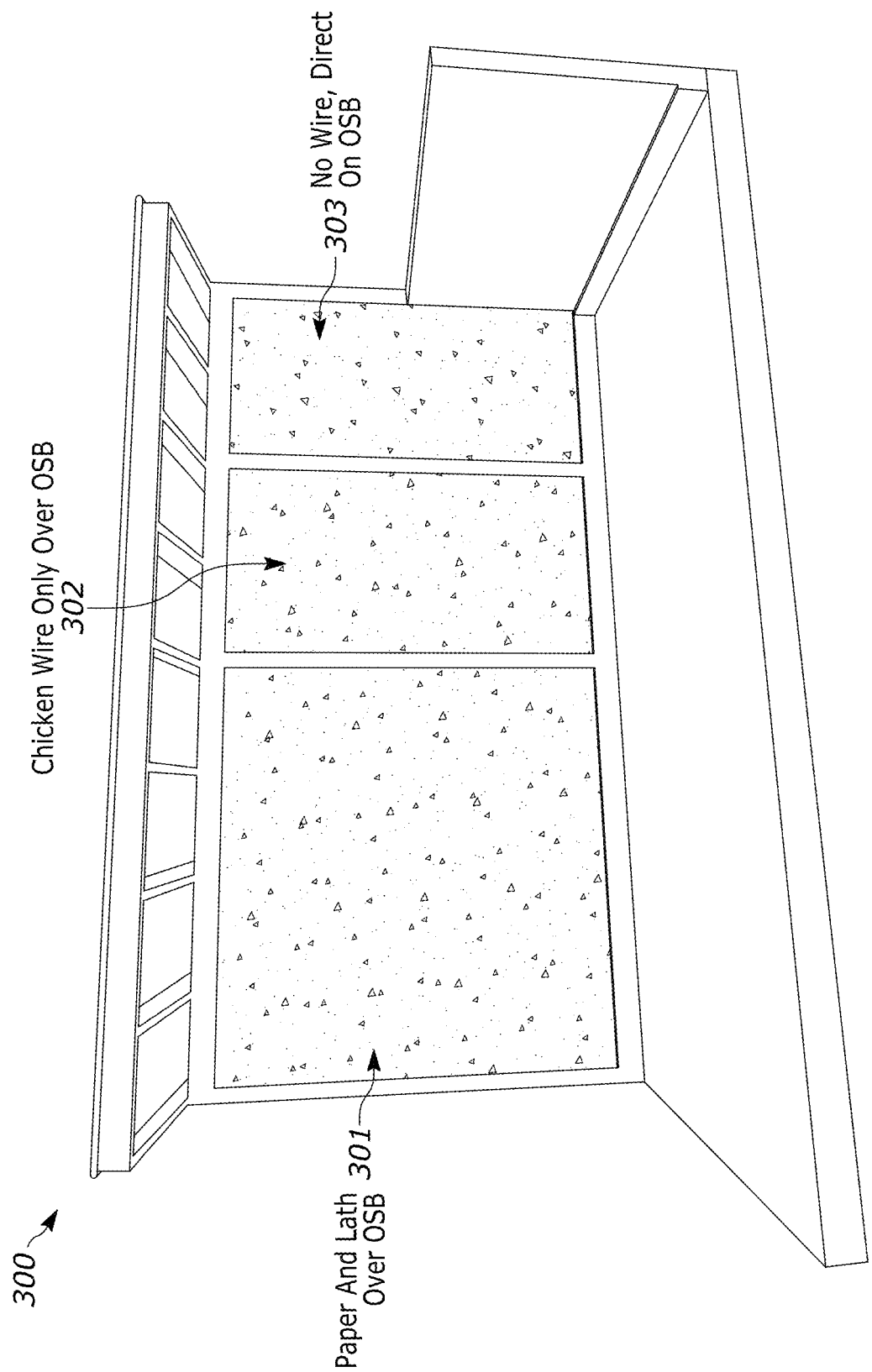
Figure 3D:
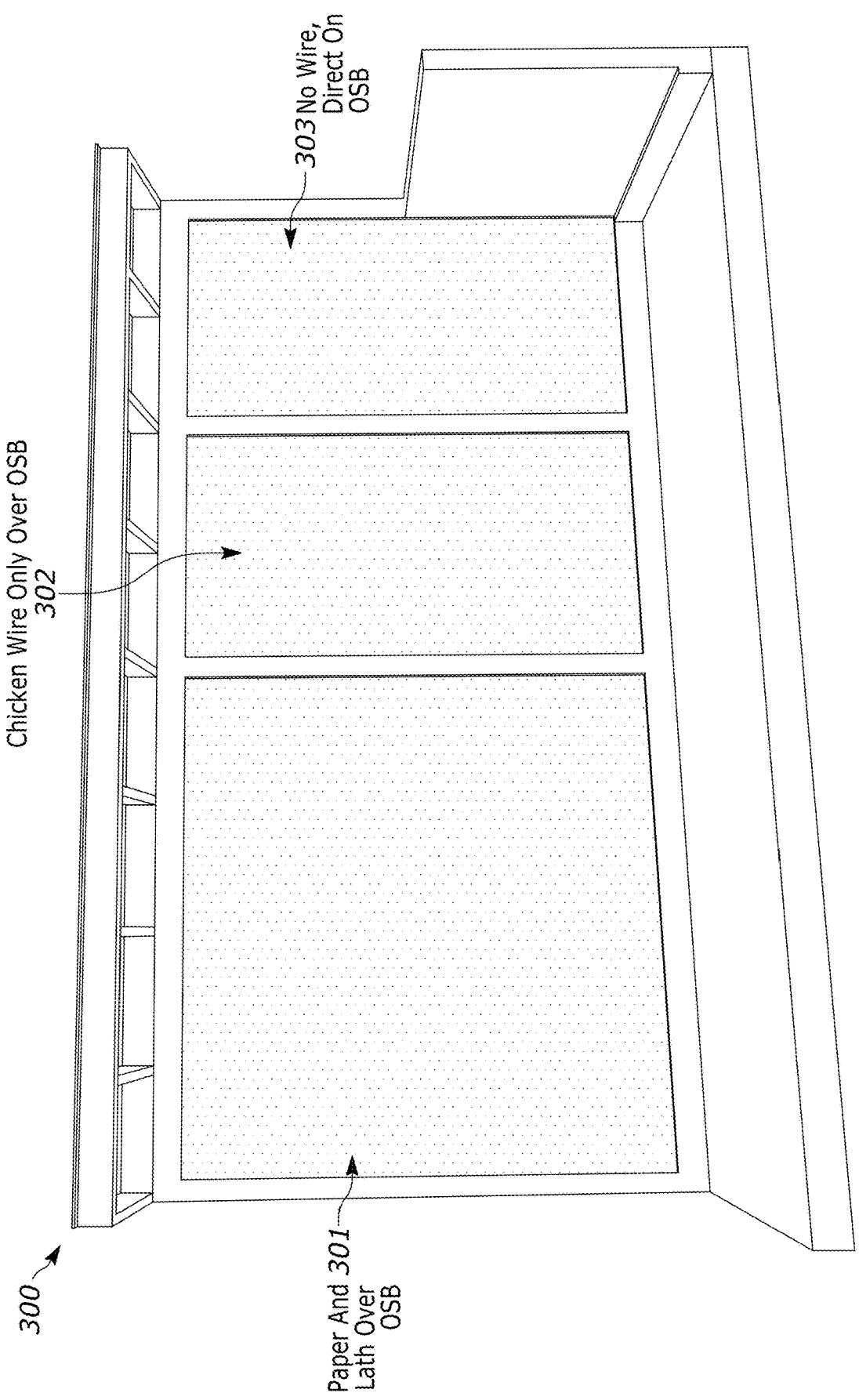

In particular embodiments, methods for manufacturing building materials for a new construction comprises hydrating a formulation and mixing to a workable consistency that can be dispensed by spraying onto a surface as shown in FIGS. 3A-3D. FIGS. 3A-3D illustrates exemplary test walls 300 using the formulations disclosed herein. FIG. 3A show one test wall 301 comprising paper and lath over an oriented strand board (OSB), a second test wall 302 comprising chicken wire over OSB, and a third test wall 303 comprising OSB alone. FIG. 3B shows application of an exemplary Formulation A on all three wall types described in FIG. 3A. FIG. 3C shows the formulation after curing on the surface of the walls. FIG. 3D shows the finished walls after curing. In particular embodiments, a small amount can be dispensed to confirm the desired consistency that allows the material to flow smoothly without running or clumping prior to use on a desired surface. In particular embodiments, the hydrated formulation is dispensed using pumps or industrial sprayers. Non-limiting examples of such sprays include grout pumps with pneumatic sprayers, mortar mixers with pneumatic sprayers, and rotor stator pumps with pneumatic sprayers.

In particular embodiments, the dry formulation is loaded into a sprayer hopper before the hydration and mixing steps. Once the desired consistency is achieved by mixing, the hydrated formulation is ready for spray application. In particular embodiments, dispensing the hydrated formulation with a sprayer is followed by screeding, troweling and/or finishing steps.

In particular embodiments, the hydrated formulation is mixed for a minimum of 3 minutes and a maximum of 5 minutes before being applied to the surface. In particular embodiments, the hydrated formulation is mixed for a minimum of 3 minutes after hydration.

In particular embodiments, the dispensing steps, and any spraying, screeding, and hard troweling steps must be concluded within approximately 4-7 min after being applied to the surface.

In particular embodiments, after dispensing, the material is allowed to cure and harden. In particular embodiments, the curing is performed at a temperature from about 30° F. to about 100° F. In particular embodiments, the curing is performed between 50° F. and 85° F. In particular embodiments, the curing is performed between 50° F. and 60° F. In particular embodiments, the curing is performed between 55° F. and 65° F. In particular embodiments, the curing is performed between 60° F. and 70° F. In particular embodiments, the curing is performed between 65° F. and 75° F. In particular embodiments, the curing is performed between 70° F. and 80° F. In particular embodiments, the curing is performed between 75° F. and 85° F.

In particular embodiments, curing is facilitated through the use of infrared heat.

In particular embodiments, the curing is for a period between 20 minutes and 48 hours. In particular embodiments, the curing is for a period between 24 hours and 48 hours. In particular embodiments, the curing is for a period between 30 hours and 72 hours. In particular embodiments, the curing is for a period between 48 hours and 96 hours. In particular embodiments, the curing is for a period between 1 day and 5 days. In particular embodiments, the curing is for a period between 2 days and 5 days. In particular embodiments, the curing is for a period between 3 days and 5 days. In particular embodiments, the curing is for a period between 4 days and 5 days. In particular embodiments, the curing is for a period between 5 days and 7 days. In particular embodiments, the curing is for a period between 7 days and 10 days. In particular embodiments, the curing is for a period between 10 days and 14 days.

In particular embodiments, mixing the hydrated formulation for 3 minutes is followed by pouring the mixed material into casts/forms and vibrating the casts/forms for about 2 minutes, which increases curing time to 30 minutes or higher.

In particular embodiments, the curing/hardening time ranges from about 20 minutes to about 24 hours. In particular embodiments, the curing/hardening time ranges from about 1 day to about 14 days. In particular embodiments, the building material can be 50% cured/hardened in about 24 hours. In particular embodiments, a 50% cured/hardened building material has a compressive strength of about 3200 psi.

Figure 14B:
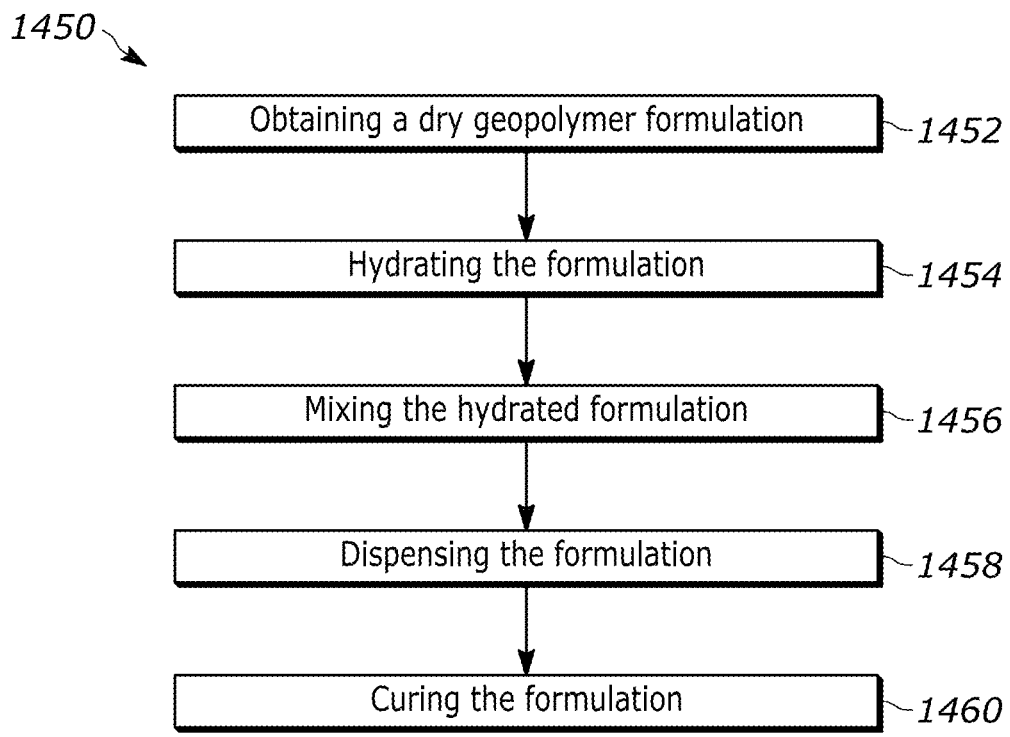

FIG. 14B illustrates a flow diagram of an exemplary method 1450 of manufacturing a building material with the presently disclosed embodiments. The method 1450 may begin at step 1452 with obtaining a dry geopolymer formulation. The method 1450 may then continue at step 1454 with hydrating the formulation. The method 1450 may then continue at step 1456 with mixing the hydrated formulation. The method 1450 may then continue at step 1458 with dispensing the formulation. The method 1450 may then continue at step 1460 with curing the formulation.

Exemplary building materials that can be manufactured from the formulation disclosed herein include, but are not limited to exterior wall assembly, interior wall assembly, load bearing walls, retaining walls, soundproof walls, flooring, foundations, liquid storage, barriers, roof tiles, soffit panels, stucco. Such building materials find application in the manufacture of various structures in residential and commercial construction including but not limited to dwelling units, accessory dwelling units, structure shell, housing, homeless shelters, disaster relief shelters, utility company vaults, wall and floor safes, freight containers, barracks, garage walls, flat top roof protection, garages, carports, wine storage units, grottos, fire breaks, planters, curbs, sidewalks, septic tanks, water storage units, property storage units, underground infrastructure, utility poles, shoreline breakwater walls, levees, embankments, lava diverters, sound walls and custom structures. In particular embodiments, the formulations disclosed herein can also be used application not limited to self-leveling, residential repair, commercial repair, roadway repairs (e.g., pothole filling).

In particular embodiments, the method of manufacturing building materials from the formulation disclosed herein is performed on site (e.g., construction of exterior walls for a new construction). In particular embodiments, the method of manufacturing building materials from the formulation disclosed herein is performed off site. The finished products can then be transported to the desired site for installation as a new construction or retrofitted onto a pre-existing construction to enhance their load bearing, flame retardant and/or anti-microbial and anti-fungal properties.

In particular embodiments, exemplary Formulation B can be used as, but not limited to a textured skim coat or an ultra-smooth finishing coat, coloring, moisture barrier, UV protector or for minor repairs to existing stucco and concrete.

In particular embodiments, the formulations disclosed herein can be poured in place as an exterior wall assembly, a tilt up assembly, a spray over balloon application, spray over form, poured/sprayed foundations, poured/sprayed retaining walls and pools, or wherever there is a need for high strength concrete. For example, spraying the formulation over a balloon type, or a form type apparatus enables manufacture and rapid deployment of temporary or permanent structures that have many applications including, but not limited to, disaster relief shelters, homeless shelters, emergency shelters, shelters for protection from fires and disasters, storage structures, and structures relevant to disaster preparedness efforts.

In particular embodiments, exemplary Formulation C can be poured in place as an exterior wall assembly, a tilt up assembly, a spray over balloon application, poured/sprayed foundations, poured/sprayed retaining walls and pools, or wherever there is a need for high strength concrete.

In particular embodiments, the geopolymer formulations disclosed herein are used in the manufacture of building materials using 3D printing methods. In particular embodiments, the 3D printing methods comprise use of computer-controlled processes to layer the formulation to create 3D shapes. In particular embodiments, the 3D printed structures are created on-site. In particular embodiments, the 3D printed structures are created off-site before transport to the site for assembly.

5. EXAMPLES

Example 1. Exemplary Building Materials 1.1. Accessory Dwelling Unit (ADU)

This example describes an exemplary method for manufacturing an ADU using Formulation A.

Method: A base pallet was first assembled. Exterior wall forms were set up using silicone covered OSB (½"). A 3/16" basalt rebar was installed vertically, 12" on center and horizontally, 18" on center. Next, interior wall forms were set up using prefinished maple plywood (¾"). Formulation A (6200 lbs.) was pumped into the forms in less than 1.5 hours. The material began to set in about 4-6 minutes. The interior forms were removed after 18 hours followed by removal of the exterior forms after 30 hours.

Results

The material began to harden within 4 minutes of hydration during the pour. The internal temperature of formulation did not exceed 146° F. throughout the entire process, which avoids the possibility of spalling when poured in large quantities. The formulation when poured in large/thicker quantities, hardened quickly, and cured to a compressive strength of 2500 psi within 12 hrs. The compressive strength was increased to 3200 psi in 24 hours (55% cured) and to 5500 psi or higher after 14-21 days. A complete roof system was then installed, along with doors and windows (FIGS. 2A-2C). The building envelope was weather tight within 48 hours of pour, allowing for all interior work to proceed without weather interruptions.

1.2. Siding and Tiles

This example describes an exemplary method for manufacturing siding and tiles using Formulation A and Formulation C.

Method

One-quarter inch (¼") walls were affixed to 8-inch×24-inch and 12-inch×24-inch wood grained siding or tiles to create molds. Additionally, three-quarter inch (¾") walls were affixed to a 24-inch×24-inch wood grained panel to create a third mold. 100% silicone was applied to the siding or tile surface on all 3 samples using a brush to allow easy release of the Building Armour from the form. Black pigment was added to the dry mix for the 24-inch×24-inch sample. Mixing for all three molds were performed using a Hobart mixer with paddle blade attachment, at speed 1. After pouring, samples were placed in a 160° F. oven for 24 hours. Siding and tile samples were released from the forms and visually inspected.

Results

FIGS. 2D and 2E show exemplary siding and tiles manufactured using the method described above. The samples showed relief detail down to 1/32". The black tinted sample was evenly coated throughout each surface. All samples were indistinguishable in relief detail from the original pieces used to make the molds. Exterior siding and tile panels manufactured using the geopolymer formulations disclosed herein are indistinguishable from wood or vinyl siding and tiles. These sidings and tiles have several advantages, including but not limited to non-combustibility, durability, impact resistance, mold resistance, fungus resistance, pest resistance, and resistance to wrap and/or peel, which reduces maintenance costs. Additionally, the products use non-recyclable waste products, and the method of manufacture as disclosed herein do not contribute to the carbon footprint, which are eco-friendly features that benefit the industry.

Example 2. Key Features of an Exemplary Product Manufactured Using the Formulation Some of the features of products manufactured using the geopolymer formulation disclosed herein are listed below:
1. Cementitious/Geopolymer.
2. Compressive strength of 5,000 to 10,000 psi.
3. Flexural strength/Modulus of Rupture-800 psi
4. Impact resistance up to 3,500 psi.
5. Reaches structural integrity of at least 3000/psi with-in 24 hours.
6. Fully cured with infrared heat in much less time than for a traditional construction. For example, a 1" thick application can be cured within 30 min using the formulations and methods disclosed herein as compared to 21 days needed for traditional formulations. Thicker applications can be cured to structural integrity within 4 hours using infrared heat.
7. Speed of construction allows for huge cost savings.
8. Noncombustible and Ignition Resistant with zero smoke and zero flame spread.
9. Hydrophobic water repellent and Antibacterial properties.
10. No cold joints.
11. Crack and acid resistant.
12. High-definition imprints.
13. Can be sprayed, poured, or hand trowel applied.
14. Exterior wall covering applied in a single lift when sprayed.
15. Can be layered in multiple lifts to create a monolithic application.
16. Can be applied in temperature ranges from 30-100°+ Fahrenheit.
17. 100% recyclable and reusable when used in our own material.
18. Green/Net Zero product

Example 3. Physical Properties of the Cured Geopolymer Product

This example describes the results of quality control tests run on the product after curing is complete. Table 3 shows example compositions for formulations A, B and C.

TABLE 3

| Exemplary formulations used for testing | | |
|---|---|---|
| Formulation A | Formulation B | Formulation C |
| Coarse Sand - 44.38% | Fine Sand - 21.89% | Coarse Sand - 30.38% |
| GGBFS - 25.10% | GGBFS - 34.81% | Fine Sand - 15.17% |
| Fly Ash - 14.47% | Fly Ash - 25.20 | GGBFS - 24.13% |

TABLE 3-continued

Exemplary formulations used for testing

| Formulation A | Formulation B | Formulation C |
|---|---|---|
| Hemp - 1.03% | Hemp - 1.43% | Fly Ash - 17.46% |
| Sodium Tetraborate - 2.92% | Sodium Tetraborate - 2.91% | Basalt Fibers - 1.03% |
| Zeolite - 1.02% | Zeolite - 0.37% | Hemp - 0.99% |
| Boric Acid - 0.49% | Boric Acid - 1.46% | Sodium Tetraborate - 2.02% |
| Sodium Caseinate - 0.13% | Sodium Caseinate - 0.13% | Zeolite - 0.26% |
| SC-9 - 0.04% | SC-9 - 0.06% | Boric Acid - 1.01% |
| Sodium Metasilicate - 9.39% | Magnesium Oxide - 0.06% | Sodium Caseinate - 0.09% |
|  | Sodium Metasilicate - 10.65% | SC-9 - 0.04% |
|  |  | Magnesium Oxide - 0.04% |
|  |  | Sodium Metasilicate - 7.38% |

3.1. Compressive Strength Test 3.1.1. Compressive Test 1

This example describes compressive strengths measured at periodic intervals after hydration of Formulation A (see Table 3). The results of this test are shown in Table 4.

TABLE 4

Compression Test for products manufactured using Formulation A

| Sample ID | Diameter (Inch) | Length (Inch) | Area (Inch)2 | Age Tested (hours) | Ultimate Load (psi) | Ultimate Strength (psi) |
|---|---|---|---|---|---|---|
| Oven Fast Cure (1 hr @ 160 F.) | 2 | 4 | 3.14 | 2 | 10420 | 3320 |
| Field Cure | 2 | 4 | 3.14 | 2 | 1520 | 480 |
| Field Cure | 2 | 4 | 3.14 | 2 | 1290 | 410 |
| Field Cure | 2 | 4 | 3.14 | 4 | 4700 | 1500 |
| Field Cure | 2 | 4 | 3.14 | 5 | 5830 | 1860 |
| Field Cure | 2 | 4 | 3.14 | 6 | 6790 | 2160 |
| Field Cure | 2 | 4 | 3.14 | 7 | 6630 | 2110 |
| Field Cure | 2 | 4 | 3.14 | 8 | 6840 | 2180 |
| Oven Fast Cure (1 hr @ 160 F.) | 2 | 4 | 3.14 | 8 | 10880 | 3470 |
| Field Cure | 2 | 4 | 3.14 | 7 | 7410 | 2360 |
| Field Cure | 2 | 4 | 3.14 | 24 | 9360 | 2980 |
| Field Cure | 2 | 4 | 3.14 | 24 | 10230 | 3260 |

3.1.2. Compressive Test 2

This example describes compressive strengths measured for products manufactured using Formulation A comprising different percentages of Ground Granulated Blast Furnace Slag (GGBFS) and Fly Ash. The results of this test are summarized in Table 5.

TABLE 5

Test for products manufactured using Formulation A

| % Split | #1 | #1 | #2 | #2 | #3 | #3 | #4 | #4 | #5 | #5 |
|---|---|---|---|---|---|---|---|---|---|---|
| Sample ID | 1 | 1 | 2 | 2 | 3 | 3 | 4 | 4 | 5 | 5 |
| Fly Ash, wt %/ GGBFS wt %/ | Fly Ash* 30%/ GGBFS 70% | | Fly Ash* 40%/ GGBFS 60% | | Fly Ash* 50%/ GGBFS 50% | | Fly Ash* 60%/ GGBFS 40% | | Fly Ash* 70%/ GGBFS 30% | |
| Diameter (Inch) | 2.0 | 2.0 | 2.0 | 2.0 | 2.0 | 2.0 | 2.0 | 2.0 | 2.0 | 2.0 |
| Length (Inch) | 4.0 | 4.0 | 4.0 | 4.0 | 4.0 | 4.0 | 4.0 | 4.0 | 4.0 | 4.0 |
| Area (Inch2) | 3.14 | 3.14 | 3.14 | 3.14 | 3.14 | 3.14 | 3.14 | 3.14 | 3.14 | 3.14 |
| Age Tested (Days) | 4 | 4 | 4 | 4 | 4 | 4 | 4 | 4 | 4 | 4 |
| Ultimate Load (psi) | 19930 | ND | 12970 | 24050 | 23290 | 19950 | 17860 | 26930 | 26970 | 25420 |
| Average Ultimate Load (psi) | — | | 18510 | | 21620 | | 22395 | | 26195 | |

TABLE 5-continued

Test for products manufactured using Formulation A

| % Split | #1 | #1 | #2 | #2 | #3 | #3 | #4 | #4 | #5 | #5 |
|---|---|---|---|---|---|---|---|---|---|---|
| Ultimate Strength (psi) | 6350 | 4130 | 4130 | 7660 | 7420 | 6350 | 5690 | 8580 | 8590 | 8100 |
| Average Ultimate Strength (psi) | | 5240 | | 5895 | | 6885 | | 7135 | | 8345 |

*Class F Fly Ash

3.1.3. Compressive Test 3

A total of eleven (11) 2-inch×4-inch grout cylinder samples were cast using Formulation A (comprising Fly Ash, 60% w/w; GGBFS, 40% w/w) for testing. For samples 1, 2 and 3, 6000/lbs of Formulation A was placed in a large bag and suspended over a rotor-stator pump/mixer. The mixer drew the formulation from a hopper, hydrated the formulation and mixed (50 sec "POC Pour" samples, or 3 min for "POC with Color" samples) using a downline auger. The hydrated formulation was pressurized into a 35 mm diameter hose and poured into the forms (similar to pouring an above ground foundation). For control sample 4, the formulation was mixed for 3 minutes with water, at 324 rpms in a planetary style food grade mixer, poured into the forms. All samples were oven cured for 24 hours at approximately 160° F. Grout cylinder samples were labeled in accordance with their material properties as follows: Control (2 samples), proof of concept (POC) w/Color (3 samples), Skim Coat (2 samples) and POC Pour (4 samples). Cylinders were prepared and tested in general accordance with ASTM C39.

Results

The results of the compressive strength testing are shown in Table 6. The results indicate. The industry standard requirements for stucco is a compressive strength of between 1800 psi and 2000 psi. The results show a compressive strength that exceeds those requirements by 150%-200%. Sample 5, which used Formulation B as a skim coat also exceeded the industry standard requirements by more than 100%. Sample 6, which used Formulation C as a poured-in-place application also exceeded the industry standard requirements by 150%-250%.

TABLE 6

Compression Test Results for products manufactured using Formulation A

| | Formulation A/Pull Test | |
|---|---|---|
| Properties Core ID | Sample A (Green) (C-1583 substrate) | Sample B (Red) (C-1583 overlay) |
| Diameter (Inch) | 2.0 | 2.0 |
| Length (Inch) | 4.0 | 4.0 |
| Area (Inch$^2$) | 3.14 | 3.14 |
| Age Tested (days) | 24 | 24 |
| Ultimate Load (lbs.) | 13290 | 15930 |
| Ultimate Strength (psi) | 4230 | 5070 |

TABLE 6-continued

Compression Test Results for products manufactured using Formulation A

| | POC Pour | | | |
|---|---|---|---|---|
| Properties Core ID | Sample 1[§] | Sample 2[§] | Sample 3[§] | Control Sample 4[¶] |
| Diameter (Inch) | 2.0 | 2.0 | 2.0 | 2.0 |
| Length (Inch) | 4.0 | 4.0 | 4.0 | 4.0 |
| Area (Inch$^2$) | 3.14 | 3.14 | 3.14 | 3.14 |
| Age Tested (days) | 70 | 70 | 70 | 70 |
| Ultimate Load (lbs.) | 9160 | 9360 | 8920 | 24620 |
| Ultimate Strength (psi) | 2920 | 2890 | 2840 | 7840 |

| | POC with Color | | |
|---|---|---|---|
| Properties Core ID | Sample 1[¶] | Sample 2[¶] | Control Sample 4[¶] |
| Diameter (Inch) | 2.0 | 2.0 | 2.0 |
| Length (Inch) | 4.0 | 4.0 | 4.0 |
| Area (Inch$^2$) | 3.14 | 3.14 | 3.14 |
| Age Tested (days) | 41 | 41 | 41 |
| Ultimate Load (lbs.) | 15700 | 14660 | 11610 |
| Ultimate Strength (psi) | 5000 | 4670 | 3700 |

| | Control | |
|---|---|---|
| Properties Core ID | Sample 5 (Formulation B) | Sample 6 (Formulation C) |
| Diameter (Inch) | 2.0 | 2.0 |
| Length (Inch) | 4.0 | 4.0 |
| Area (Inch$^2$) | 3.14 | 3.14 |
| Age Tested (days) | 99+ | 99+ |
| Ultimate Load (lbs.) | 6200 | 27230 |
| Ultimate Strength (psi) | 1970 | 8400 |

[§]50 second mixing;
[¶]3 min mixing

3.1.4. Recycled Concrete Aggregate (RCA) Test

This test was designed to determine the compressive strength of a 70%: 30% mix ratio of Formulation A with Recycled Concrete Aggregate (RCA).

Method

Formulation A was prepared using sand (Home Depot, source: MSU) and 18 mm basalt fibers. 15% (w/w) water was added to the dry mix and the ingredients mixed using a Hobart mixer with the paddle blade attachment, at speed 1. Mixing initiated the gelling phase after 13 minutes. Two (2) 2-inch×4-inch sample cylinders were filled with the mixture and allowed to set (~30 minutes). The cylinders were placed in a 200° F. oven for 40 minutes.

Results

The two cylinders were tested for compressive strength (Testing Engineers Inc. San Leandro, CA) and found to have compressive strengths of 5,470 psi and 5,530 psi for the formulations that included RCA (see Table 7, sample #23, 24). These compressive strengths are significantly above the 2500 psi-3000 psi requirements for poured-in-place wall constructions. RCA being a waste product with limited re-use applications, its inclusion in the geopolymer formulations disclosed herein introduces eco-friendly practices to manufacturing. The low nominal costs associated with RCA also provides economic advantages by reducing overall manufacturing costs.

TABLE 7

Compressive test results for building materials manufactured using Formulation A

| # | Batch # | H2O (Temp) | BF§ (Length) | Cure Conditions | Remarks | Final Wt. | Compressive Strength (psi) |
|---|---|---|---|---|---|---|---|
| 1 | 2 and 3 | 16% (50-60° F.) | 0.5% (18 mm) | Oven, 160° F. | 50/50 Mix of Batch 2 and 3 | 390 | 5330 |
| 2 | 2 and 3 | 16% (50-60° F.) | 0.5% (18 mm) | Oven, 160° F. | 50/50 Mix of Batch 2 and 3 | 390 | 4490 |
| 3 | 2 and 3 | 16% (50-60° F.) | 0.5% (18 mm) | Oven, 160° F. | 50/50 Mix of Batch 2 and 3 | 395 | 5430 |
| 4 | 2 | 14% (50-60° F.) | 1% (18 mm) | Oven, 160° F. | Batch 2 Only | 405 | 7820 |
| 5 | 2 | 14% (50-60° F.) | 1% (18 mm) | Oven, 160° F. | Batch 2 Only | 415 | 7350 |
| 6 | 2 | 14% (50-60° F.) | 1% (18 mm) | Oven, 160° F. | Batch 2 Only | 410 | 7410 |
| 7 | 2 | 15% (50-60° F.) | 1% (18 mm) | Oven | N/A | 420 | 8400 |
| 8 | 2 | 15% (50-60° F.) | 1% (18 mm) | 45-65° F. | N/A | 420 | 7660 |
| 9 | 2 | 15% (50-60° F.) | 1% (18 mm) | Oven | N/A | 430 | 8980 |
| 10 | N/A | 15% (78.4° F.) | 1% (18 mm) | Oven, 160° F. | Sample 1A (100% silica sand; 0% HD* sand) | 425 | 8310 |
| 11 | N/A | 15% (78.4° F.) | 1% (18 mm) | 45-65° F. | Sample 1B (100% silica sand; 0% HD sand) | 435 | 7790 |
| 12 | N/A | 15% (78.4° F.) | 1% (18 mm) | Oven, 160° F. | Sample 2A (80% silica sand; 20% HD sand) | 435 | 8180 |
| 13 | N/A | 15% (78.4° F.) | 1% (18 mm) | 45-65° F. | Sample 2B (80% silica sand; 20% HD sand) | 435 | 7970 |
| 14 | N/A | 15% (78.4° F.) | 1% (18 mm) | Oven, 160° F. | Sample 3A (60% silica sand; 40% HD sand) | 430 | 8620 |
| 15 | N/A | 15% (78.4° F.) | 1% (18 mm) | 45-65° F. | Sample 3B (60% silica sand; 40% HD sand) | 435 | 9590 |
| 16 | N/A | 15% (78.4° F.) | 1% (18 mm) | Oven, 160° F. | Sample 4A (20% silica sand; 80% HD sand) | 420 | 8040 |
| 17 | N/A | 15% (78.4° F.) | 1% (18 mm) | 45-65° F. | Sample 4B (20% silica sand; 80% HD sand) | 430 | 8830 |
| 18 | N/A | 15% (78.4° F.) | 1% (18 mm) | Oven, 160° F. | Sample 5A (0% silica sand; 100% HD sand) | 430 | 8390 |
| 19 | N/A | 15% (78.4° F.) | 1% (18 mm) | 45-65° F. | Sample 5B (0% silica sand; 100% HD sand) | 420 | 8150 |
| 20 | 2 and 3 | 14% (50-60° F.) | 0.5% (18 mm) | | 50/50 Mix of Batch 2 and 3 | 415 | 7160 |
| 21 | 2 and 3 | 14% (50-60° F.) | 0.5% (18 mm) | | 50/50 Mix of Batch 2 and 3 | 410 | 6520 |
| 22 | 2 and 3 | 14% (50-60° F.) | 0.5% (18 mm) | | 50/50 Mix of Batch 2 and 3 | 410 | 5670 |
| 23 | 2 | 15% (50-60° F.) | 1% (18 mm) | Oven, 200° F. | Formulation A /RCA 70/30 | 405 | 5470 |
| 24 | 2 | 15% (50-60° F) | 1% (18 mm) | Oven, 200° F. | Formulation A /RCA 70/30 | 415 | 5530 |
| 25 | N/A | 15% (50-60° F.) | 1% (18 mm) | Field cured for 14 hours (50° F.) followed by oven cured for 4 hours (102° F.) | no sodium metasilicate, sodium hydroxide only | 430 | 5810 |

§BF, Basalt Fibers
*HD = low silica content

3.2. Bond Strength Tests

3.2.1. Bond Strength for Cold Joint-Test 1

A total of four (4) grout tiles and two (2) 2 by 4-inch grout cylinder samples were cast and provided by you for testing. Grout tiles for bond testing were reportedly coated with the geo-polymer after specific cure times. Tiles were identified by their cure times and were labeled 4 hours, 24 hours and 30 days. A tile with no coating was labeled as a control. Three (3) pull tests were performed on each tile. Per ASTM C-1583, Aluminum test fixtures, 50 mm diameter, were adhered to the drilled sample using a two-part epoxy adhesive. This assembly was left to cure a minimum for 24 hours. Bond testing was performed using an Elcometer Model F510-50T (serial #TJO7128 & calibrated on Nov. 16, 2022) at a rate of 29 psi/sec. Grout cylinder samples were labeled in accordance with their material properties as follows: (2) Green/Substrate, (3) Red/Overlay. Cylinders were prepared and tested in general accordance with ASTM C39. The results of these tests shown in Tables 6 and 10 show that materials manufactured using the formulation disclosed herein passed the bond strength test because the sample did not break at the joint when compared to the control sample.

TABLE 10

Assessment of Tensile Strength[1] - Adhesion (Pull-off) Values (psi)

| Standard Value | Control sample (No Formulation A) | Test Sample (Formulation A) | | |
|---|---|---|---|---|
| | | 4 h | 24 h | 30 days |
| 200 | 320.6 | 324.7 | 308.8 | 257.8 |
| 200 | 433.6 | 319.1 | 306.3 | 337.3 |
| 200 | 340.6 | 304.5 | 297.1 | 291.4 |
| | 365 | 316 | 304 | 296 |
| Average ± STDEV | 365 ± 60 psi | 316 ± 10 psi | 304 ± 6 psi | 296 ± 40 psi |

[1] performed in accordance with ASTM C-1583 "Bond Strength Test"

3.2.2. Bond Strength for Cold Joint-Test 2

A total of four (4) grout tile samples were cast for testing. Grout tiles for bond testing were coated with the geopolymer after specific cure times. Tiles were identified by their cure times and were labeled 4 hours, 24 hours and 30 days. A tile with no coating was used as control. Three (3) tests were performed on each tile. Aluminum test fixtures, 50 mm diameter, were adhered to the drilled sample using a two-part epoxy adhesive. This assembly was left to cure a minimum for 24 hours. Bond testing was performed using an Elcometer Model F510-50T at a rate of 29 psi/sec.

Results

The results of the compressive strength testing is shown in Table 11. Considering that the typical range for adhesion values for Portland cement-based stucco is 3-5 psi, the results presented here indicated that adhesion values for the geopolymer formulations disclosed herein are significantly superior and can be raised to at least 200 psi with no cold joint.

TABLE 11

Results of Adhesion Strength

| Cure times | Tests | Typical Design Adhesion (Pull-off) Value (psi) | Tested Adhesion (Pull-off) Value (psi) | Type of failure |
|---|---|---|---|---|
| Control | C-1 | 200 | 320.6 | Grout substrate |
| | C-2 | 200 | 433.6 | Grout substrate |
| | C-3 | 200 | 340.6 | Grout substrate |
| 4 hours | 4-A | 200 | 324.7 | Grout substrate |
| | 4-B | 200 | 319.1 | Grout substrate |
| | 4-C | 200 | 304.5 | Grout substrate |
| 24 hours | 24-A | 200 | 308.8 | Grout substrate |
| | 24-B | 200 | 306.3 | Grout substrate |
| | 24-C | 200 | 297.1 | Grout substrate |
| 30 hours | 30-A | 200 | 257.8 | Grout substrate |
| | 30-B | 200 | 337.3 | Grout substrate |
| | 30-C | 200 | 291.4 | Grout substrate |

3.3. Flexural Strength Test

This test was performed in accordance with the ASTM C-78. Briefly, one sample (Test #1) was mixed for 3 minutes in a lab mixer (108/rpms), allowing for a total of 324/rpms. A second sample (Test #2) was mixed for 3 minutes with a drill for a total of 1500/rpms. A third sample (Test #3) was mixed for 3 minutes, with a drill as for Test #2, but for a total of 4500/rpms. The results of the text are shown in Table 12 below.

TABLE 12

Assessment of Flexural Strength using Formulation A

| Sample | A | | | B | | | C | | |
|---|---|---|---|---|---|---|---|---|---|
| Mixer Speed | Mixed @ 324/rpm | | | Mixed @ 500/rpm | | | Mixed @ 1000/rpm | | |
| Length (Inch) | 21" | | | 21" | | | 21" | | |
| | Test # | | Average | Test # | | Average | Test # | | Average |
| Width (Inch) | 1 | 6.020 | | 1 | 5.980 | | 1 | 6.040 | |
| | 2 | 6.040 | 6.030 | 2 | 6.000 | 5.990 | 2 | 6.030 | 6.030 |
| | 3 | 6.050 | | 3 | 6.010 | | 3 | 6.020 | |
| Depth (Inch) | 1 | 5.990 | | 1 | 6.010 | | 1 | 6.000 | |
| | 2 | 5.980 | 5.980 | 2 | 6.010 | 6.010 | 2 | 5.990 | 5.990 |
| | 3 | 5.970 | | 3 | 6.000 | | 3 | 5.990 | |
| Ultimate Load (psi) | | 9570 | | | 9070 | | | 8440 | |
| Ultimate Load × span (psi) | 9570 × 18 = 172,260 | | | 9070 × 18 = 163,260 | | | 8440 × 18 = 151,920 | | |
| Avg. Width × Avg. Depth | 6.03 × 3S.76 = 215.63 | | | 5.99 × 36.12 = 216.36 | | | 6.03 × 35.88 = 216.35 | | |
| Correction Factor | — | | | — | | | — | | |
| Age Tested (days) | 21 | | | 21 | | | 21 | | |
| Modulus of Rupture (psi) | 800 | | | 750 | | | 700 | | |
| | | | | Average, 750 | | | | | |

3.4. Adhesion Properties
3.4.1. Adhesion Test 1

This test was performed to determine adhesion of the formulations disclosed herein to industry approved standard substrates.

Test walls (128 sf each) comprising (i) paper and lath over an oriented strand board (OSB), (ii) chicken wire over OSB, and (iii) OSB alone (FIGS. 3A-3D) are sprayed to a thickness of 1" with Formulation A. The spray was allowed to cure for 7 days.

Results

The formulation was found to adhere to all substrates. From an operational perspective, five workers could handle the work, spraying at 125 lbs/min and completing all 3 walls in about 20 min. Thus, a 1500/sf house can be sprayed 1" thick in less than a day as opposed to weeks when using traditional stucco.

3.4.2. Adhesion Test 2

Figure 4:
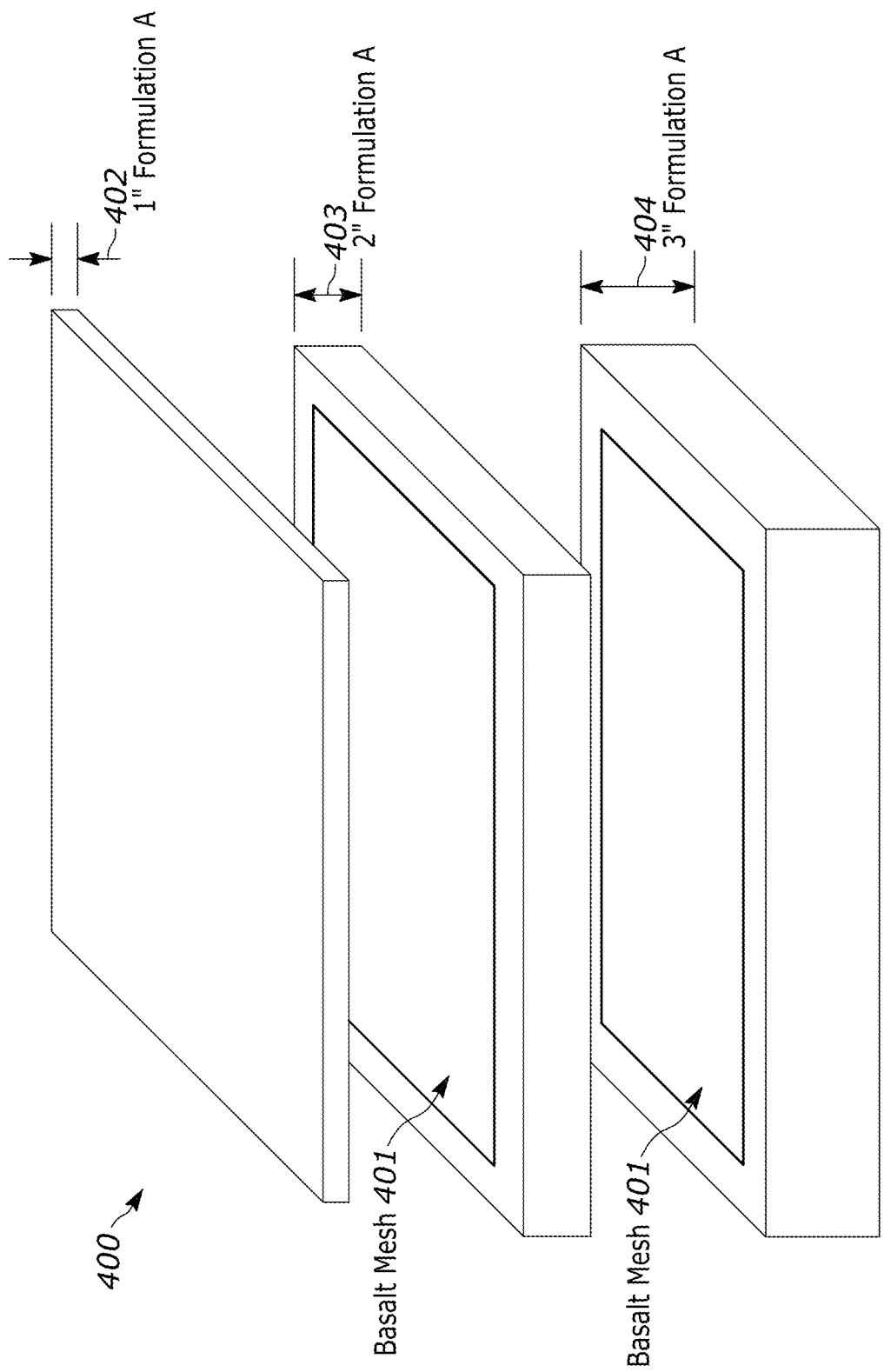
FIG. 4 illustrates a test surface comprising two layers of building materials constructed using Formulation A interspersed with 1 basalt fiber meshes for improving adherence.

This test is performed to determine adhesion of the formulations disclosed herein to basalt mesh. 3" of Formulation A was poured into a form in two pours. The first pour consisted of 2" into mold. A 50 mm basalt mesh was then laid on top of the 2" of cured Formulation A. An additional 1" of Formulation A was then poured on top of the 50 mm basalt mesh. FIG. 4 illustrates a test surface 400 comprising two layers of building materials 402, 403, and 404 constructed using Formulation A interspersed with basalt fiber mesh layers 401 for improving adherence.

Results

The cured formulation was found to adhere to uncoated basalt fiber mesh. It was confirmed that the fiber mesh helped keep the building material intact during a fracture.

3.5. Joint Properties

Cold joints tend to have higher permeability compared to monolithic joints. In cold joints, the interface between two sections may not have proper bonding, resulting in pathways for moisture and other substances to penetrate into the structure. This leads to corrosion and deterioration of the structure over time. A monolithic joint is a substantially unified, seamless connection or structure formed as a single entity without separations. As applied to construction materials, a monolithic joint embodies a strong, durable connection where materials are chemically and/or physically fused into a single, cohesive unit. To determine whether building materials made using the formulations disclosed herein have cold or monolithic joint properties, hemispheres made using various formulations were tested using joint compounds made from various formulations, in different combinations as shown in Table 13A.

TABLE 13A

Exemplary formulations used for testing joint properties

| Formulation for Exemplary Building Material (Spheres) | Formulation for Joint Compound |
|---|---|
| Formulation A | Formulation A |
| Formulation B | Formulation B |
| Formulation C | Formulation C |
| Formulation A | Formulation B |
| Formulation A | Formulation C |
| Formulation B | Formulation A |
| Formulation B | Formulation C |
| Formulation C | Formulation A |
| Formulation C | Formulation B |

Figures 5A, 5B:
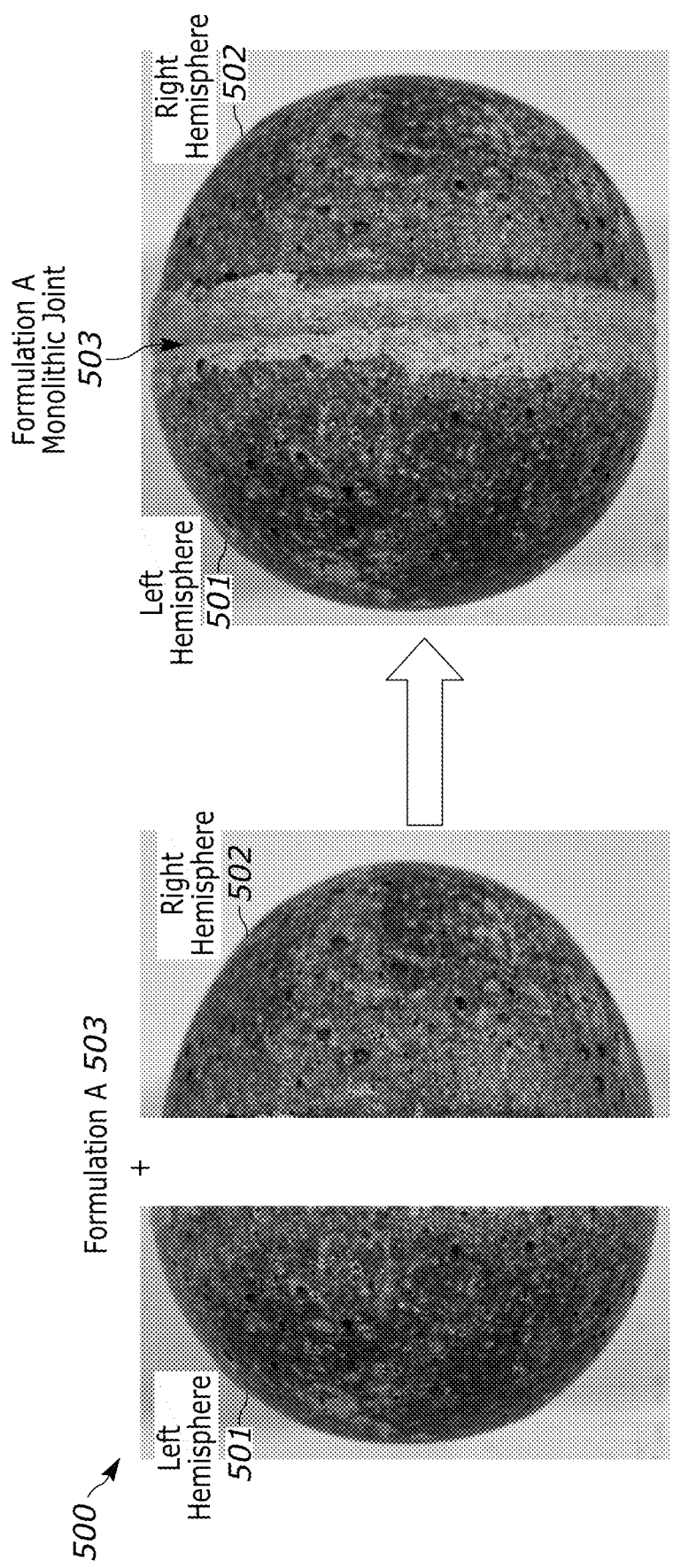
FIGS. 5A and 5B illustrate a test used to determine joint properties of building materials manufactured using the exemplary formulations disclosed herein.

Spheres made from the indicated formulations were cured and cut in half. The hemispheres were then glued together using the indicated joint formulations. FIGS. 5A-5B show a representative experiment using Formulation A for the building material and Formulation A for the joint compound. The hemispheres 501 and 502 were glued using Formulation A 503, followed by curing the joint prior to testing.

Results: The joint formed between the two hemispheres was found to have monolithic joint properties. This is advantageous since the conjoined structures behave as a single structure that is impervious to the elements thereby eliminating the costs and resources associated with maintenance and repair. These results were confirmed through bond testing performed by a third party per ASTM C-1583 (See Tables 10 and 13B).

TABLE 13B

Compression Test for products using Formulation A

| Properties | E84 Batch + 12 mm fibers and pigment | E84 Batch + 12 mm fibers and pigment | E84 Batch + 12 mm fibers and pigment + additional H2O |
|---|---|---|---|
| Diameter (Inch) | 2.0 | 2.0 | 2.0 |
| Length (Inch) | 4.0 | 4.0 | 4.0 |
| Area (Inch$^2$) | 3.14 | 3.14 | 3.14 |
| Age Tested (hours) | 41 | 41 | 41 |
| Ultimate Load (mean lbs.) | 15700 | 14660 | 11610 |
| Ultimate Strength (mean psi) | 5000 | 4670 | 3700 |

Similar results were obtained for all combinations of the formulations. The indicated formulas were also tested on existing, cured, hardened, and broken Portland cement-based concrete. These tests showed that the formulas effectively repaired cracks, making them watertight. Furthermore, the formulas create a chemical bond between new and old concrete materials when bonding cold joints, resulting in a seamless, monolithic structure. This unique property eliminates the weak interface found in traditional concrete repairs, ensuring long-term durability and greater flexibility in construction and repair schedules. Such features observed for the geopolymer formulations disclosed herein are superior to those achievable for other types of building materials including Portland cement-based products.

3.6. Water Intrusion Test

This test was performed to determine the ability of building materials 600 manufactured using the formulations disclosed herein to exclude water from seeping into the interior of the structure.

Figure 6:
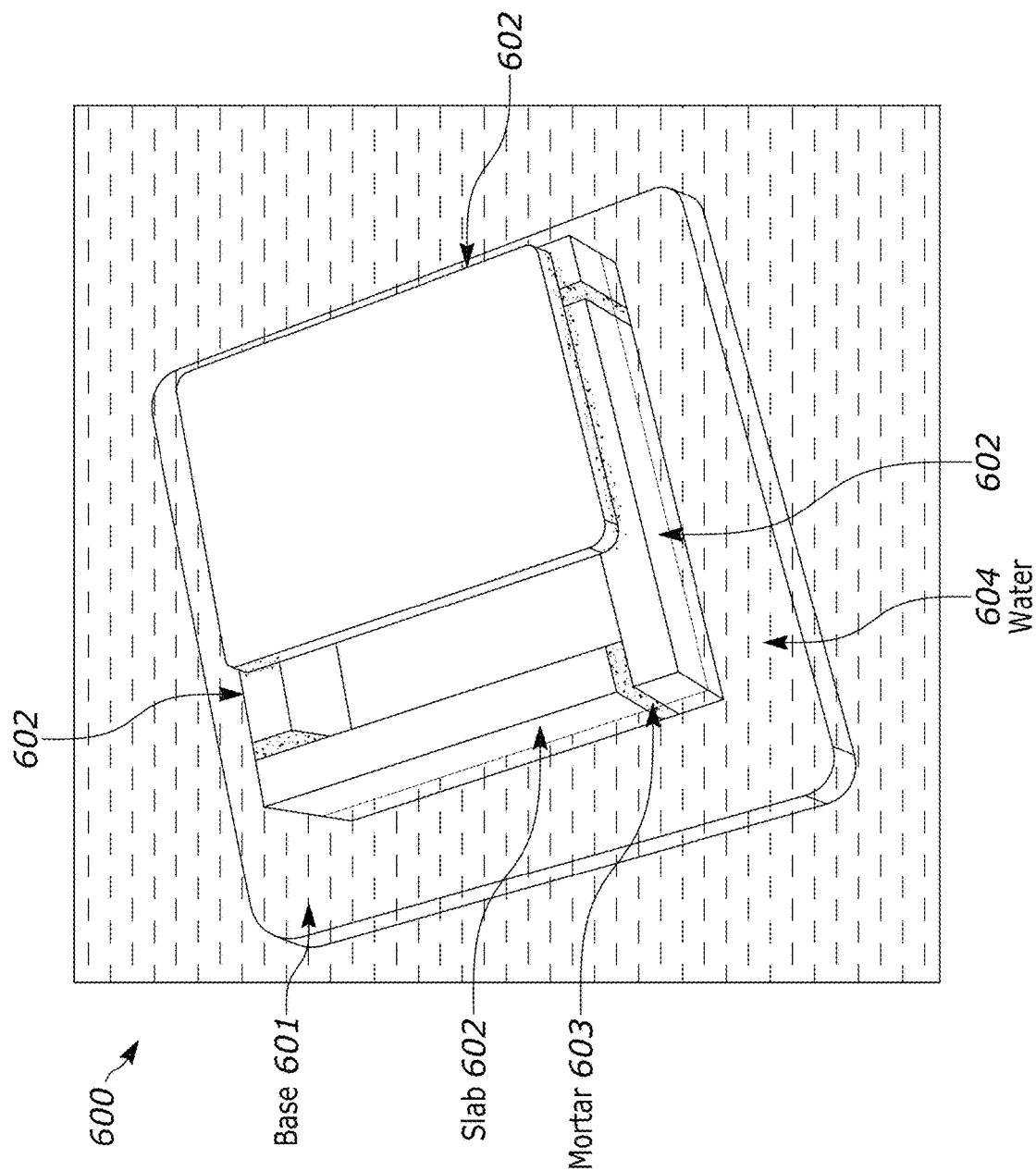
FIG. 6 illustrates a set up for the water intrusion test, performed to determine the ability of building materials manufactured using the formulations disclosed herein to exclude water from seeping into the interior of the structure.

Method: A base (7.5-inch×7.5-inch) 601 and side panels (6-inch×6-inch×⅜-inch slabs) 602 were manufactured using Formulation A. The slabs were affixed to the base using Formulation A as mortar 603 at the joints to make a "box" that was open at the top for observation (FIG. 6). The box was submerged in water, 604 and visually inspected for entry of water at various times from 30 minutes to 96 hours.

Results: No moisture was detected on the interior of the box for the entirety of the test period indicating that the slabs, base and mortar joints were impervious to moisture.

3.7. Appearance and Definition Test

This test was performed to determine whether materials created using the formulations disclosed herein are able to capture subtle architectural definitions on the mold.

An acrylonitrile butadiene styrene (ABS) or PVC pipe was cut longitudinally and screwed to a wooden form. Formulation A was poured into the form, and after ensuring the absence of air bubbles by tapping, allowed to cure overnight at ambient temperature.

Results

Figure 7:
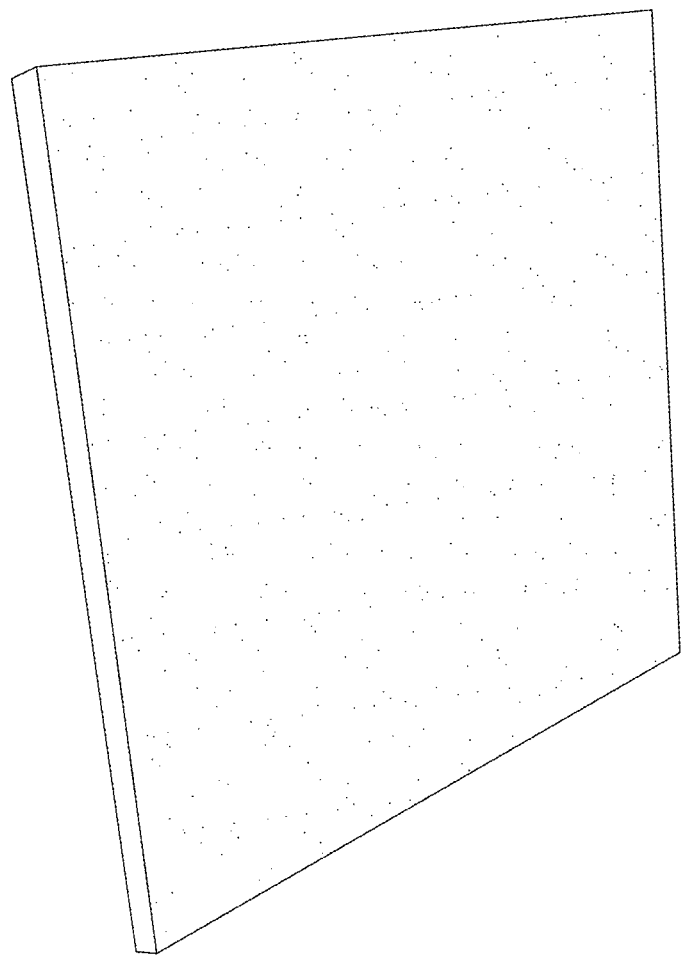
FIG. 7 shows the sheen/luster appearance of a concrete building material fabricated using Formulation A, which is poured into an ultra-smooth surface form.

It was observed that the cured material was able to pick up as little as a ⅓₂" scratch in the mold. These features are particularly beneficial when manufacturing exterior finishes with high definition (described in the next section). Also, the cured material is not permanently bonded to ABS/PVC plastics, which increases the ease of removing structural products prepared by the methods disclosed herein. The building material manufactured using the exemplary Formulation A (with no dye added), had a green color with sheen (FIG. 7). The material had efflorescence, which was neutralized with a mixture of baking soda and vinegar in water. After 14 days, the material can be polished to a desired luster.

3.8. Color Bonding and Manufacture of Exterior Finishes

The ability to manufacture exterior finishes such as siding and roofing using the building materials described herein was also evaluated. To do this, OSB wood embossed siding was cut to 12" lengths, stacked in a form and coated with silicone. A desired dye (color) was doped into the dry Formulation A composition. After addition of water and mixing, the Formulation A containing the dye was poured into the forms.

Results

This study confirmed the ability of creating high definition, exterior finishes including, but not limited to siding panels, stone molds, soffit panels, and roof tiles. This allows one to be fire-proof and protect any structure.

Example 4. Fire Resistance Properties of the Cured Geopolymer Product 4.1. Burn Tests 4.1.1. Burn Test 1. Burn Time of Old Stucco (Stucco from Preexisting Structures)

Test

To understand the thermal properties of building materials comprising the formulation disclosed herein, a 40-year-old stucco sample was removed from an existing structure.

A burn test was then performed on both the existing 40-year-old conventional stucco (control sample), and the same control sample with ¼" of Formulation A applied by hand trowel. The surface was neither washed nor cleaned prior to testing. One-fourth of Formulation A was applied to control within 10 min of hydration and allowed to cure for 60 minutes in an oven at 160° F. Both control and test samples were heated using a blow torch containing MAPP gas, to approximately 3500° F. and recorded the time needed for the heat to transfer to the back of the stucco, reaching 350° F.

Results

The results showed the time it took for the heat to transmit through the control sample which occurred in 298 seconds. Whereas the transfer of heat through the test sample with one-fourth of Formulation A was delayed to 410 seconds.

Conclusion

Upon continued testing, it is concluded that doubling the thickness does not double the delay time. It was also observed after testing that the 40 years of paint and ¼" of the original stucco was impregnated. Also, the testing temperatures of about 1900° F. were higher than the testing temperatures of 1382° F. used by testing agencies for their standardized tests per ASTM (which is the average temperature of a structure fire).

4.1.2. Burn Test 2. Burn Time of New Stucco

Test

A 4'×4' stucco sample was poured to a thickness of 1" with Formulation A. After allowing the sample to cure outside for seven days, the sample was then burned for 45 min using a 199,000 BTU torch at 1900° F. Visual inspection of the sample revealed minor surface cracking and discoloration. The ¼" thick charred material was scraped and removed. The ¼" thick layer was replaced with a ¼" thick layer of Formulation B by method of hand application with a trowel. The sample was allowed to cure outside for seven days before performing the heat transmission test as described for Burn Test 1.

Results

The results showed no change in time transmission of heat from the front to the back of the sample.

Conclusion

These studies therefore revealed that extreme heat (1900° F.) despite some visual cracking and discoloration, extreme heat did not cause permanent damage to the building material of the presently disclosed subject matter. This indicates that the disclosed materials are amenable to aesthetic repairs without affecting their thermal protective properties.

4.1.3. Burn Test 3. Burn Time of New Stucco

Test

This test was performed to evaluate the thermal properties of 1" thick stucco on a larger scale, using Formulation A to determine how quickly heat transfers through the material to the wooden framing members that have a combustion point of 350° F. A 4'×8' stucco sample of 1" thick, was embedded with thermocouples using Formulation A. After allowing the sample to cure for seven days, the sample was burned for 45 min using a 199,000 BTU torch at 1900° F. In a related analysis, the temperature was taken on the front surface, as well as the back surface adjacent to the burn site was also measured.

Results

The amount of time needed for heat transmission to reach 350F on the back side of the sprayed stucco panel was found to be 45 min.

Conclusion

This time frame proves to be longer than most external fires have fuel to burn.

Additional Test

While the test point of the torch on the outer surface reached 1900° F., adjacent test points on the outer surface 18" away failed to register temperatures above 150° F. (i.e., low heat conductivity). Once the burn test was complete, 55° F. water was applied with a ⅛" water hose, to the exact spot of the burn point, to see if introduction of cold water would show any signs of degradation or spalling.

Results

There were little to no signs of degradation and more importantly, there was absolutely no spalling.

Conclusion

These results show that we have a very low heat conductivity, which would suggest that first responders would be able to apply water directly to a burning structure without the risk of spalling thus limiting bodily injury or other damages caused from spalling material.

4.1.4. Burn Test 4. Burn Time of New Stucco

This test was performed to evaluate the thermal properties of 1" thick stucco on a larger scale, using Formulation A to determine how quickly heat transfers through the material to the wooden framing members that have a combustion point of 350° F. in a real-world application. For this test, the specimen was burned at a temperature of 1400° F. until failure, that is, the point at which the back side of the sample reached 350° F. (1382° F./750° C. is the temperature used for ASTM standard tests per the International Building Codes). The specimen for this test was burned for over 1.5 hours at 1400° F., at which point the test was terminated, as the registered temperature on the backside of the specimen never rose above 275° F.

Conclusion

These results suggest that the material, when applied at 1" thick, could prevent the transfer of heat from an external heat source of 1440° F., from reaching the framing members to a combustion point of 350° F., for at least 1.5 hours, allowing for the fire to exhaust its fuel source and allow the internal framing members of the structure to remain intact.

Figure 8A:
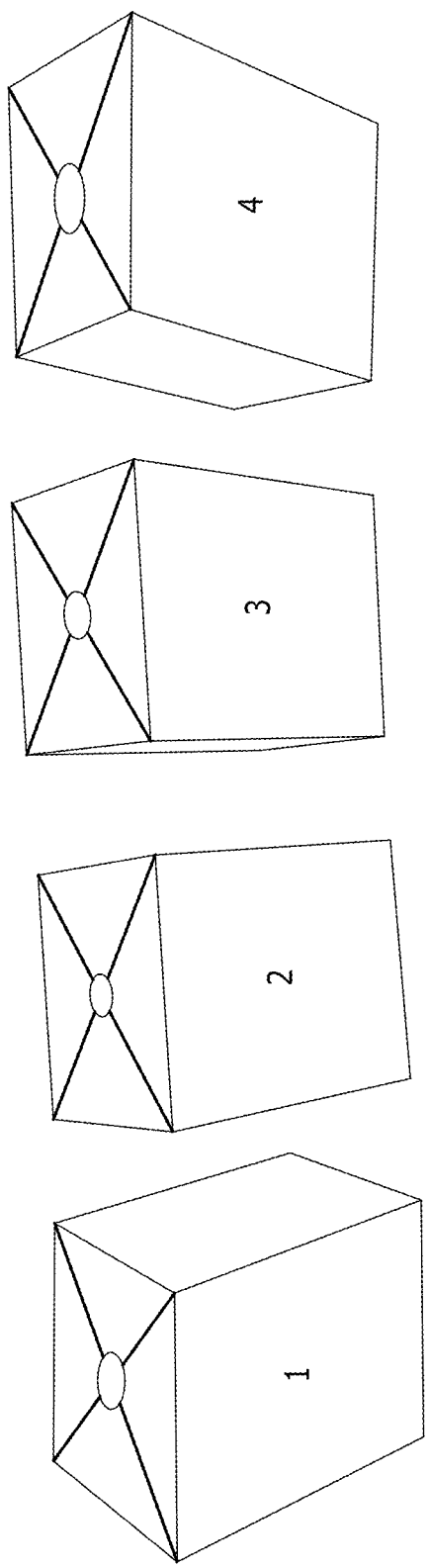
FIGS. 8A-8F illustrates the results of combustibility tests performed on the build materials disclosed herein.
Figure 8B:
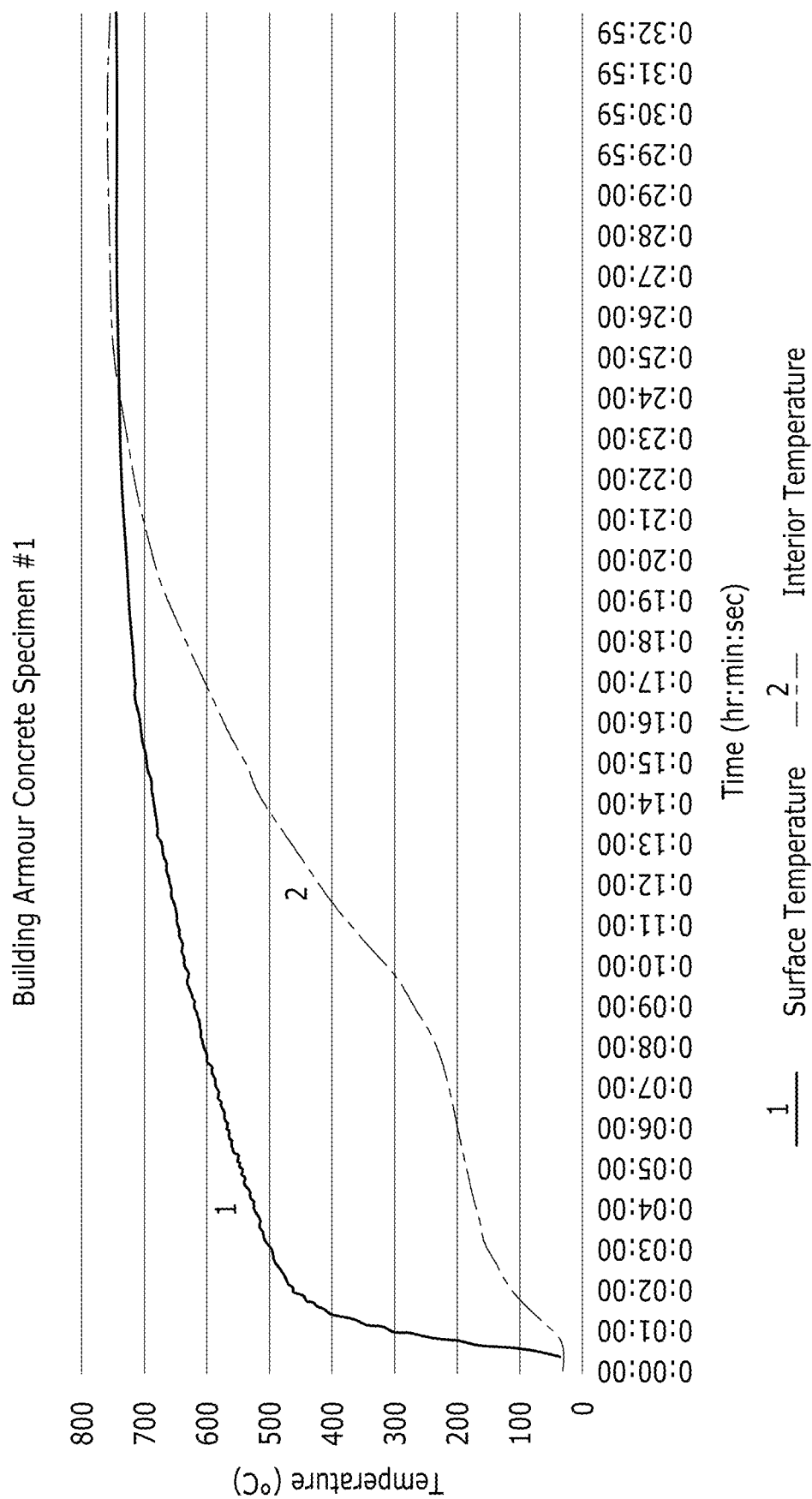
Figure 8C:
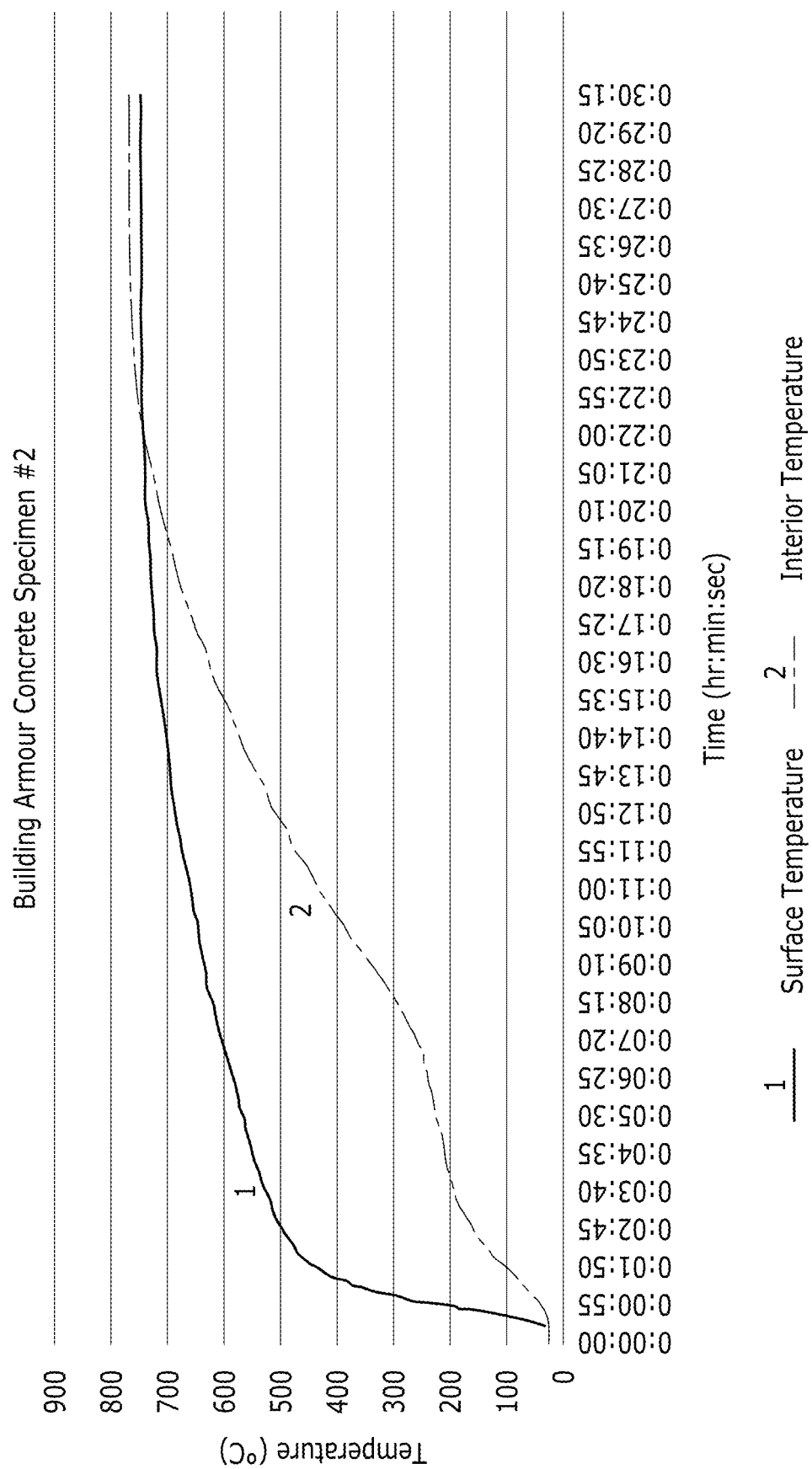
Figure 8D:
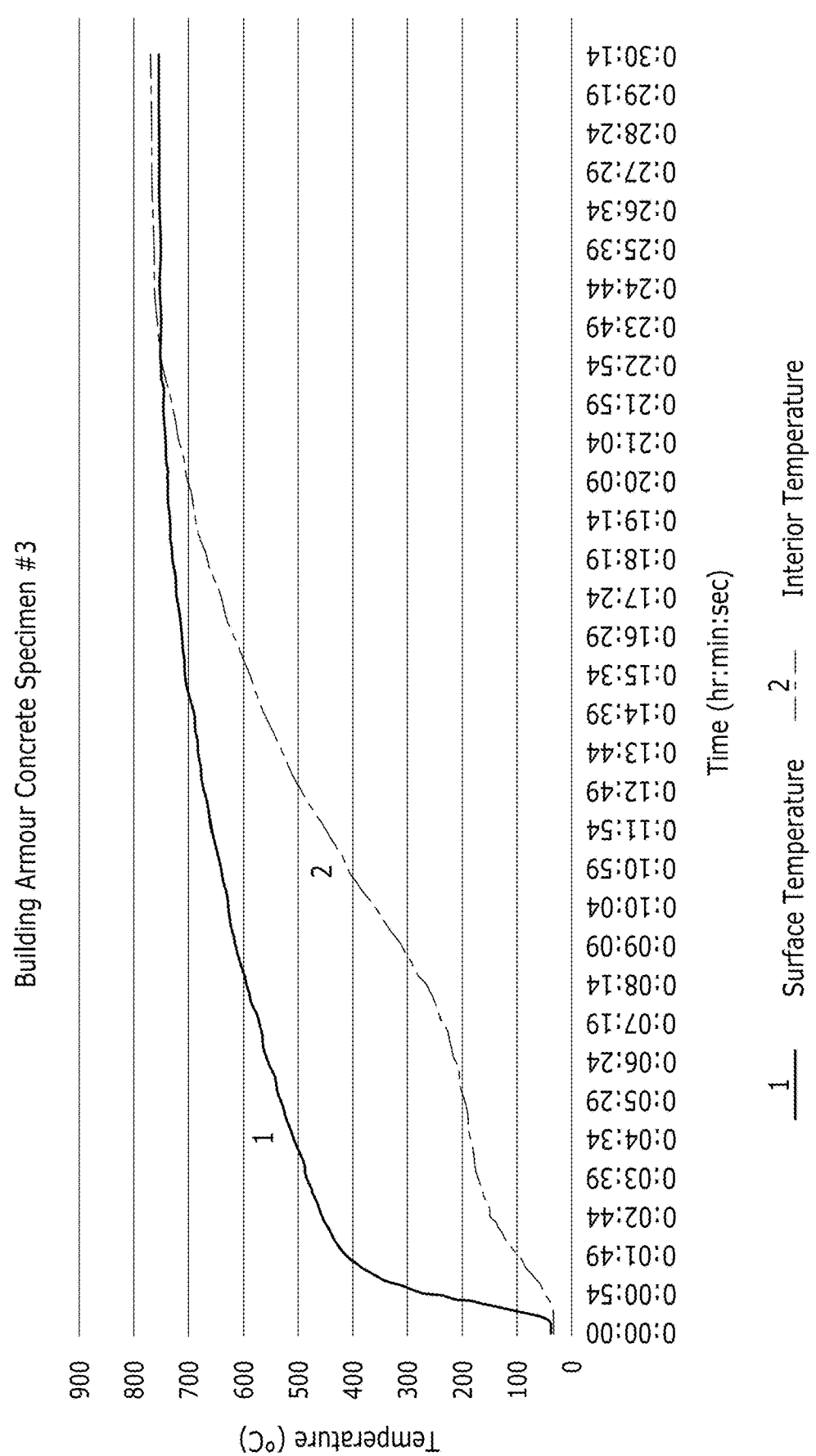
Figure 8E:
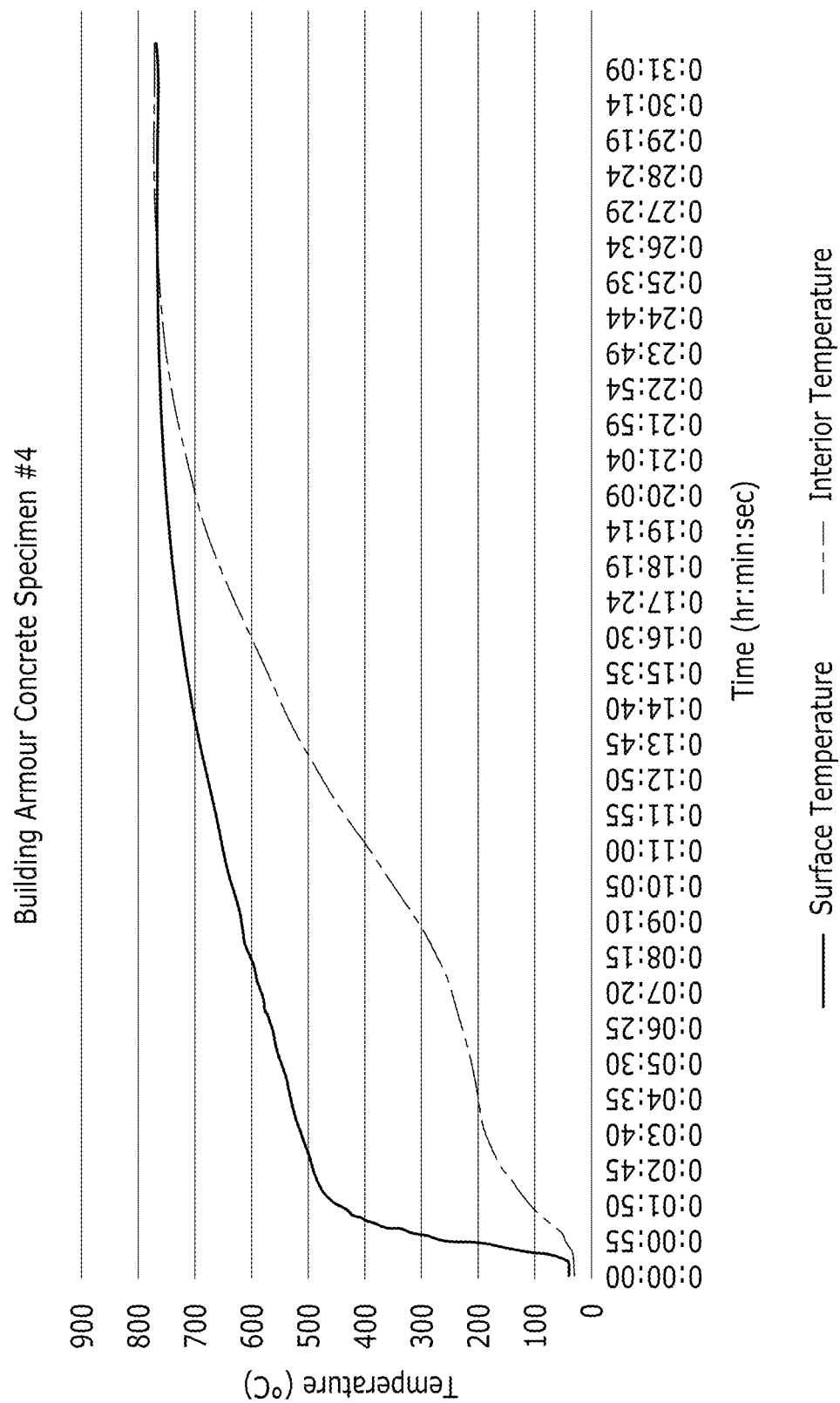
Figure 8F:
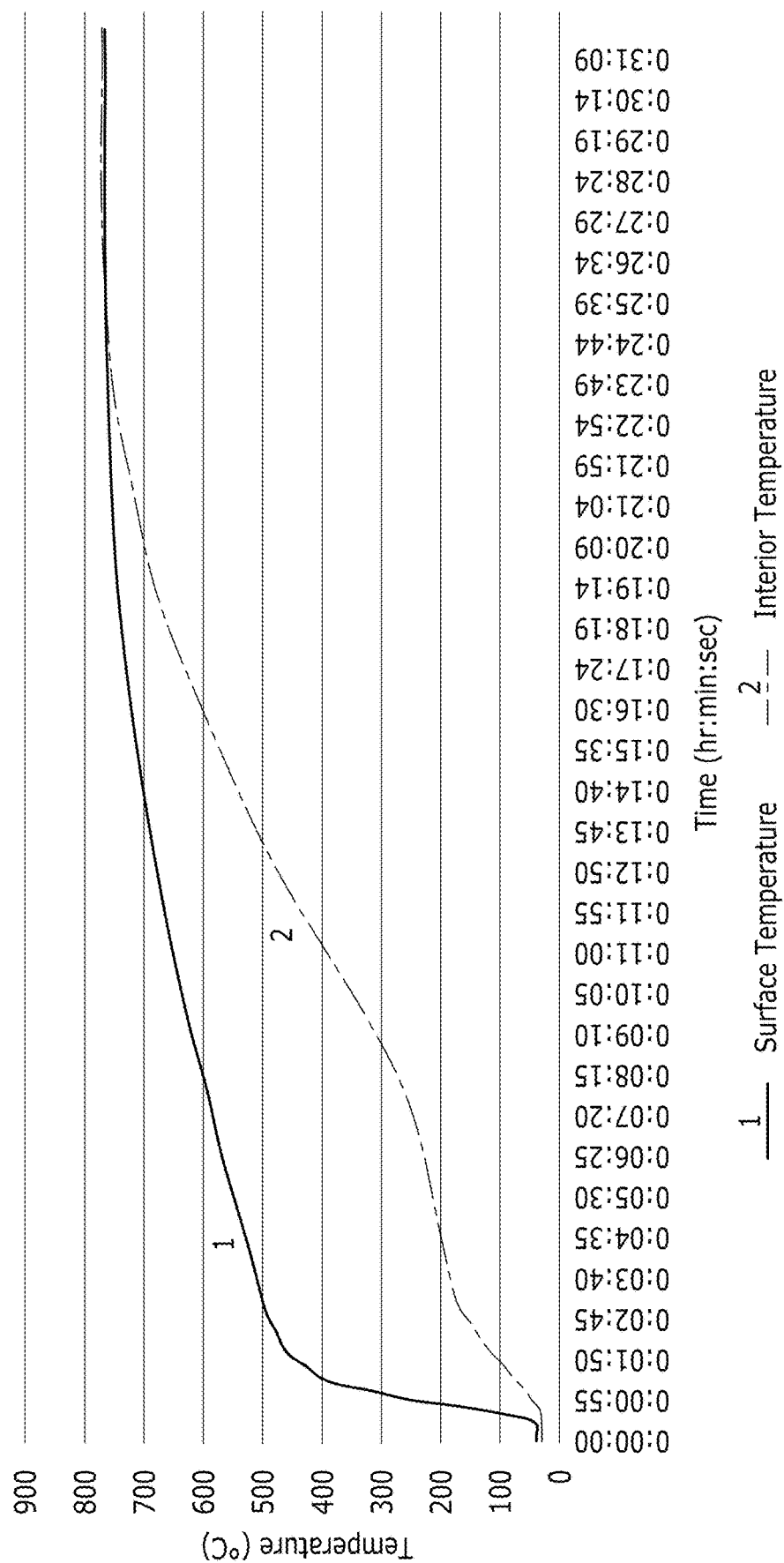

4.2. Combustibility Test per ASTM E-136:

Standard Test Methods for the Behavior of Materials in a Vertical Tube Furnace:

A standard test was used to test the behavior of materials in a vertical tube furnace. Briefly, test samples (#1 to #4, each 1.5"×1.5"×2", FIG. 8A) were dried at about 140° F. for at least 24 hours (but not more than 48 hours) and then placed in a desiccator to cool for at least 1 hr before testing. A Vertical Hot-Air Ignition Furnace, consisting of an electrical heating unit and a sample holder, was set at a temperature of 1382±10° F. (750±5.5° C.). The test sample was lowered into the furnace. Observations were made to the time of flaming of the specimen. The temperatures of the thermocouples are recorded. The test was continued until the temperature at the thermocouples had reached maximum, or until it was evident that the specimen did not pass this test.

If at least three of the four specimens tested meet the individual test specimen criteria, the test was recorded as a "Pass". When the weight loss of the test specimen is 50% or less, the material was deemed to have passed the test if, the recorded temperatures of the surface and interior thermocouples did not, at any time during the test rise more than 30° C. (54° F.) above the stabilized furnace temperature and there is no flaming of the specimen after the first 30 seconds. If the weight loss of the specimen exceeded 50%, the material was considered to have passed the test if, the recorded temperatures of the surface and interior thermocouples do not at any time during the test rise above the stabilized furnace temperature and no flaming of the specimen is observed at any time during the test.

Results

The test results of the flame spread, smoke and temperature tests shown in FIGS. 8B-8F and Table 14. Indicated that the test material was not combustible. The submitted samples were thus found to meet the classification as a non-combustible per testing to ASTM E136.

TABLE 14

Results of Combustibility Test per ASTM E-136

| Test Sample# | Temperature (° F.) | | | Initial weight (G) | Final Weight (G) | Weight loss (%) | Duration of Test (hr:min) |
|---|---|---|---|---|---|---|---|
| | Furnace | Surface | Interior | | | | |
| 1. | 1382 | 1380.2 | 1400 | 157.3 | 137.2 | 12% | 30:00 |
| 2. | 1382 | 1378.4 | 1412.6 | 146.3 | 129.6 | 11% | 30:00 |
| 3. | 1382 | 1392.8 | 1416.2 | 148.3 | 131.2 | 11% | 30:00 |
| 4. | 1382 | 1416.2 | 1423.4 | 155.3 | 135.2 | 12% | 30:00 |

4.3. Ignition Resistant Test per ASTM E-84

Test samples (22"W×24" L×1" Thick) were placed in a conditioning room (maintained at 70±5° F. and a relative humidity of 52±5%) for a minimum of 48 hours prior to testing. The test was conducted in accordance with 2021 IBC Section 2303.2 following ASTM E84 and ASTM E2768-11 (2018), extending an additional 20 minutes. Briefly, the test sample was loaded onto the water-cooled ledge of a fire test chamber, stacked end to end on the chamber ledge. The chamber lid was lowered into test position with a non-combustible concrete board placed between the specimen and chamber lid. A draft of 240 feet per minute was maintained inside the test chamber throughout the test period by the means of an electronic fan afterburner and an electronically controlled damper door system located downstream of the test chamber in the exhaust ducting. The test was started when the test flame was ignited at the front of the test chamber. An electronic photocell system located in the exhaust system downstream from the test chamber was used to plot the smoke developed for use in calculating the smoke developed index, while a technician plotted the flame spread distance used in determining the flame spread index. The test was run for a 10-minute duration to determine the Flame Spread and Smoke Developed Index and continued for an additional 20-minute (20 minutes extended) period with Maximum flame spread recorded. Testing was extended for an additional 20 minutes, and observations made regarding significant progressive combustion and flame spread through extended duration. Testing was performed in accordance with the following:
 a) Section 2303.2 of 2021 International Building Code, referencing ASTM E84-18b, 10 minutes or 20 minutes extended.
 b) ASTM E2768-11 (2018) Standard Test Method for Extended Duration Surface burning characteristics of Building Materials (30 min Tunnel Test).
 c) Test method to UBC No. 8-1 and SFM 12-7A-5 per Chapter 7A of the 2019 California Building Code, ignition-Resistant Material 30-minute test.

Results

Figure 9A:
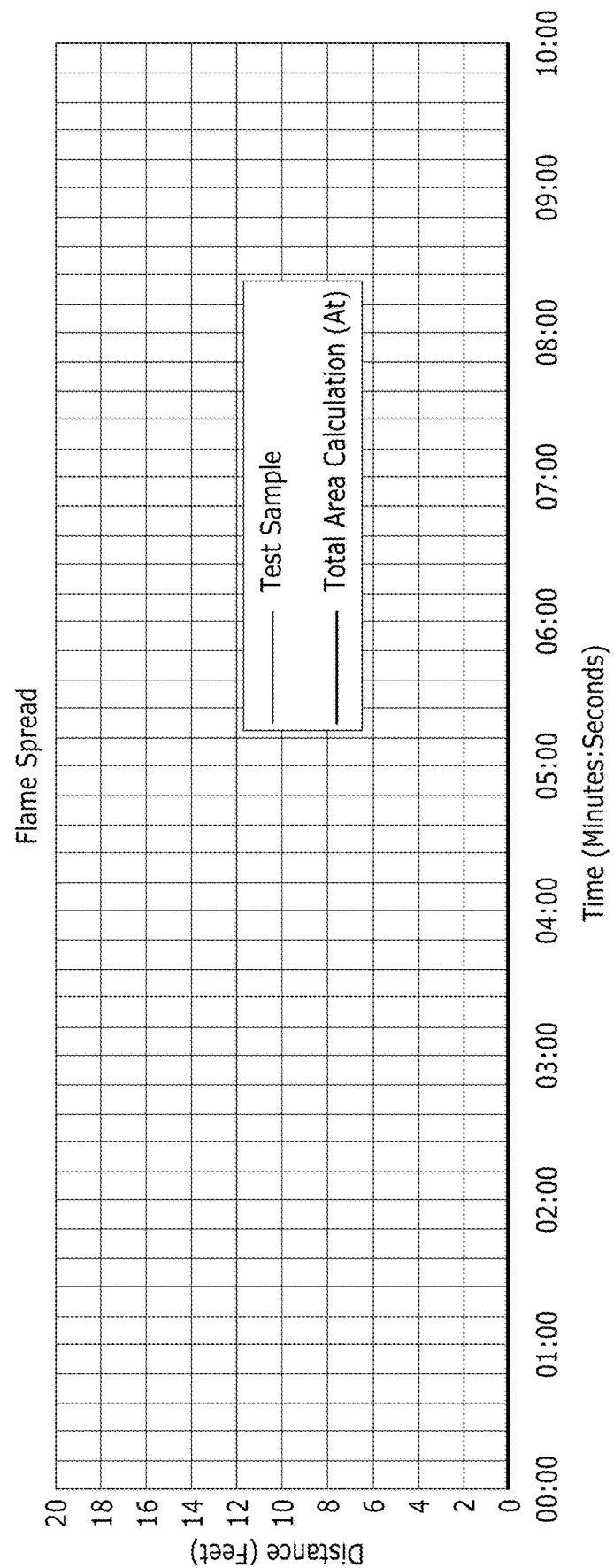
FIGS. 9A-9C shows the results of a Fire-Test-Response performed on test samples made using the formulations disclosed herein.
Figure 9B:
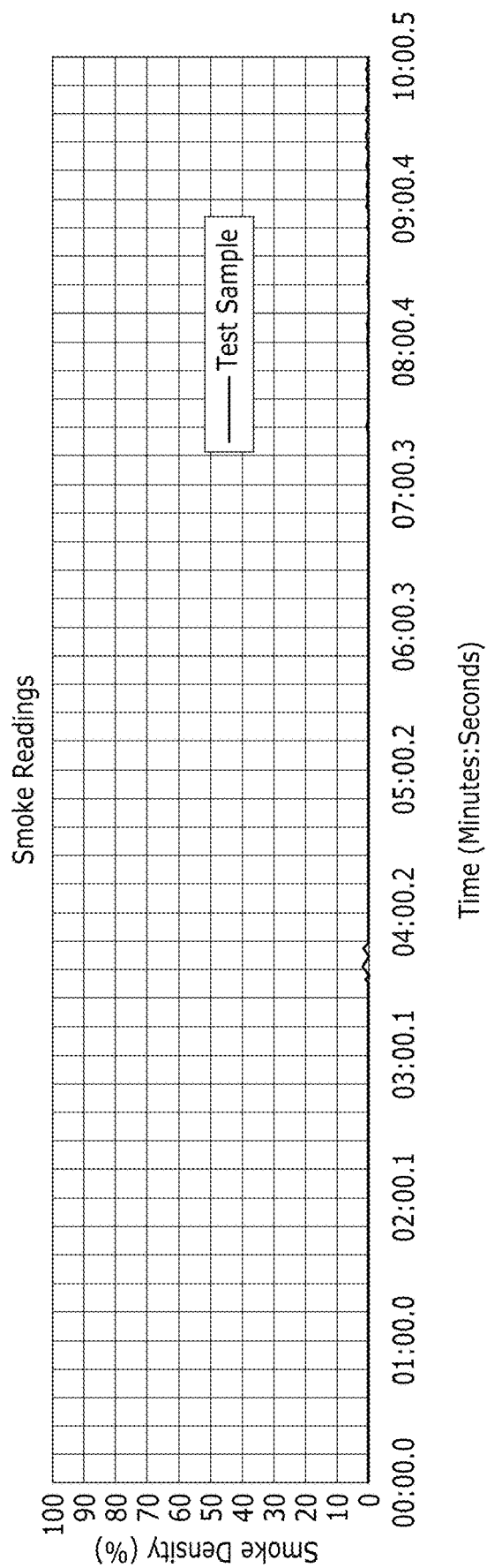
Figure 9C:
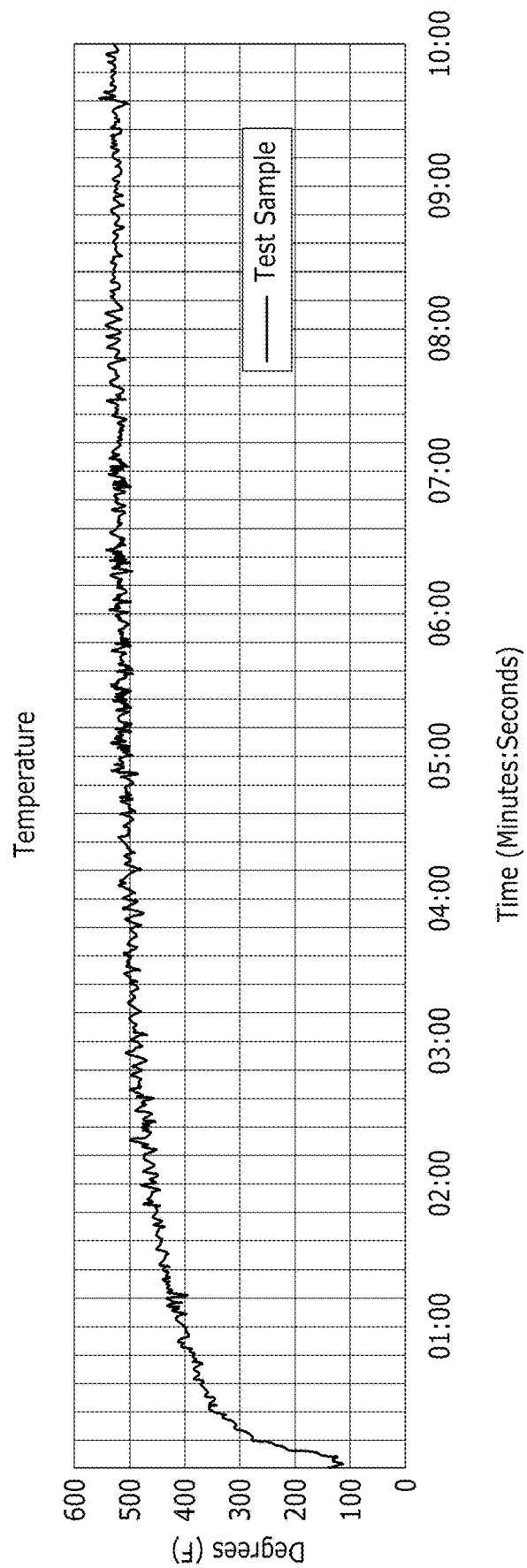

The results of the flame spread, smoke and temperature tests are shown in FIGS. 9A-9B. FIG. 9C shows the ambient temperature of the internal tube furnace for reference. Similar results were obtained for the 10 minutes and 20 minutes extended tests.

A flame spread of "0" and a smoke developed of "0" was observed when tested in accordance to Section 2303.2 of 2021 International Building Code, referencing ASTM E84-18b, Extended 20 minutes, and ASTM E2768-11-(2018) the tested material resulted in a Class A during the first 10 minutes of the test and achieved a flame spread of less than 0 feet from the centerline of the burners during the 30-minute flame exposure. Thus, the product met the above specification for Ignition Resistant Material.

4.4. Steady-State Thermal Transmission Property Test (Heat Flow Meter Test) per ASTM C518-21

The cementitious material (C518-B) samples (13.5" W×13.5" L×1" Thick) having one smooth side and one rough side were tested under the conditions shown in Table 12. Briefly, the test sample was placed between a hot plate and cold plate. Heat flux transducers are located between the test sample and the plate. Tests were performed using a ATI12 Meter, which was calibrated prior to use using a NIST Standard Reference Material 1450d, Fibrous Glass Board (Serial Number 357), which has an SRM Thermal Conductance (C) of 0.228 Btu/hr·ft$^{2°}$ F. The test was allowed to procced until a thermal equilibrium was reached. The electromagnetic field (EMF) output of the transducers, mean temperature of the test sample and the temperature drop across the test sample were measured at multiple intervals and used to calculate the thermal conductivity.

Results

Figure 10A:
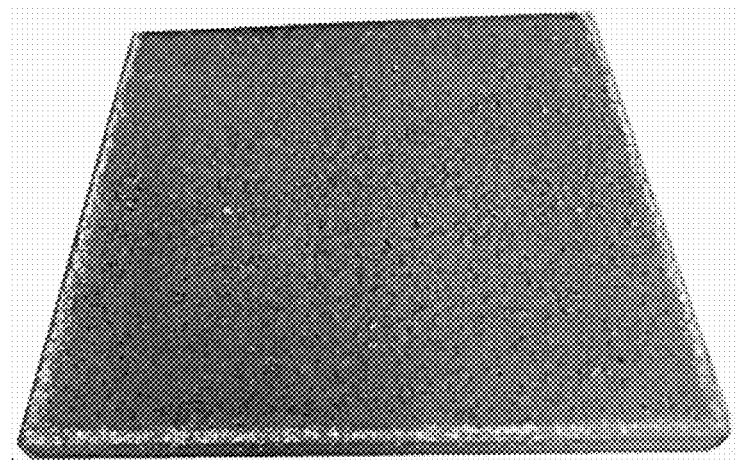
FIGS. 10A-10C shows the sample surfaces before and after the heat flow meter test.
Figure 10B:
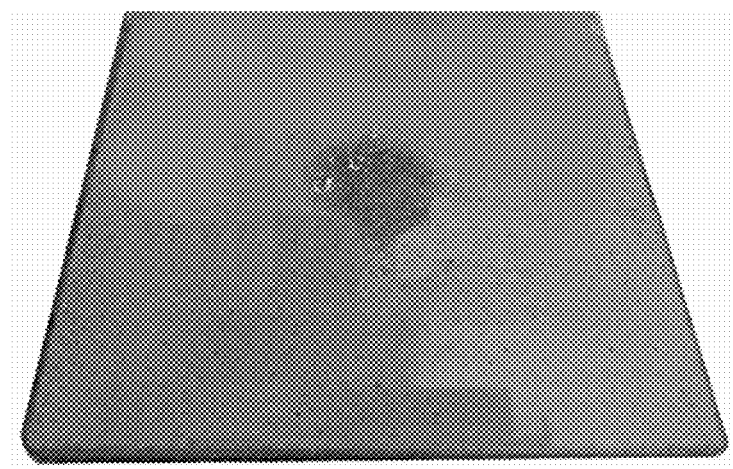
Figure 10C:
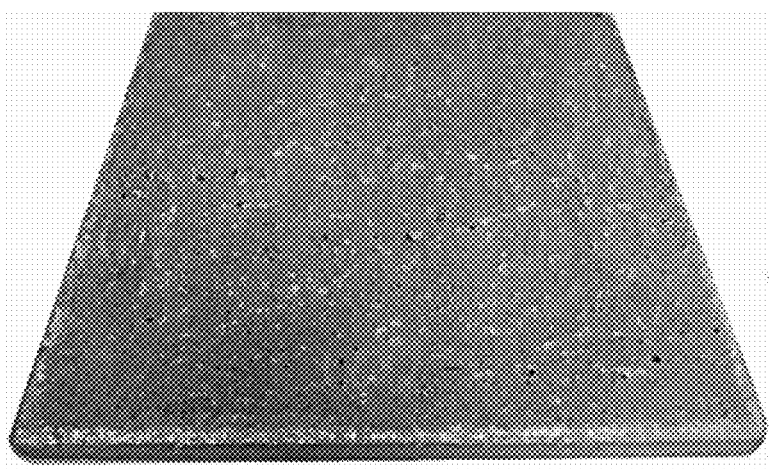

The results of the heat flow meter test are shown in Tables 15 and 16 and FIGS. 10A-10C. The results of this test show that the two test samples of prepared using the geopolymer formulations disclosed herein achieved a thermal resistivity of 2.70 (m·K/W) and 2.77 (m·K/W). For comparison, Portland cement-based products have thermal resistivities in the range of 0.6 to 1.0 (m·K/W). Thus, building materials prepared using the disclosed geopolymer formulations thus have at least 250% higher thermal resistivity than Portland cement-based products.

TABLE 15

Heat Flow Meter Test Conditions

| | |
|---|---|
| Cold Plate Temperature | 50° F. nominal |
| Warm Plate Temperature | 100° F. nominal |
| Mean Specimen Temperature | 75° F. nominal |
| Average Temperature Gradient | 50° F./inch nominal |
| Heat Flow Orientation | Vertical Heat Flow (Down) |
| Specimen Configuration | Single horizontal specimen |
| Metering Area | 4" × 4" heat flux transducer on warm side plate |

TABLE 16

Results of the heat flow meter test[¶] for C518-B

IP Units

| Sample Name | Average Heat Flux (Btu/hr · ft²) | Average Thermal Conductance (C.) (Btu/hr · ft² · °F.) | Average Thermal Resistance (R) (hr · ft² · °F./Btu) | Average Thermal Resistivity (r) (hr · ft² · °F./Btu-in) | Apparent Thermal Conductivity (k) (Btu-in/hr · ft² · °F.) | Specimen Average Thickness (inches) | [§]Specimen Average Density (lbs/ft³) |
|---|---|---|---|---|---|---|---|
| C518-B | 112.42 | 2.247[a] | 0.45[a] | 0.39[a] | 2.609[a] | 1.161[a] | 120.33[a] |
|  | 113.65 | 2.271[b] | 0.44[b] | 0.40[b] | 2.470[b] | 1.088[b] | 120.96[b] |

SI Units

| Sample Name | Average Heat Flux (W/m²) | Average Thermal Conductance (C.) (W/m² · K) | Average Thermal Resistance (Rsi) (m² · K/W) | Average Thermal Resistivity (r) (m · K/W) | Apparent Thermal Conductivity (k) (W/m · K) | Specimen Average Thickness (mm) | [§]Specimen Average Density (kg/m³) |
|---|---|---|---|---|---|---|---|
| C518-B | 354.64 | 12.759[a] | 0.08[a] | 2.70[a] | 0.376[a] | 29.49[a] | 1927.47[a] |
|  | 358.51[b] | 12.892[b] | 0.08[b] | 2.77[b] | 0.356[b] | 27.64[b] | 1937.54[b] |

[¶]ANSI/NCSL 2540-2-1997 Type B uncertainty for this test was 4.1%
[a]Test 1;
[b]Test 2
[§]Density of the sample was determined by dividing the average weight of the sample by its volume. The weight was measured using a calibrated scale and the volume was determined by measuring the length, width and height of the sample.

Example 5. Fire Burning Properties of the Cured Geopolymer Product (Formulation A)

Figure 11A:
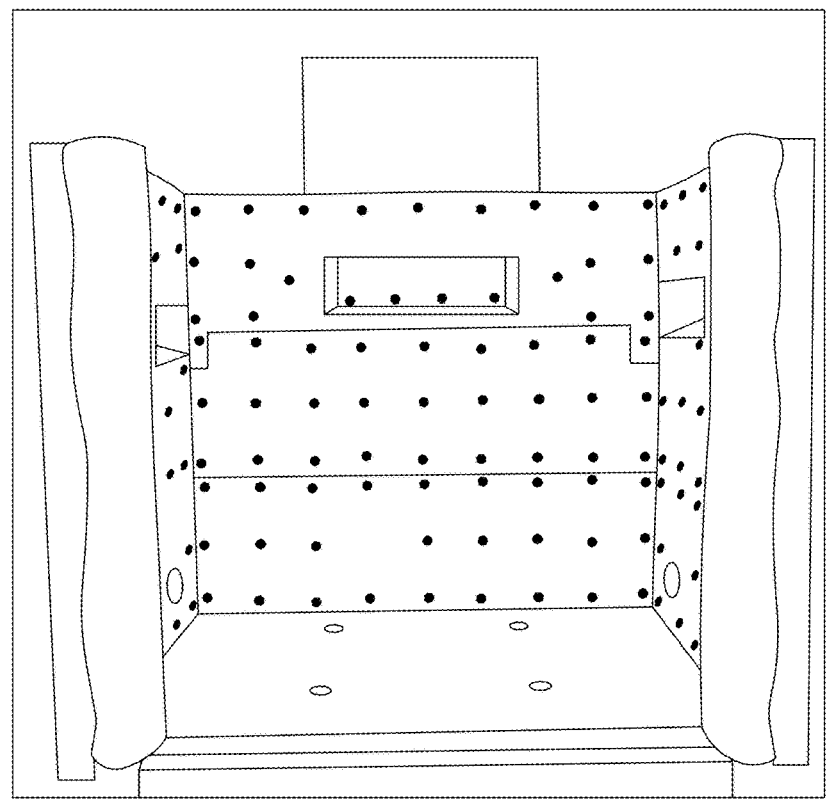
FIGS. 11A and 11B shows the pilot-scale furnace and placement of the thermocouples in the furnace.
Figure 11B:
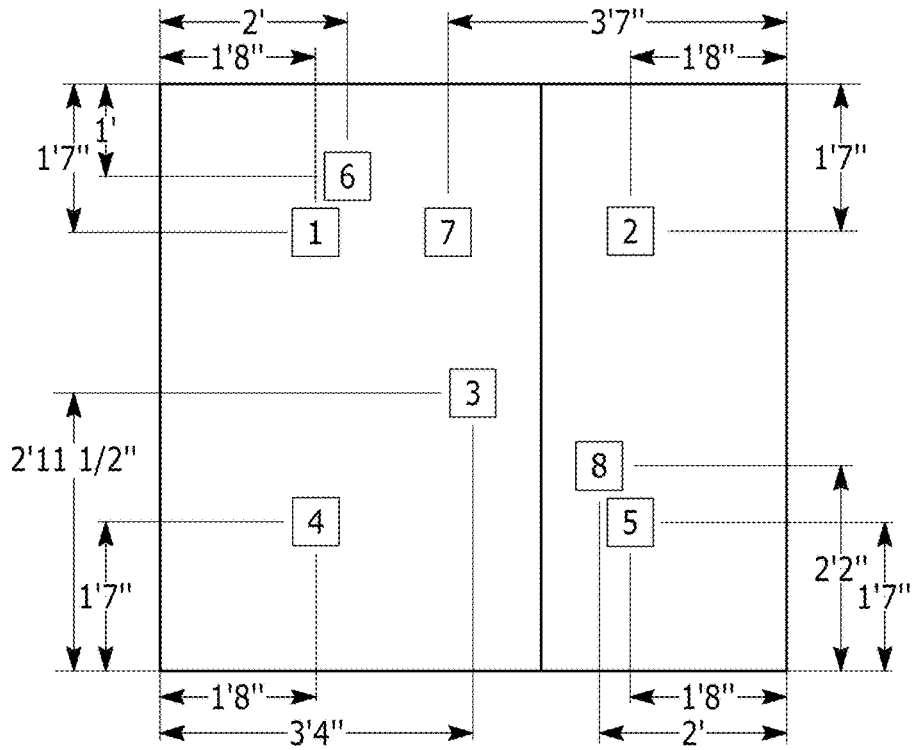
Figure 12A:
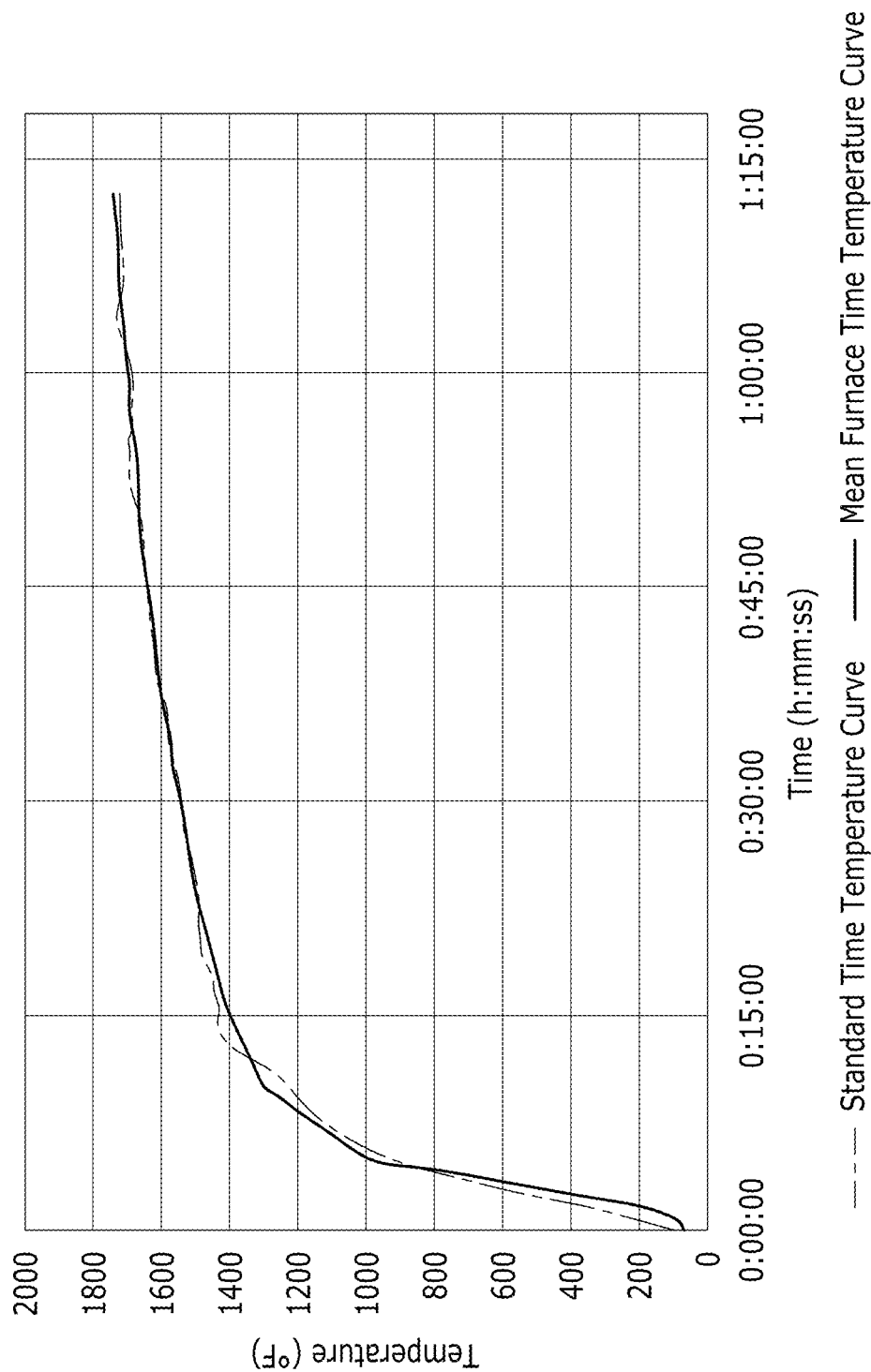
FIGS. 12A-12C show exemplary temperature rise data for the tested building materials.
Figure 12B:
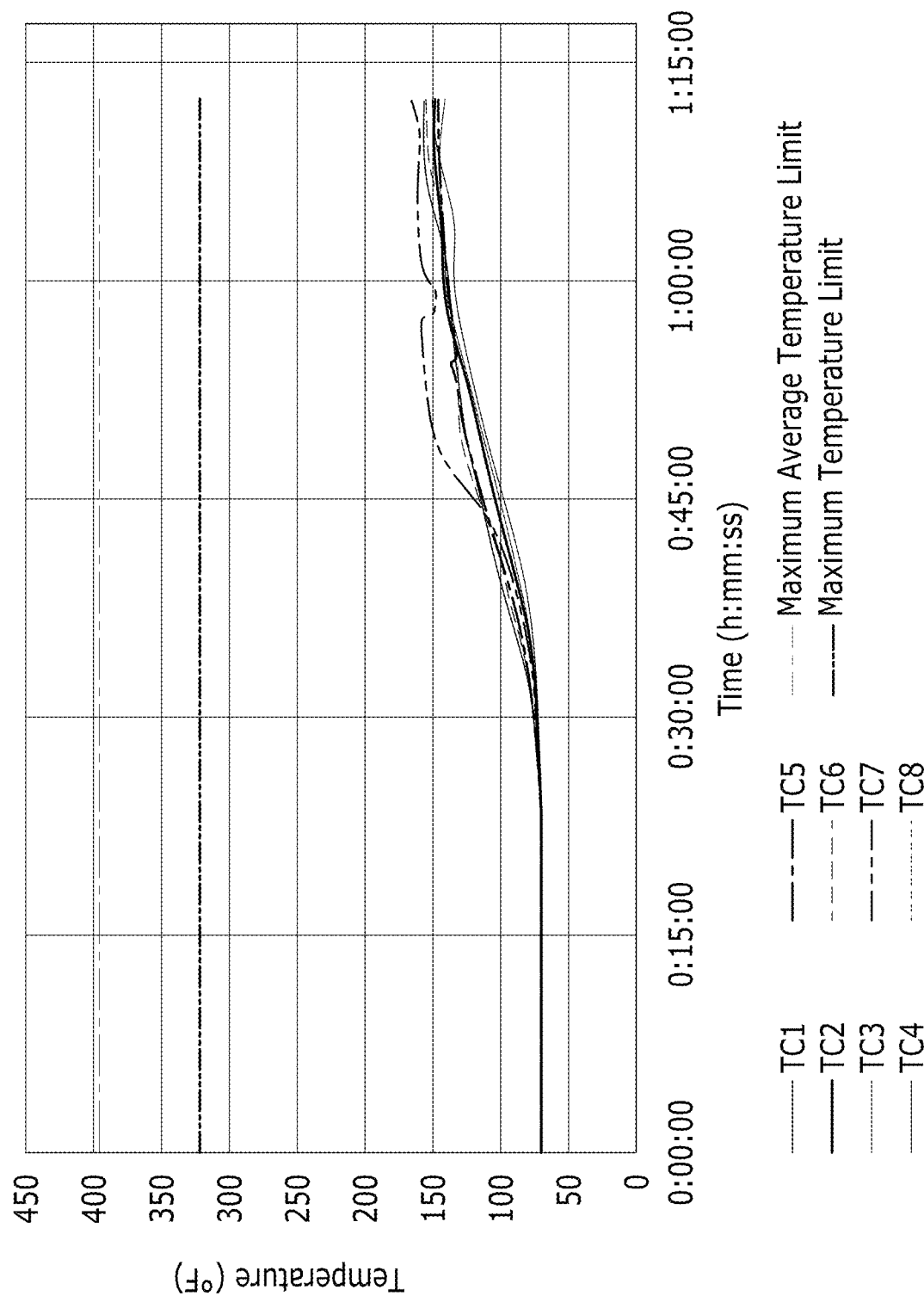
Figure 12C:
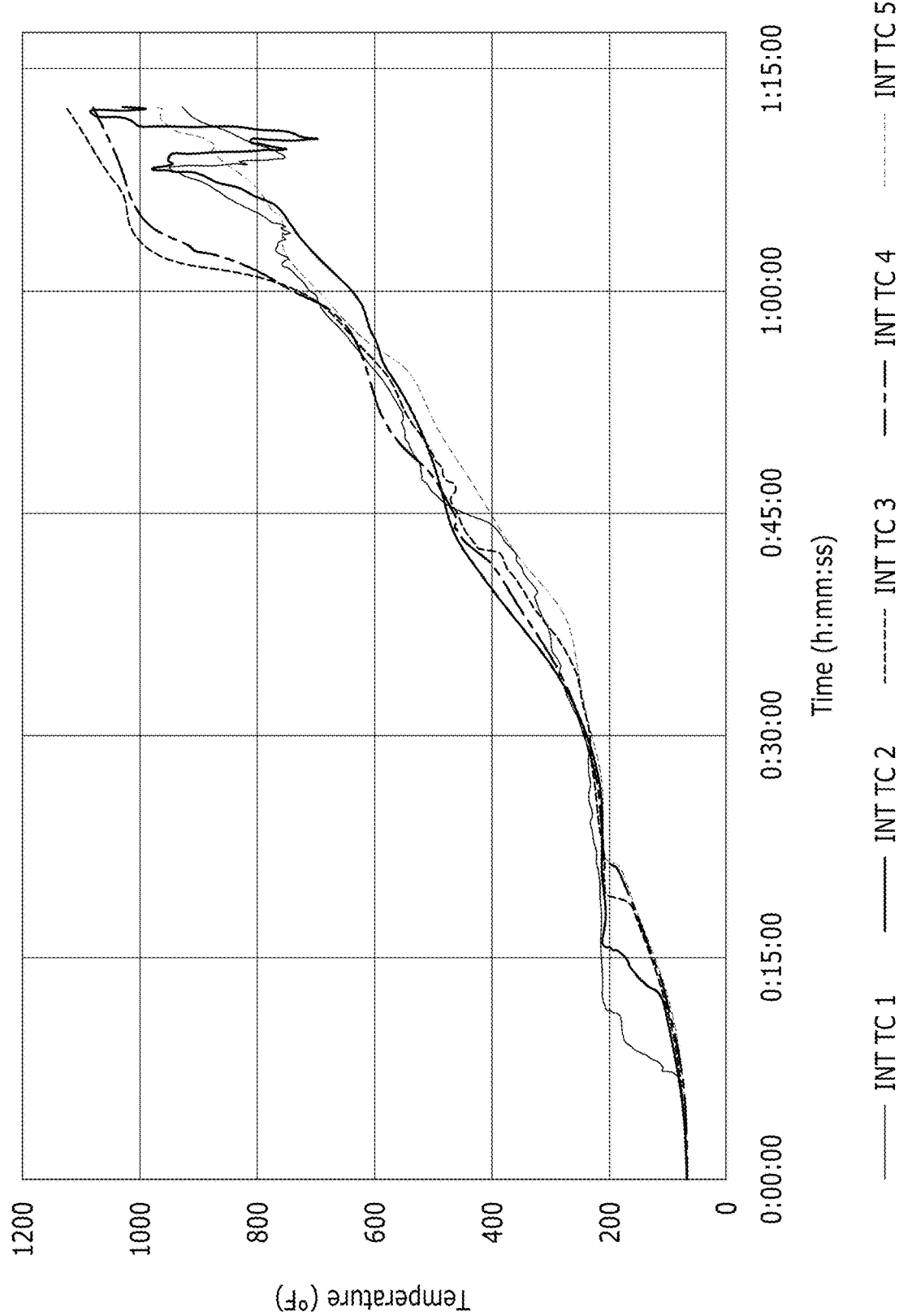

Test Apparatus: Testing was performed on a pilot-scale fire burning apparatus (70-inch×60-inch×52-inch, FIG. 11A) following the time temperature fire exposure as outlined in ASTM E119 and CAN/ULC-S101. Temperatures within the furnace were monitored using four thermocouples. The temperatures are controlled by adjusting fuel to the furnace burners to conform to the time/temperature curve specified by the test standards. Temperature measurements are recorded by an Agilent 34970A data acquisition unit (ID #ConeDAQ02) in communication with a computer for graphical display and storage. Interior and Unexposed temperatures were monitored by thermocouples (TCs) placed at locations as shown in FIG. 11B. The temperatures were recorded continuously for the duration of the test, and the temperature rise data are provided graphically in FIGS. 12A-12C.

Test Sample and Protocol

A pilot scale wall assembly comprising the cured geopolymer product (1-inch thick), 0.5-inch oriented strand board (OSB) with chicken wire, 2×4 wood framing, fiberglass insulation and ⅝-inch Type X gypsum board was used for this study (Table 17). The wall assembly was mounted in a vertical orientation, into a steel frame specimen holder. The specimen holder was then rolled up to the furnace and secured by chain and straps to the furnace opening. A ceramic fiber gasket was used to maintain an airtight seal between the furnace and the wall assembly. One pressure tap was installed through the back wall of the test furnace. The pressure tap was attached and monitored by a Setra model 264 pressure transducer (ID #Pressure T2). The furnace pressure was controlled by adjusting a damper in the furnace exhaust stack and monitored throughout the tests. Prior to the fire endurance test the test assemblies were moved into position in front of the furnace and the pilot burners were ignited. The fire endurance test was initiated after igniting the burners. The temperature inside the furnace was controlled to follow the standard time/temperature curve within the limits described in the test standards. The wall assembly was evaluated for a 1-hour fire-resistance rating.

TABLE 17

Test Assembly Description

| COMPONENT | | DESCRIPTION |
|---|---|---|
| ASSEMBLY | Type: | Wood framed exterior wall assembly with cured geopolymer product. |
|  | Exterior Surface: | Cured geopolymer product: BA/Form A/HDS-1", Chicken Wire, Building Paper. |
|  | Dimensions: | 80-inch wide by 75-inch high by 5.63-inch thick. |
|  | Framing: | Nominal 2-inch × 4-inch wood framing spaced 16-inch on center. |
|  | Panel Sheathing: | ½-inch OSB. |
|  | Insulation: | R14 fiberglass insulation. |
|  | Interior Panel: | ⅝-inch-thick Type X gypsum board fastened using no. 6 × 1 ⅝-inch coarse thread drywall screws spaced 12-inch on center. |
|  | Interior Finish: | General purpose pre-mixed drywall compound and 2-inch (51 mm) paper tape was used on the joints and drywall compound was placed over the screws. |

Figure 13A:
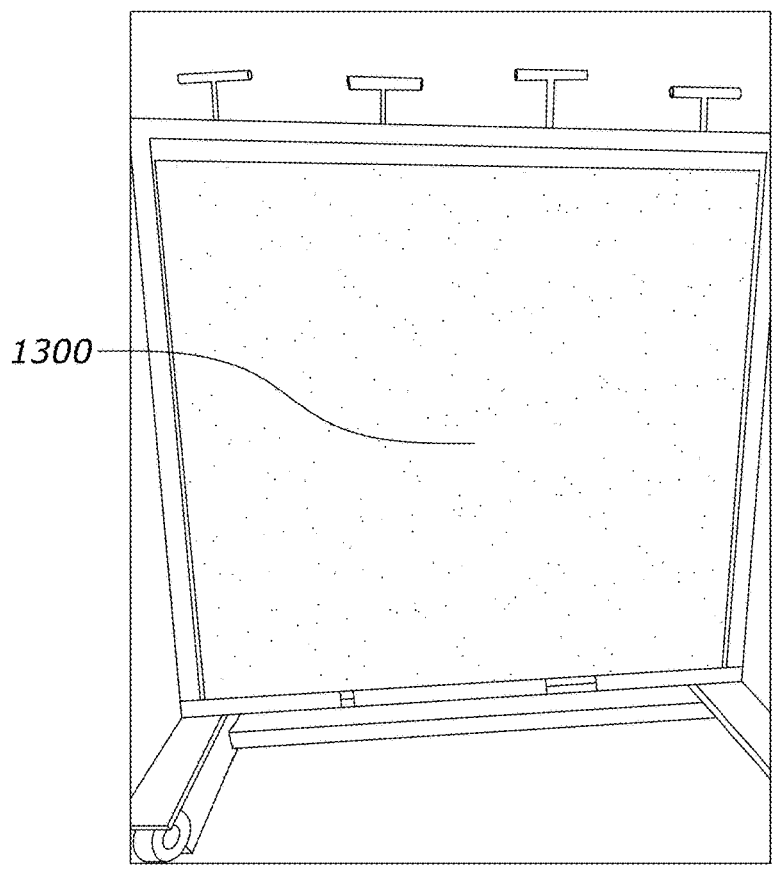
FIGS. 13A-13C shows the surface of the wall assembly before and after the fire test.
Figure 13B:
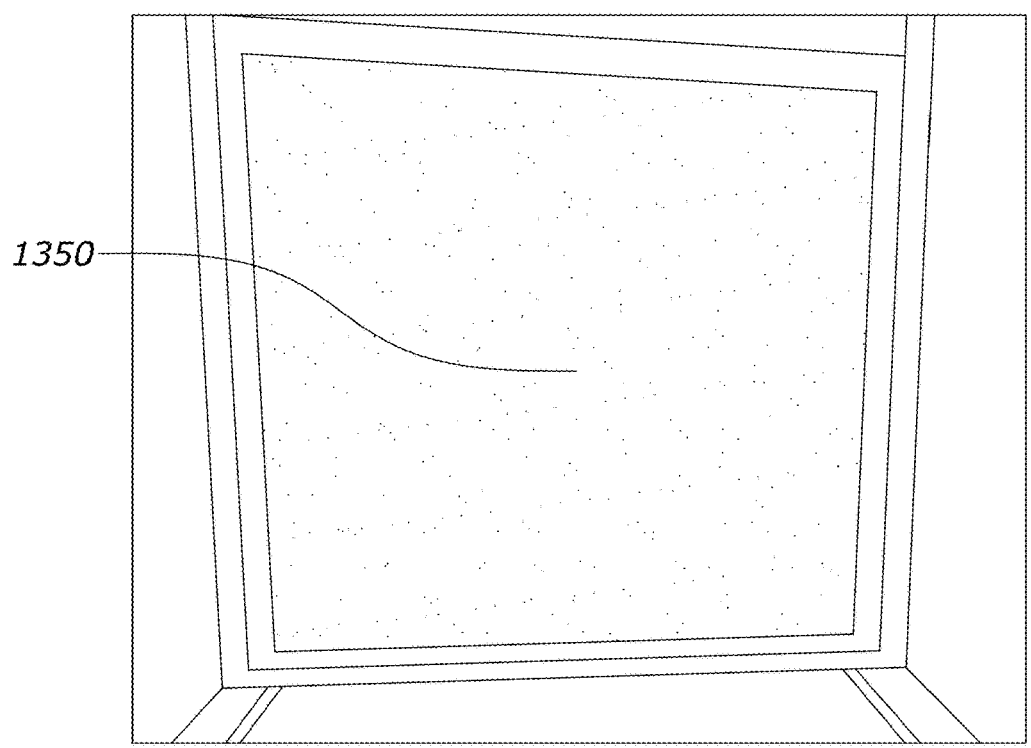
Figure 13C:
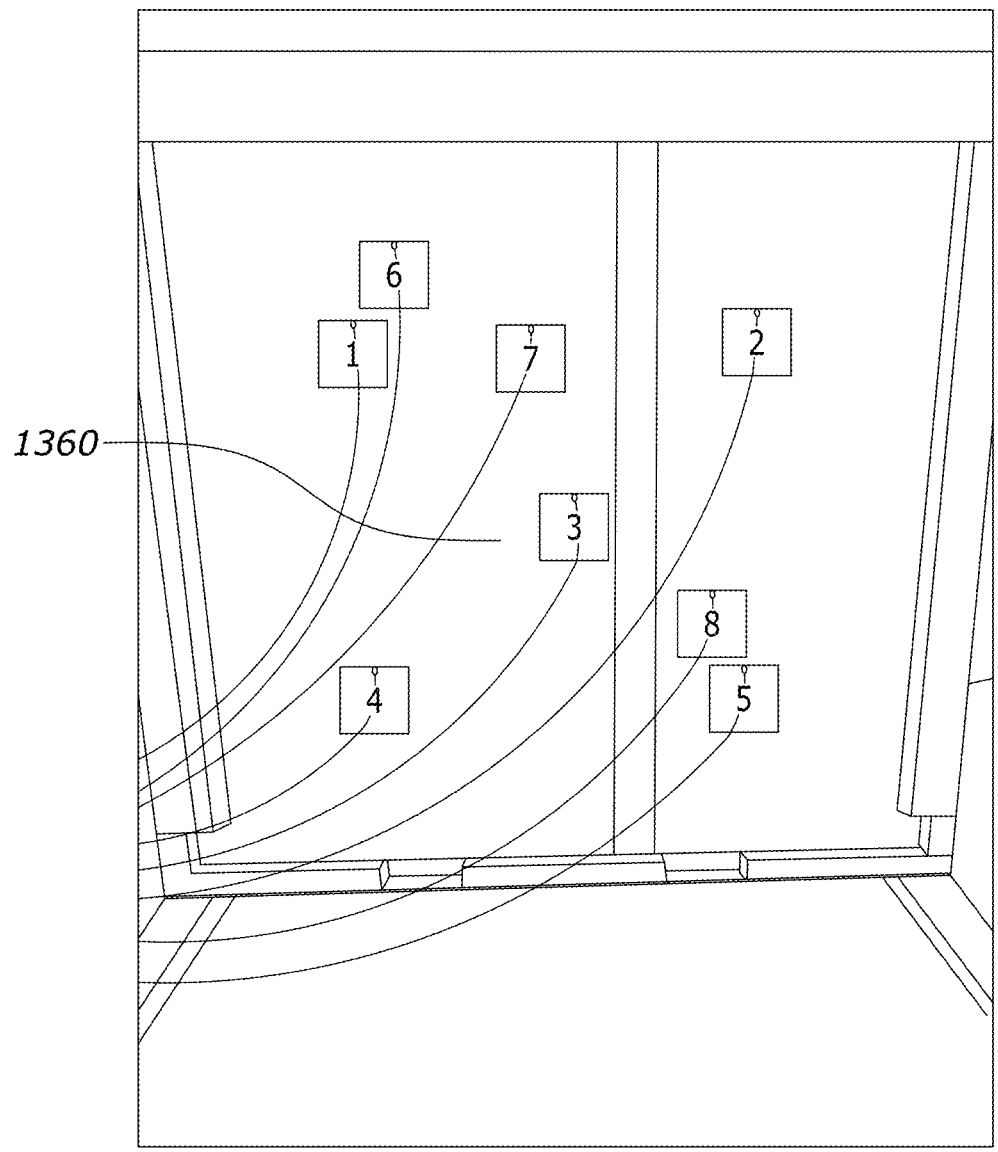

Results: A summary of the qualitative test results is shown in Table 18. FIG. 13A shows the surface 1300 before exposure to the flame and FIG. 13B shows the surface 1350 after exposure to the flame. No flaming occurred on the unexposed face 1360 (FIG. 13C) of the wall assembly, and no through penetrations or openings were observed during the fire tests. The maximum allowable single point temperature limit of 325° F. (180° C.) over the initial and the maximum average temperature limit of 250° F. (140° C.) over initial were not reached for the duration of the fire endurance test. The wall assembly was found to meet the fire endurance requirements of the test standards for a 1-hour fire resistance rating.

TABLE 18

Qualitative Test Observations

| Time (min:sec) | Unexposed Side | Exposed Side |
|---|---|---|
| 40:00:00 | | No visible cracks or deterioration of the sample |
| 54:00:00 | Heavy venting of smoke | No change |
| 60:00:00 | Heavier venting of smoke | No change |

6. Recitation of Embodiments

Embodiment 1. A geopolymer formulation for a building material comprising: sand; ground granulated blast furnace slag (GGBFS); fly ash; sodium tetraborate; boric acid; zeolite; sodium caseinate; SC-9; and one or more of sodium metasilicate or sodium hydroxide.

Embodiment 2. The geopolymer formulation of Embodiment 1, wherein: the sand is in an amount from 15% w/w to 50% w/w; the GGBFS is in an amount from 20% w/w to 70% w/w; the fly ash is in an amount from 12% w/w to 70% w/w; the sodium tetraborate is in an amount from 1.7% w/w to 3.3% w/w; the boric acid is in an amount from 0.4% w/w to 3% w/w; the zeolite is in an amount from 0.2% w/w to 2% w/w; the sodium caseinate is in an amount from 0.09% w/w to 0.14% w/w; the SC-9 is in an amount from 0.036% w/w to 0.11% w/w; the sodium metasilicate is in an amount between 6% w/w and 12% w/w; and the sodium hydroxide is in an amount between 6% w/w and 12% w/w.

Embodiment 3. The geopolymer formulation of Embodiment 1, further comprising: one or more of magnesium oxide, hemp, or a basalt fiber.

Embodiment 4. The geopolymer formulation of Embodiment 3, wherein: the magnesium oxide is in an amount between 0.02% w/w and 0.065% w/w; the hemp is in an amount between 1% w/w and 5% w/w; the basalt fiber is in an amount from about 0% w/w to about 3% w/w.

Embodiment 5. The geopolymer formulation of Embodiment 3, wherein the basalt fiber has a size from 1 mm to 50 mm.

Embodiment 6. The geopolymer formulation of Embodiment 3, wherein the basalt fiber has a size from about 6 mm to about 12 mm.

Embodiment 7. The geopolymer formulation of Embodiment 1, further comprising: aggregates for providing structural stability to the building material manufactured from the geopolymer formulation, and a filler for filling gaps between the aggregates.

Embodiment 8. The geopolymer formulation of Embodiment 7, wherein: the aggregate is selected from the group consisting of: recycled concrete aggregates (RCA), granite gravel, perlite, scoria, and non-recyclable plastics; the filler is selected from the group consisting of: limestone dust, cement, stone dust, brick dust, granulated basalt, fly ash, and pond ash.

Embodiment 9. The geopolymer formulation of Embodiment 8, wherein the aggregate is a recycled concrete aggregate (RCA).

Embodiment 10. The geopolymer formulation of Embodiment 8, wherein the filler is a one or more of fly ash, pond ash, or brick dust.

Embodiment 11. The geopolymer formulation of Embodiment 7, wherein: the aggregate is in an amount between 0% w/w and 50% w/w; the filler is in an amount between 0% w/w and 50% w/w.

Embodiment 12. The geopolymer formulation of Embodiment 1, wherein the sand is river sand, desert sand, concrete sand, pit sand, utility sand, manufactured sand, beach sand, coarse sand (a #2 sand), fill sand, manufactured sand (M sand), masonry sand, fine sand, plastering sand, crushed stone, crushed stone sand, sharp sand, white sand, fine crushed limestone gravel, glass sand, mason sand, other types of sand, silica sand, washed sand, or any combinations thereof.

Embodiment 13. The geopolymer formulation of Embodiment 1, wherein: the sand is coarse sand or fine sand; the fly ash is a Class F fly ash or a Class C fly ash; the sodium tetraborate is sodium tetraborate pentahydrate; the zeolite is clinoptilolite; or the sodium caseinate is sodium caseinate 180.

Embodiment 14. The geopolymer formulation of Embodiment 1, comprising: sand in an amount from about 41% w/w to about 49% w/w; ground granulated blast furnace slag (GGBFS) in an amount from about 23% w/w to about 27% w/w; fly ash in an amount from about 12.6% w/w to about 15.4% w/w; one or more of sodium metasilicate in an amount from about 9% w/w to about 11% w/w or sodium hydroxide in an amount from about 9% w/w to about 11% w/w; sodium tetraborate in an amount from about 2.7% w/w to about 3.3% w/w; boric acid in an amount from about 0.45% w/w to about 3.0% w/w; hemp in an amount from about 0.9% w/w to about 1.1% w/w; zeolite in an amount from about 0.9% w/w to about 1.1% w/w; sodium caseinate in an amount from about 0.12% w/w to about 0.14% w/w; SC-9 in an amount from about 0.036% w/w to about 0.044% w/w; and basalt fibers in an amount from 0% w/w to about 2% w/w.

Embodiment 15. The geopolymer formulation of Embodiment 1, comprising: 44.38% w/w coarse sand; 25.1% w/w ground granulated blast furnace slag (GGBFS); 14.47% w/w fly ash; 9.39% w/w sodium metasilicate; 2.92% w/w sodium tetraborate; 0.49% w/w boric acid; 1.03% w/w hemp; 1.02% w/w zeolite; 0.13% w/w sodium caseinate; and 0.04% w/w SC-9.

Embodiment 16. The geopolymer formulation of Embodiment 1, comprising: sand in an amount from about 20% w/w to about 24% w/w; ground granulated blast furnace slag (GGBFS) in an amount from about 33% w/w to about 37% w/w; fly ash in an amount from about 23% w/w to about 27% w/w; one or more of sodium metasilicate in an amount from about 10.5% w/w to about 11.5% w/w or sodium hydroxide in an amount from about 10.5% w/w to about 11.5% w/w; sodium tetraborate in an amount from about 2.9% w/w to about 3.1% w/w; boric acid in an amount from about 1.4% w/w to about 3.0% w/w; hemp in an amount from 0% w/w to about 1.6% w/w; zeolite in an amount from about 0.39% w/w to about 0.41% w/w; sodium caseinate in an amount from about 0.09% w/w to about 0.11% w/w; SC-9 in an amount from about 0.059% w/w to about 0.061% w/w; magnesium oxide in an amount from 0% w/w to about 0.061% w/w; and basalt fibers in an amount from 0% w/w to about 2% w/w.

Embodiment 17. The geopolymer formulation of Embodiment 1, comprising: 21.89% w/w fine sand; 34.81% w/w ground granulated blast furnace slag (GGBFS); 25.20% w/w fly ash; 10.65% w/w sodium metasilicate; 2.91% w/w sodium tetraborate; 1.46% w/w boric acid; 1.43% w/w hemp; 0.37% w/w zeolite; 0.13% w/w sodium caseinate; 0.06% w/w SC-9; and 0.06% w/w magnesium oxide.

Embodiment 18. The geopolymer formulation of Embodiment 1, comprising: fine sand in an amount from about 13% w/w to about 16% w/w; coarse sand (#2 sand) in an amount from about 25% w/w to about 35% w/w; ground granulated blast furnace slag (GGBFS) in an amount from about 22% w/w to about 26% w/w; fly ash in an amount from about 16% w/w to about 18% w/w; one or more of sodium metasilicate in an amount from about 6.5% w/w to about 8.5% w/w or sodium hydroxide in an amount from about 6.5% w/w to about 8.5% w/w; sodium tetraborate in an amount from about 1.7% w/w to about 2.3% w/w; boric acid in an amount from about 0.5% w/w to about 3.0% w/w; hemp in an amount from about 0.5% w/w to about 1.5% w/w; zeolite in an amount from about 0.2% w/w to about 0.4% w/w; sodium caseinate in an amount from about 0.09% w/w to about 0.11% w/w; SC-9 in an amount from about 0.03% w/w to about 0.05% w/w; magnesium oxide in an amount from 0% w/w to about 0.05% w/w; basalt fibers in an amount from about 0.9% w/w to about 1.1% w/w; aggregates in an amount from about 0% w/w to about 50% w/w; and fillers in an amount from about 0% w/w to about 50% w/w.

Embodiment 19. The geopolymer formulation of Embodiment 1, comprising: 30.38% w/w coarse sand; 15.17% w/w fine sand; 24.13% w/w ground granulated blast furnace slag (GGBFS); 17.46% w/w fly ash; 7.38% w/w sodium metasilicate; 2.02% w/w sodium tetraborate; 1.01% w/w boric acid; 0.99% w/w hemp; 0.26% w/w zeolite; 0.09% w/w sodium caseinate; 0.04% w/w SC-9; 1.03% w/w basalt fibers; and 0.04% w/w magnesium oxide.

Embodiment 20. The geopolymer formulation of Embodiment 1, wherein the building material manufactured from the geopolymer formulation has: a compressive strength between 2000 psi and 12000 psi; a flexural strength between 700 psi and 1000 psi; a tensile strength between 600 psi and 900 psi; an impact resistance of about 3500 psi; or one or more of zero smoke spread, or zero flame spread.

Embodiment 21. A building material derived from a geopolymer formulation comprising: a sand, a ground granulated blast furnace slag (GGBFS), a fly ash, sodium tetraborate, a boric acid, a zeolite, a sodium caseinate, SC-9, and one or more of sodium metasilicate and sodium hydroxide; wherein the building material has one or more of: a compressive strength between 2000 psi and 12000 psi; a flexural strength between 700 psi and 1000 psi; a tensile strength between 600 psi and 900 psi; an impact resistance of about 3500 psi; or one or more of zero smoke spread, or zero flame spread.

Embodiment 22. The building material of Embodiment 21, wherein: the building material has a geopolymer formulation comprising: 30% w/w to 70% w/w fly ash; and 30% w/w to 70% w/w GGBFS; wherein the building material has a compressive strength between 5000 psi and 8500 psi.

Embodiment 23. The building material of Embodiment 21, further comprising: 18 mm basalt fiber in an amount of 1% w/w in the geopolymer formulation; and recycled concrete aggregate (RCA), wherein the geopolymer formulation to RCA ratio is 70% w/w to 30% w/w; wherein the building material has a compressive strength between 5000 psi and 6000 psi.

Embodiment 24. The building material of Embodiment 21, further comprising 18 mm basalt fiber in an amount of 1% w/w in the geopolymer formulation, wherein the geopolymer formulation comprises sodium hydroxide and no sodium metasilicate, wherein the building material has a compressive strength of about 5810 psi.

Embodiment 25. The building material of Embodiment 21, further comprising 18 mm basalt fiber in an amount of 1% w/w in the geopolymer formulation, wherein the geopolymer formulation comprises silica sand and low silica content sand in ratios between 100:0 w/w to 0:100 w/w, wherein the building material has a compressive strength between 7900 psi and 10000 psi.

Embodiment 26. The building material of Embodiment 21, wherein the building material has a tensile strength between 290 psi and 400 psi.

Embodiment 27. The building material of Embodiment 21, wherein the building material has a flexural strength of about 750 psi.

Embodiment 28. The building material of Embodiment 21, wherein the building material is characterized by a flame spread of less than 0 feet from a centerline of a flame source during a 30-minute flame exposure.

Embodiment 29. The building material of Embodiment 21, wherein the building material is characterized by a flame spread of less than 0 feet from a centerline of a burner during 30-minute flame exposure.

Embodiment 30. The building material of Embodiment 21, wherein the building material is characterized by a thermal resistivity between 2.0 and 2.77 m·K/W.

Embodiment 31. The building material of Embodiment 21, wherein a 50% cured building material has a compressive strength of about 3200 psi.

Embodiment 32. The building material of Embodiment 21, wherein the geopolymer formulation comprises: sand in an amount from 15% w/w to 50% w/w; GGBFS in an amount from 20% w/w to 70% w/w; fly ash in an amount from 12% w/w to 70% w/w; sodium tetraborate in an amount from 1.7% w/w to 3.3% w/w; boric acid in an amount from 0.4% w/w to 3% w/w; zeolite in an amount from 0.2% w/w to 2% w/w; sodium caseinate in an amount from 0.09% w/w to 0.14% w/w; SC-9 in an amount from 0.036% w/w to 0.11% w/w; and one or more of sodium metasilicate in an amount between 6% w/w and 12% w/w or sodium hydroxide in an amount between 6% w/w and 12% w/w.

Embodiment 33. The building material of Embodiment 31, wherein the geopolymer formulation further comprises one or more of magnesium oxide, hemp, or a basalt fiber.

Embodiment 34. The building material of Embodiment 33, wherein: the magnesium oxide is in an amount between 0.02% w/w and 0.065% w/w; the hemp is in an amount between 1% w/w and 5% w/w; the basalt fiber is in an amount from about 0% w/w to about 3% w/w.

Embodiment 35. The building material of Embodiment 32, wherein the geopolymer formulation further comprises: aggregates for providing structural stability to the building material manufactured from the geopolymer formulation, and a filler for filling gaps between the aggregates.

Embodiment 36. The building material of Embodiment 35, wherein: the aggregate is selected from the group consisting of: recycled concrete aggregates (RCA), granite gravel, perlite, scoria, and non-recyclable plastics; and the filler is selected from the group consisting of: limestone dust, cement, stone dust, brick dust, granulated basalt, fly ash, and pond ash.

Embodiment 37. The building material of Embodiment 36, wherein the aggregate is a recycled concrete aggregate (RCA).

Embodiment 38. The building material of Embodiment 35, wherein: the aggregate is in an amount between 0% w/w and 50% w/w; and the filler is in an amount between 0% w/w and 50% w/w.

Embodiment 39. The building material of Embodiment 21, wherein the geopolymer formulation comprises: sand in an amount from about 41% w/w to about 49% w/w; ground granulated blast furnace slag (GGBFS) in an amount from about 23% w/w to about 27% w/w; fly ash in an amount from about 12.6% w/w to about 15.4% w/w; one or more of sodium metasilicate in an amount from about 9% w/w to about 11% w/w or sodium hydroxide in an amount from about 9% w/w to about 11% w/w; sodium tetraborate in an amount from about 2.7% w/w to about 3.3% w/w; boric acid in an amount from about 0.45% w/w to about 3.0% w/w; hemp in an amount from about 0.9% w/w to about 1.1% w/w; zeolite in an amount from about 0.9% w/w to about 1.1% w/w; sodium caseinate in an amount from about 0.12% w/w to about 0.14% w/w; SC-9 in an amount from about 0.036% w/w to about 0.044% w/w; and basalt fibers in an amount from 0% w/w to about 2% w/w.

Embodiment 40. The building material of Embodiment 21, wherein the geopolymer formulation comprises: sand in an amount from about 20% w/w to about 24% w/w; ground granulated blast furnace slag (GGBFS) in an amount from about 33% w/w to about 37% w/w; fly ash in an amount from about 23% w/w to about 27% w/w; one or more of sodium metasilicate in an amount from about 10.5% w/w to about 11.5% w/w or sodium hydroxide in an amount from about 10.5% w/w to about 11.5% w/w; sodium tetraborate in an amount from about 2.9% w/w to about 3.1% w/w; boric acid in an amount from about 1.4% w/w to about 3.0% w/w; hemp in an amount from 0% w/w to about 1.6% w/w; zeolite in an amount from about 0.39% w/w to about 0.41% w/w; sodium caseinate in an amount from about 0.09% w/w to about 0.11% w/w; SC-9 in an amount from about 0.059% w/w to about 0.061% w/w; magnesium oxide in an amount from 0% w/w to about 0.061% w/w; and basalt fibers in an amount from 0% w/w to about 2% w/w.

Embodiment 41. The building material of Embodiment 21, wherein the geopolymer formulation comprises: fine sand in an amount from about 13% w/w to about 16% w/w; coarse sand (#2 sand) in an amount from about 25% w/w to about 35% w/w; ground granulated blast furnace slag (GGBFS) in an amount from about 22% w/w to about 26% w/w; fly ash in an amount from about 16% w/w to about 18% w/w; one or more of sodium metasilicate in an amount from about 6.5% w/w to about 8.5% w/w or sodium hydroxide in an amount from about 6.5% w/w to about 8.5% w/w; sodium tetraborate in an amount from about 1.7% w/w to about 2.3% w/w; boric acid in an amount from about 0.5% w/w to about 3.0% w/w; hemp in an amount from about 0.5% w/w to about 1.5% w/w; zeolite in an amount from about 0.2% w/w to about 0.4% w/w; sodium caseinate in an amount from about 0.09% w/w to about 0.11% w/w; SC-9 in an amount from about 0.03% w/w to about 0.05% w/w; magnesium oxide in an amount from 0% w/w to about 0.05% w/w; basalt fibers in an amount from about 0.9% w/w to about 1.1% w/w; aggregates in an amount from about 0% w/w to about 50% w/w; and fillers in an amount from about 0% w/w to about 50% w/w.

Embodiment 42. A method of manufacturing a dry formulation comprising: obtaining various constituents of the dry formulation from one or more of a sand, a ground granulated blast furnace slag (GGBFS), a fly ash, sodium tetraborate, a boric acid, a zeolite, a sodium caseinate, SC-9, sodium metasilicate and sodium hydroxide; and mixing the constituents to a homogenous mixture.

Embodiment 43. The method of Embodiment 42, wherein: (a) the various constituents are mixed in a single batch; or (b) the various constituents are mixed in two or more batches, each batch comprising: preparing a first homogenous mixture comprising: obtaining a first batch of constituents; mixing said first batch of constituents to obtain the first homogenous mixture; preparing a next homogenous mixture comprising: adding a next batch of constituents to the first homogenous mixture; mixing said next batch of constituents with the first homogenous mixture to obtain a next homogenous mixture; and repeating the preparing for each subsequent batch of constituents and homogenous mixture obtained in a prior mixing step.

Embodiment 44. The method of Embodiment 42, wherein: the sand is in an amount from 15% w/w to 50% w/w in the dry formulation; the GGBFS is in an amount from 20% w/w to 70% w/w in the dry formulation; the fly ash is in an amount from 12% w/w to 70% w/w in the dry formulation; the sodium tetraborate is in an amount from 1.7% w/w to 3.3% w/w in the dry formulation; the boric acid is in an amount from 0.4% w/w to 3% w/w in the dry formulation; the zeolite is in an amount from 0.2% w/w to 2% w/w in the dry formulation; the sodium caseinate is in an amount from 0.09% w/w to 0.14% w/w in the dry formulation; the SC-9 is in an amount from 0.036% w/w to 0.11% w/w in the dry formulation; the sodium metasilicate is in an amount between 6% w/w and 12% w/w in the dry formulation; and the sodium hydroxide is in an amount between 6% w/w and 12% w/w in the dry formulation.

Embodiment 45. The method of Embodiment 42, further comprising adding one or more of: a basalt fiber; magnesium oxide; or aggregates that provides structural stability to a building material manufactured from the formulation and a filler to fill gaps between the aggregates.

Embodiment 46. The method of Embodiment 45, wherein: the basalt fiber is in an amount from about 0% w/w to about 3% w/w; the magnesium oxide is in an amount between 0.02% w/w and 0.065% w/w; the aggregate is in an amount between 0% w/w and 50% w/w; and the filler is in an amount between 0% w/w and 50% w/w in the dry formulation.

Embodiment 47. The method of Embodiment 42, further comprising packaging and storing the formulation in dry form prior to use.

Embodiment 48. A method of manufacturing a building material comprising: (i) obtaining a dry geopolymer formulation; (ii) hydrating said formulation; (iii) mixing the hydrated formulation; (iv) dispensing the formulation; and (v) curing the formulation.

Embodiment 49. The method of Embodiment 48, wherein dispensing comprises pumping or spraying said formulation.

Embodiment 50. The method of Embodiment 48, further comprising screeding, troweling, or finishing after the dispensing.

Embodiment 51. The method of Embodiment 48, wherein the curing is performed at about 30° F. to about 100° F. or using infrared heat.

Embodiment 52. The method of Embodiment 48, wherein the formulation is cured for a period between 20 minutes and 24 hours, between 12 hours and 48 hours, or between 1 day and 14 days.

Embodiment 53. The method of Embodiment 48, wherein the hydration uses water selected from, one or more of potable water, wash water, underground water, agriculture water, or sea water.

Embodiment 54. The method of Embodiment 48, wherein the hydration uses sea water.

Embodiment 55. The method of Embodiment 48, wherein the building material is an exterior wall covering, an exterior standalone wall system, a roofing, an accessory dwelling unit, a stucco, a lap siding, an applied stone, a tile, a shingle, and a sheet good, a soffit panel, or a waterproofing concrete.

Embodiment 56. The method of Embodiment 48, wherein the building material manufactured from the formulation comprises: sand in an amount from 15% w/w to 50% w/w; GGBFS in an amount from 20% w/w to 70% w/w; fly ash in an amount from 12% w/w to 70% w/w; sodium tetraborate in an amount from 1.7% w/w to 3.3% w/w; boric acid in an amount from 0.4% w/w to 3% w/w; zeolite in an amount from 0.2% w/w to 2% w/w; sodium caseinate in an amount from 0.09% w/w to 0.14% w/w; SC-9 in an amount from 0.036% w/w to 0.11% w/w; and one or more of sodium metasilicate in an amount between 6% w/w and 12% w/w or sodium hydroxide in an amount between 6% w/w and 12% w/w.

Embodiment 57. The method of Embodiment 56, wherein the building material manufactured from the formulation further comprises one or more: magnesium oxide in an amount between 0.02% w/w and 0.065% w/w; hemp in an amount between 1% w/w and 5% w/w; basalt fiber in an amount from about 0% w/w to about 3% w/w; an aggregate for providing structural stability to the building material, wherein the aggregate is in an amount between 0% w/w and 50% w/w; or a filler for filling gaps between the aggregates wherein the filler is in an amount between 0% w/w and 50% w/w.

7. Miscellaneous

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A geopolymer formulation for a building material comprising:
    sand;
    ground granulated blast furnace slag (GGBFS);
    fly ash;
    sodium tetraborate;
    boric acid;
    zeolite;
    sodium caseinate;
    sulfonated polymer; and
    one or more of sodium metasilicate or sodium hydroxide.

2. The geopolymer formulation of claim 1, wherein:
    the sand is in an amount from 15% w/w to 50% w/w;
    the GGBFS is in an amount from 20% w/w to 70% w/w;
    the fly ash is in an amount from 12% w/w to 70% w/w;
    the sodium tetraborate is in an amount from 1.7% w/w to 3.3% w/w;
    the boric acid is in an amount from 0.4% w/w to 3% w/w;
    the zeolite is in an amount from 0.2% w/w to 2% w/w;
    the sodium caseinate is in an amount from 0.09% w/w to 0.14% w/w;
    the sulfonated polymer is in an amount from 0.036% w/w to 0.11% w/w;
    the sodium metasilicate is in an amount between 6% w/w and 12% w/w; and
    the sodium hydroxide is in an amount between 6% w/w and 12% w/w.

3. The geopolymer formulation of claim 1, further comprising:
    one or more of magnesium oxide, hemp, or a basalt fiber.

4. The geopolymer formulation of claim 3, wherein:
    the magnesium oxide is in an amount between 0.02% w/w and 0.065% w/w;
    the hemp is in an amount between 1% w/w and 5% w/w;
    the basalt fiber is in an amount from about 0% w/w to about 3% w/w.

5. The geopolymer formulation of claim 3, wherein the basalt fiber has a size from 1 mm to 50 mm.

6. The geopolymer formulation of claim 3, wherein the basalt fiber has a size from about 6 mm to about 12 mm.

7. The geopolymer formulation of claim 1, further comprising:

aggregates for providing structural stability to the building material manufactured from the geopolymer formulation, and
a filler for filling gaps between the aggregates.

8. The geopolymer formulation of claim 7, wherein:
the aggregate is selected from the group consisting of: recycled concrete aggregates (RCA), granite gravel, perlite, scoria, and non-recyclable plastics;
the filler is selected from the group consisting of: limestone dust, cement, stone dust, brick dust, granulated basalt, fly ash, and pond ash.

9. The geopolymer formulation of claim 8, wherein the aggregate is a recycled concrete aggregate (RCA).

10. The geopolymer formulation of claim 8, wherein the filler is a one or more of pond ash or brick dust.

11. The geopolymer formulation of claim 7, wherein:
the aggregate is in an amount between 0% w/w and 50% w/w;
the filler is in an amount between 0% w/w and 50% w/w.

12. The geopolymer formulation of claim 1, wherein the sand is river sand, desert sand, concrete sand, pit sand, utility sand, manufactured sand, beach sand, coarse sand, fill sand, manufactured sand, masonry sand, fine sand, plastering sand, crushed stone, crushed stone sand, sharp sand, white sand, fine crushed limestone gravel, glass sand, mason sand, silica sand, washed sand, or any combinations thereof.

13. The geopolymer formulation of claim 1, wherein:
the sand is coarse sand or fine sand;
the fly ash is a Class F fly ash or a Class C fly ash;
the sodium tetraborate is sodium tetraborate pentahydrate;
the zeolite is clinoptilolite; or
the sodium caseinate is sodium caseinate 180.

14. The geopolymer formulation of claim 1, comprising:
sand in an amount from about 41% w/w to about 49% w/w;
ground granulated blast furnace slag (GGBFS) in an amount from about 23% w/w to about 27% w/w;
fly ash in an amount from about 12.6% w/w to about 15.4% w/w;
one or more of sodium metasilicate in an amount from about 9% w/w to about 11% w/w or sodium hydroxide in an amount from about 9% w/w to about 11% w/w;
sodium tetraborate in an amount from about 2.7% w/w to about 3.3% w/w;
boric acid in an amount from about 0.45% w/w to about 3.0% w/w;
hemp in an amount from about 0.9% w/w to about 1.1% w/w;
zeolite in an amount from about 0.9% w/w to about 1.1% w/w;
sodium caseinate in an amount from about 0.12% w/w to about 0.14% w/w;
sulfonated polymer in an amount from about 0.036% w/w to about 0.044% w/w; and
basalt fibers in an amount from 0% w/w to about 3% w/w.

15. The geopolymer formulation of claim 1, comprising:
44.38% w/w coarse sand;
25.1% w/w ground granulated blast furnace slag (GGBFS);
14.47% w/w fly ash;
9.39% w/w sodium metasilicate;
2.92% w/w sodium tetraborate;
0.49% w/w boric acid;
1.03% w/w hemp;
1.02% w/w zeolite;
0.13% w/w sodium caseinate; and
0.04% w/w sulfonated polymer.

16. The geopolymer formulation of claim 1, comprising:
sand in an amount from about 20% w/w to about 24% w/w;
ground granulated blast furnace slag (GGBFS) in an amount from about 33% w/w to about 37% w/w;
fly ash in an amount from about 23% w/w to about 27% w/w;
one or more of sodium metasilicate in an amount from about 10.5% w/w to about 11.5% w/w or sodium hydroxide in an amount from about 10.5% w/w to about 11.5% w/w;
sodium tetraborate in an amount from about 2.9% w/w to about 3.1% w/w;
boric acid in an amount from about 1.4% w/w to about 3.0% w/w;
hemp in an amount from 0% w/w to about 1.6% w/w;
zeolite in an amount from about 0.39% w/w to about 0.41% w/w;
sodium caseinate in an amount from about 0.09% w/w to about 0.11% w/w;
sulfonated polymer in an amount from about 0.059% w/w to about 0.061% w/w;
magnesium oxide in an amount from 0% w/w to about 0.061% w/w; and
basalt fibers in an amount from 0% w/w to about 3% w/w.

17. The geopolymer formulation of claim 1, comprising:
21.89% w/w fine sand;
34.81% w/w ground granulated blast furnace slag (GGBFS);
25.20% w/w fly ash;
10.65% w/w sodium metasilicate;
2.91% w/w sodium tetraborate;
1.46% w/w boric acid;
1.43% w/w hemp;
0.37% w/w zeolite;
0.13% w/w sodium caseinate;
0.06% w/w sulfonated polymer; and
0.06% w/w magnesium oxide.

18. The geopolymer formulation of claim 1, comprising:
fine sand in an amount from about 13% w/w to about 16% w/w;
coarse sand (#2 sand) in an amount from about 25% w/w to about 35% w/w;
ground granulated blast furnace slag (GGBFS) in an amount from about 22% w/w to about 26% w/w;
fly ash in an amount from about 16% w/w to about 18% w/w;
one or more of sodium metasilicate in an amount from about 6.5% w/w to about 8.5% w/w or sodium hydroxide in an amount from about 6.5% w/w to about 8.5% w/w;
sodium tetraborate in an amount from about 1.7% w/w to about 2.3% w/w;
boric acid in an amount from about 0.5% w/w to about 3.0% w/w;
hemp in an amount from about 0.5% w/w to about 1.5% w/w;
zeolite in an amount from about 0.2% w/w to about 0.4% w/w;
sodium caseinate in an amount from about 0.09% w/w to about 0.11% w/w;
sulfonated polymer in an amount from about 0.03% w/w to about 0.05% w/w;
magnesium oxide in an amount from 0% w/w to about 0.05% w/w;
basalt fibers in an amount from about 0% w/w to about 3% w/w;

aggregates in an amount from about 0% w/w to about 50% w/w; and fillers in an amount from about 0% w/w to about 50% w/w.

19. The geopolymer formulation of claim 1, comprising:
30.38% w/w coarse sand;
15.17% w/w fine sand;
24.13% w/w ground granulated blast furnace slag (GGBFS);
17.46% w/w fly ash;
7.38% w/w sodium metasilicate;
2.02% w/w sodium tetraborate;
1.01% w/w boric acid;
0.99% w/w hemp;
0.26% w/w zeolite;
0.09% w/w sodium caseinate;
0.04% w/w sulfonated polymer;
1.03% w/w basalt fibers; and
0.04% w/w magnesium oxide.

20. The geopolymer formulation of claim 1, wherein the building material manufactured from the geopolymer formulation has:
a compressive strength between 2000 psi and 11000 psi;
a flexural strength between 700 psi and 900 psi;
a tensile strength between 600 psi and 800 psi;
an impact resistance of about 3500 psi; or
one or more of zero smoke spread, or zero flame spread.

* * * * *